(12) United States Patent
Tanaka et al.

(10) Patent No.: US 7,978,198 B2
(45) Date of Patent: Jul. 12, 2011

(54) IMAGE DATA TRANSFER METHOD, IMAGE PROCESSING DEVICE, AND IMAGING SYSTEM

(75) Inventors: Yasuharu Tanaka, Osaka (JP); Shinji Kitamura, Kyoto (JP); Taichi Nagata, Osaka (JP); Yoshihisa Shimazu, Kyoto (JP)

(73) Assignee: Panasonic Corporation, Osaka (JP)

( * ) Notice: Subject to any disclaimer, the term of this patent is extended or adjusted under 35 U.S.C. 154(b) by 959 days.

(21) Appl. No.: 11/785,414

(22) Filed: Apr. 17, 2007

(65) Prior Publication Data

US 2007/0279426 A1    Dec. 6, 2007

(30) Foreign Application Priority Data

Apr. 17, 2006  (JP) ................................ 2006-113560
Mar. 23, 2007  (JP) ................................ 2007-075709

(51) Int. Cl.
*G06T 1/60* (2006.01)
*G09G 5/39* (2006.01)
*G09G 5/399* (2006.01)
*G06F 13/28* (2006.01)
*G06F 13/18* (2006.01)
*G06F 13/00* (2006.01)

(52) U.S. Cl. ........ 345/533; 345/530; 345/531; 345/535; 345/536; 345/537; 345/538; 345/540

(58) Field of Classification Search .................. 345/530, 345/531, 533, 535–538, 540
See application file for complete search history.

(56) References Cited

U.S. PATENT DOCUMENTS 4,266,242 A * 5/1981 McCoy .......................... 348/588
(Continued)

FOREIGN PATENT DOCUMENTS

JP         54-130830       10/1979
(Continued)

OTHER PUBLICATIONS

Japanese Notice of Reasons for Rejection, w/ English translation thereof, Issued in Japanese Patent Application No. JP 2007-075709 dated Jan. 18, 2011.

*Primary Examiner* — Xiao M Wu
*Assistant Examiner* — David T Welch
(74) *Attorney, Agent, or Firm* — McDermott Will & Emery LLP

(57) ABSTRACT

An image data transfer method including the steps of: (a) reading pixel data of a two-dimensional image stored in a first image storage and having a plurality of pixels, the position of each of the pixels being represented by coordinates of first and second directions, the pixel data being read by scanning data transfer units of the pixel data in the second direction where each of the data transfer units is formed by data of a predetermined number of pixels consecutive in the first direction; (b) writing the data transfer units read at step (a) in a temporary data storage where data is stored at a position designated by a combination of first and second addresses, the data transfer units being written in burst mode in a region of the temporary data storage in which the first addresses are consecutive while the second address is fixed; and (c) reading the data transfer units written in the temporary data storage from the region in which the first addresses are consecutive while the second address is fixed in burst mode and writing the read data transfer units in a second image storage.

44 Claims, 55 Drawing Sheets

U.S. PATENT DOCUMENTS

| | | | | |
|---|---|---|---|---|
| 4,539,593 A | * | 9/1985 | Jutier et al. | 348/719 |
| 4,620,136 A | * | 10/1986 | Bolger | 315/368.12 |
| 4,763,203 A | * | 8/1988 | Oldershaw et al. | 386/20 |
| 4,847,809 A | * | 7/1989 | Suzuki | 365/189.04 |
| 4,905,084 A | * | 2/1990 | Zucker | 375/240.25 |
| 4,926,247 A | * | 5/1990 | Nagasaki et al. | 348/262 |
| 5,089,887 A | * | 2/1992 | Robert et al. | 348/699 |
| 5,128,760 A | * | 7/1992 | Chauvel | 348/452 |
| 5,581,310 A | | 12/1996 | Vinekar et al. | |
| 5,629,723 A | * | 5/1997 | West et al. | 345/539 |
| 5,663,961 A | * | 9/1997 | McRoberts et al. | 370/412 |
| 5,765,023 A | * | 6/1998 | Leger et al. | 710/22 |
| 5,835,164 A | * | 11/1998 | Kanai et al. | 348/742 |
| 5,861,879 A | * | 1/1999 | Shimizu et al. | 345/213 |
| 5,880,786 A | * | 3/1999 | Oku et al. | 375/240.15 |
| 5,892,522 A | | 4/1999 | Moutin | |
| 5,910,824 A | | 6/1999 | Yu | |
| 5,995,080 A | * | 11/1999 | Biro et al. | 345/603 |
| 6,028,612 A | | 2/2000 | Balakrishnan et al. | |
| 6,061,094 A | * | 5/2000 | Maietta | 348/446 |
| 6,311,237 B1 | * | 10/2001 | Suzuki et al. | 710/52 |
| 6,359,911 B1 | * | 3/2002 | Movshovich et al. | 370/536 |
| 6,381,254 B1 | * | 4/2002 | Mori et al. | 370/537 |
| 6,388,241 B1 | * | 5/2002 | Ang | 250/208.1 |
| 7,126,992 B2 | | 10/2006 | Chiang et al. | |
| 7,228,550 B1 | * | 6/2007 | Eberhard et al. | 719/312 |
| 2001/0034788 A1 | * | 10/2001 | McTernan et al. | 709/232 |
| 2005/0120173 A1 | * | 6/2005 | Minowa | 711/114 |
| 2006/0114446 A1 | * | 6/2006 | Gui | 355/77 |
| 2007/0226417 A1 | * | 9/2007 | Davis | 711/118 |

FOREIGN PATENT DOCUMENTS

| | | |
|---|---|---|
| JP | 9-172601 | 6/1997 |
| JP | 2002-152756 | 5/2002 |

* cited by examiner

FIG. 11

| | | | | | | | | | | | | | | | | PIXEL |
|---|---|---|---|---|---|---|---|---|---|---|---|---|---|---|---|---|
| | D0 | D1 | D2 | D3 | D4 | D5 | D6 | D7 | D8 | D9 | D10 | D11 | D12 | D13 | D14 | D15 |
| | D16 | D17 | D18 | D19 | D20 | D21 | D22 | D23 | D24 | D25 | D26 | D27 | D28 | D29 | D30 | D31 |
| | D32 | D33 | D34 | D35 | D36 | D37 | D38 | D39 | D40 | D41 | D42 | D43 | D44 | D45 | D46 | D47 |
| | D48 | D49 | D50 | D51 | D52 | D53 | D54 | D55 | D56 | D57 | D58 | D59 | D60 | D61 | D62 | D63 |
| | D64 | D65 | D66 | D67 | D68 | D69 | D70 | D71 | D72 | D73 | D74 | D75 | D76 | D77 | D78 | D79 |
| | D80 | D81 | D82 | D83 | D84 | D85 | D86 | D87 | D88 | D89 | D90 | D91 | D92 | D93 | D94 | D95 |
| | D96 | D97 | D98 | D99 | D100 | D101 | D102 | D103 | D104 | D105 | D106 | D107 | D108 | D109 | D110 | D111 |
| 16 PIXELS | D112 | D113 | D114 | D115 | D116 | D117 | D118 | D119 | D120 | D121 | D122 | D123 | D124 | D125 | D126 | D127 |
| | D128 | D129 | D130 | D131 | D132 | D133 | D134 | D135 | D136 | D137 | D138 | D139 | D140 | D141 | D142 | D143 |
| | D144 | D145 | D146 | D147 | D148 | D149 | D150 | D151 | D152 | D153 | D154 | D155 | D156 | D157 | D158 | D159 |
| | D160 | D161 | D162 | D163 | D164 | D165 | D166 | D167 | D168 | D169 | D170 | D171 | D172 | D173 | D174 | D175 |
| | D176 | D177 | D178 | D179 | D180 | D181 | D182 | D183 | D184 | D185 | D186 | D187 | D188 | D189 | D190 | D191 |
| | D192 | D193 | D194 | D195 | D196 | D197 | D198 | D199 | D200 | D201 | D202 | D203 | D204 | D205 | D206 | D207 |
| | D208 | D209 | D210 | D211 | D212 | D213 | D214 | D215 | D216 | D217 | D218 | D219 | D220 | D221 | D222 | D223 |
| | D224 | D225 | D226 | D227 | D228 | D229 | D230 | D231 | D232 | D233 | D234 | D235 | D236 | D237 | D238 | D239 |
| | D240 | D241 | D242 | D243 | D244 | D245 | D246 | D247 | D248 | D249 | D250 | D251 | D252 | D253 | D254 | D255 |

16 PIXELS

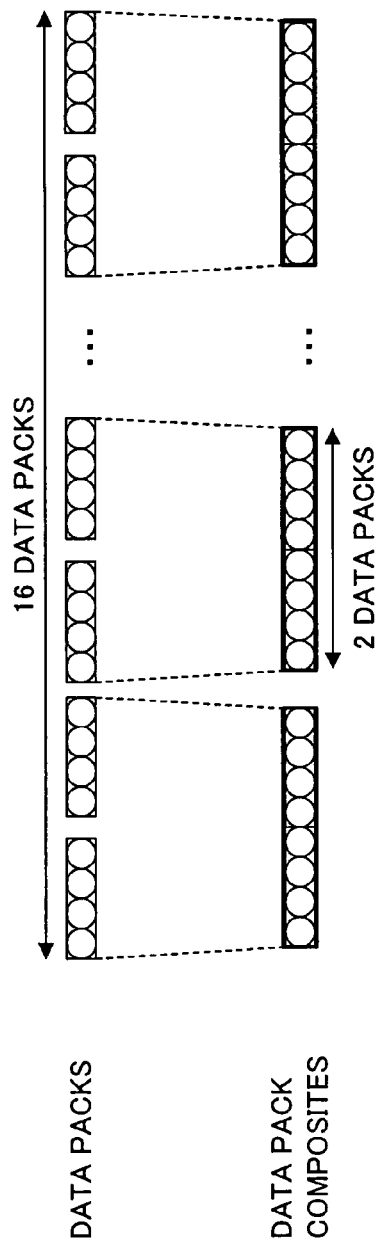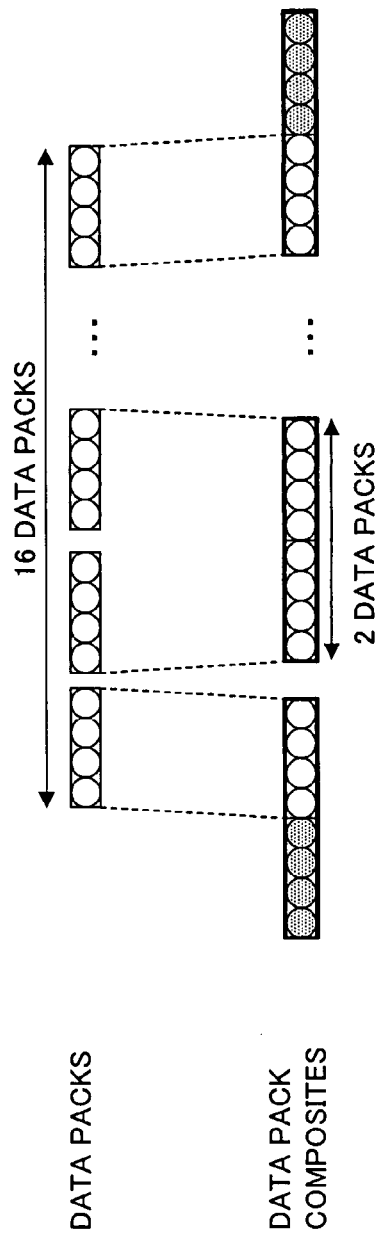

IMAGE DATA TRANSFER METHOD, IMAGE PROCESSING DEVICE, AND IMAGING SYSTEM

CROSS-REFERENCE TO RELATED APPLICATIONS

This application claims priority under 35 U.S.C. §119(a) on Japanese Patent Application No. 2006-113560 filed on Apr. 17, 2006 and Japanese Patent Application No. 2007-75709 filed on Mar. 23, 2007, the entire contents of which are hereby incorporated by reference.

BACKGROUND OF THE INVENTION

The present invention relates to a device for image processing and specifically to a method and device for transferring images.

Techniques for enabling compression of moving picture with high compression rates have been developed and employed in digital cameras and digital video cameras. A generally known moving picture compression scheme is MPEG (Moving Picture Experts Group) standardized by ISO (International Organization for Standardization).

MPEG deals with bit streams obtained as a result of coding which utilizes intraframe correlation on a macroblock by macroblock basis where each macroblock consists of NX (horizontal) by NY (vertical) pixels in an image (Intra-coding) or coding which utilizes interframe correlation (Inter-coding). An image structured only by Intra-coding is called an "I-picture", and an image structured by Intra-coding and Inter-coding in a mixed manner is called a "P-picture" or "B-picture".

MPEG bit streams produced at the time of encoding and MPEG bit streams input at the time of decoding are subjected to various processes, including inverse quantization, inverse DCT, motion compensation, etc., and a resultant reconstructed image is stored in a temporary data storage. The stored image is read out as a reference image.

Now, consider a case where an SDRAM (synchronous dynamic random-access memory) is used as the temporary data storage. In encoding and decoding processes, transfer of reconstructed images and reference images occurs many times in this SDRAM. A generally employed method for the transfer with a high rate is transferring a plurality of pixels at one time through an expanded data bus width of the SDRAM. For example, if the data bus width of the SDRAM is 4 times that of pixel data, data consisting of 16 (horizontal) by 16 (vertical) pixels as shown in FIG. 11 is transferred to the SDRAM on a data pack by data pack basis where each data pack (a unit of data for transfer or "data transfer unit") consists of 4 horizontally consecutive pixels. Namely, data consisting of 4 (horizontal) by 16 (vertical) data packs as shown in FIG. 13 is transferred to the SDRAM on a data pack by data pack basis. In this case, the transfer cycles are reduced to a ¼ of those required for pixel-by-pixel transfer.

Specifically, now consider transfer of the luminance signal of a reconstructed image having the size of one macroblock. FIG. 51 illustrates an example of mapping of data stored in the SDRAM. For example, data packs P0, P1, P2, P3, . . . , P60, . . . , P63 shown in FIG. 13 are transferred to addresses of the SDRAM, SD ($ADX_R$, $ADY_R$), SD ($ADX_{R+1}$, $ADY_R$), SD ($ADX_{R+2}$, $ADY_R$), SD ($ADX_{R+3}$, $ADY_R$), . . . , SD ($ADX_R$, $ADY_{R+15}$), . . . , SD ($ADX_{R+3}$, $ADY_{R+15}$) shown in FIG. 51 as follows.

First, after the row address is set to $ADY_R$, data packs P0 to P3 are transferred. Then, after the row address is set to $ADY_{R+1}$, data packs P4 to P7 are transferred. Then, after the row address is set to $ADY_{R+2}$, data packs P8 to P11 are transferred. Then, data packs P12 to P63 are transferred while the row address is changed in the same way.

An example of a decoding device wherein a line memory is used to reduce transfer of reference images is disclosed in Japanese Laid-Open Patent Publication No. 2002-152756.

Transfer of data packs P0 to P7 of FIG. 13 is more specifically described. FIG. 52 is a timing chart for the SDRAM in writing of data packs as in FIG. 51. It is assumed herein that the burst length (BL) of the SDRAM is 4.

First, row address $ADY_R$ is set at time t0 ("act" command), column address $ADX_R$ is set at time t1 ("write" command), and data packs P0 to P3 are continuously written.

Then, the SDRAM executes "pre" command at time t5 for switching the row address and then sets the next row address $ADY_{R+1}$ at time t6 ("act" command). At time t7, column address $ADX_{R+1}$ is set ("write" command), and data packs P4 to P7 are continuously written. Hereinafter, the same procedure is repeated.

Herein, the time required for transferring a line of the reconstructed image between the current "act" command and the next "act" command is 8 cycles. Only 4 out of 8 cycles are used for the data transfer process, while the other cycles are consumed for the address setting process. Namely, every data transfer of 4 data packs entails address setting which consumes 4 cycles. This is quite inefficient.

Next, reading of a reference image is described. FIG. 53 is a timing chart for the SDRAM in reading of data packs stored as shown in FIG. 51. In an instance described herein, the reference image to be read has one macroblock size, i.e., consists of 4 (horizontal) by 16 (vertical) data packs. This read process consumes 8 cycles for transfer of 4 data packs, and 4 out of 8 cycles are used for the address setting process.

FIG. 54 schematically illustrates transfer of 17 pixels. The reference image sometimes consists of 17 (horizontal) by 17 (vertical) pixels. Since every 4 horizontally consecutive pixels constitute a single data pack, transfer of one row, i.e., transfer of 17 pixels, requires 5 data packs. For example, in the case where the 4n-th pixel subsequent to the leftmost pixel included in data P0 of reconstructed image R0 (n is an integer) is selected as the start position of the read operation, reading of 5 data packs is enough for obtaining all the information of 17 pixels (see FIG. 54A) Likewise, in the case where the (4n+1)th, (4n+2)th or (4n+3)th pixel subsequent to the leftmost pixel is selected as the start position of the read operation, reading of 5 data packs is enough for obtaining all the information of 17 pixels (see FIGS. 54B, 54C and 54D, respectively).

FIG. 55 is a timing chart for the SDRAM for reading of data packs stored as shown in FIG. 51 where the reference image consists of 17 (horizontal) by 17 (vertical) pixels. Since vertically-aligned pixels do not constitute a data pack, reading of data of 17 lines is enough for obtaining information of 17 vertically-aligned pixels. Thus, 5 (horizontal) by 17 (vertical) data packs are read out.

Herein, the burst length (BL) of the SDRAM is 4, and therefore, a single "read" command only enables reading of 4 data packs. Thus, a "read" command is executed again at time t4 for enabling reading of 5 consecutive data packs from a region of the same row address, and at time t5, a "pre" command is executed for changing the row address.

As seen from the above, the transfer of the reference image also requires address setting as many times as the number of lines, which is quite inefficient as is the transfer of a reconstructed image. The number of read/write transfer cycles is calculated by the following operation:

(Number of accesses to same row address of
SDRAM+Number of cycles for address setting
of SDRAM)×Number of changes of row address
of SDRAM    (C1)

Of these cycles, the number of cycles required for address setting of the SDRAM is:

Number of cycles for address setting of SDRAM×
Number of changes of row address of SDRAM    (C2)

As to the SDRAM used herein, it is understood from FIG. 52 (writing) and FIG. 53 (reading) that "number of cycles for address setting of SDRAM"=4 cycles. Since for each macroblock "number of accesses to same row address of SDRAM"=4 and "number of changes of row address of SDRAM"=16, the number of cycles for writing a reconstructed image of one macroblock is (4+4)×16=128. It is thus understood that 2 (=128/64) cycles are necessary for transfer of one data pack.

Now, consider transfer of a color difference signal of 4:2:0 format in the same way. The luminance signal for one macroblock consists of 16 (horizontal) by 16 (vertical) pixels, and accordingly, the blue color difference signal and red color difference signal each consists of 8 (horizontal) by 8 (vertical) pixels for one macroblock. In the case where every 4 horizontally consecutive pixels constitute a data pack, the number of data packs for one of the color difference signals is 2 (horizontal) by 8 (vertical) data packs. With "number of accesses to same row address of SDRAM"=2 and "number of changes of row address of SDRAM"=8, the number of transfer cycles is calculated using formula (C1), resulting in (2+4)×8=48 cycles. Transfer of both of the color difference signals requires 96 cycles (=48×2). Thus, it is understood that transfer of 1 data pack requires 3(=96/32) cycles.

These periods increase relative to the frame size. For example, an image of HD (high definition) size has 2,073,600 pixels for one frame and, therefore, when 60 frames are processed in every second, the total number of pixels to be processed is 124,416,000 (=2,073,600×60) pixels per second. To achieve high-speed transfer, with the above-described data packing (4 pixels constituting one data pack), the number of access data packs to the SDRAM is 31,104,000 (=124,416,000/4) data packs.

Now, consider transfer of such data packs to the SDRAM. Assuming a system where the number of transfer macroblocks of each of a reconstructed image and a reference image is one for one macroblock, data packs to be transferred is as much as a total of 62,208,000 (=31,104,000×2) data packs per second. Since the SDRAM access cycle of the luminance signal is "one data pack=2 cycles", transfer of the whole luminance signal of one second requires 124,416,000 (=62,208,000×2) cycles. A half of these cycles are consumed by address setting of the SDRAM.

Calculation of transfer of the color difference signal is now described. The amount of information of color difference signal of 4:2:0 format (blue color difference signal+red color difference signal) is a half of the amount of information of the luminance signal, and therefore, the number of data packs which are to be transferred to the SDRAM is 31,104,000 (=62,208,000/2) per second. Since the SDRAM access cycle of the color difference signal is "one data pack=3 cycles", transfer of the whole color difference signal of one second requires 93,312,000 (=31,104,000×3) cycles. A ⅔ of these cycles are consumed by address setting of the SDRAM.

Thus, the total of luminance signal and two color difference signals requires 217,728,000 cycles per second. Of these cycles, 124,416,000 cycles are used for address setting of the SDRAM. This is quite inefficient transfer. As a matter of course, high speed transfer requires a high speed operation of the SDRAM and hence entails large power consumption.

FIG. 56 shows an example of mapping of data stored in the SDRAM where fields of the data are allocated to different regions of the SDRAM. In the interlace process, a macroblock is divided into two fields, the top field consisting of pixels of odd-numbered lines (P0, P1, P2, P3, P8, P9, P10, P11, . . . , P59) and the bottom field consisting of pixels of even-numbered lines (P4, P5, P6, P7, P12, P13, P14, P15, . . . , P63) as illustrated in FIG. 26.

In many cases, the both fields are stored in the SDRAM such that the top field and the bottom field are stored in different regions of the SDRAM as illustrated in FIG. 56. This is because, in an operation of reading from the SDRAM (transfer of the reference image), a transfer request is issued for every field, and in such a case, mixture. of data of both fields inhibits highly efficient transfer.

As for the example of FIG. 56, the number of cycles required for transfer is calculated using formula (C1). Since for each macroblock "number of accesses to same row address of SDRAM"=4 and "number of changes of row address of SDRAM"=8, (4+4)×8=64 cycles are necessary for each macroblock, and hence, 128(=64×2) cycles are necessary for the total of both fields. Thus, 2(=128/64) cycles are necessary for transfer of one data pack. This transfer is inefficient as is the progressive process illustrated in FIG. 51.

SUMMARY OF THE INVENTION

An objective of the present invention is to improve the data transfer efficiency of image data between an image processing device and an image data storage memory, or the like.

An image data transfer method of the present invention includes the steps of: (a) reading pixel data of a two-dimensional image stored in a first image storage and having a plurality of pixels, the position of each of the pixels being represented by coordinates of first and second directions, the pixel data being read by scanning data transfer units of the pixel data in the second direction where each of the data transfer units is formed by data of a predetermined number of pixels consecutive in the first direction; (b) writing the data transfer units read at step (a) in a temporary data storage where data is stored at a position designated by a combination of first and second addresses, the data transfer units being written in burst mode in a region of the temporary data storage in which the first addresses are consecutive while the second address is fixed; and (c) reading the data transfer units written in the temporary data storage from the region in which the first addresses are consecutive while the second address is fixed in burst mode and writing the read data transfer units in a second image storage.

With the above method, as for the first direction, the number of data transfer units is smaller than the number of pixels whereas it is equal as for the second direction. Since data transfer units read by scanning in the second direction are subjected to burst writing and burst reading, the data transfer efficiency in transfer of data to and from the temporary data storage is improved, resulting in faster data transfer.

Another image data transfer method of the present invention is an image data transfer method used in image processing which requires a temporary memory region, characterized in that the image processing is performed on an image which is a process unit having a DX by DY data transfer units, where DX is a natural number representing the number of data transfer units in a line extending in the first direction and DY is a natural number representing the number of data transfer units in a line extending in the second direction, in such a manner that: if DX≧DY, the image is scanned in the first direction to write the data transfer units in burst mode on a DX by DX basis in consecutive addresses of the temporary memory region; and if DX<DY, the image is scanned in the second direction to write the data transfer units in burst mode on a DY by DY basis in consecutive addresses of the temporary memory region.

With the above method, an image is scanned in one of the first and second directions in which the number of data transfer units is greater, and the data transfer units are written in burst mode. Therefore, the speed of data transfer is increased irrespective of the shape of a region on an image which is occupied by the data transfer units or the aspect ratio of an image.

An image processing device of the present invention includes: a first read section for reading pixel data of a two-dimensional image stored in a first image storage and having a plurality of pixels, the position of each of the pixels being represented by coordinates of first and second directions, the pixel data being read by scanning data transfer units of the pixel data in the second direction where each of the data transfer units is formed by data of a predetermined number of pixels consecutive in the first direction, and writing the read data transfer units in a temporary data storage where data is stored at a position designated by a combination of first and second addresses, the data transfer units being written in burst mode in a region of the temporary data storage in which the first addresses are consecutive while the second address is fixed; and a first write section for reading the data transfer units written in the temporary data storage from the region in which the first addresses are consecutive while the second address is fixed in burst mode and writing the read data transfer units in a second image storage.

An imaging system of the present invention includes: an analog/digital converter for converting an analog image signal to a digital signal; and an image processing device for performing image processing on the digital signal, wherein the image processing device includes a read section for reading pixel data of a two-dimensional image subjected to the image processing and stored in a first image storage and having a plurality of pixels, the position of each of the pixels being represented by coordinates of first and second directions, the pixel data being read by scanning data transfer units of the pixel data in the second direction where each of the data transfer units is formed by data of a predetermined number of pixels consecutive in the first direction, and writing the read data transfer units in a temporary data storage where data is stored at a position designated by a combination of first and second addresses, the data transfer units being written in burst mode in a region of the temporary data storage in which the first addresses are consecutive while the second address is fixed, and a write section for reading the data transfer units written in the temporary data storage from the region in which the first addresses are consecutive while the second address is fixed in burst mode and writing the read data transfer units in a second image storage.

As described above, according to the present invention, faster data transfer is achieved between an image storage and a temporary data storage. Thus, faster image processing is realized with a burst-transferable memory, such as a SDRAM, or the like, used as the temporary data storage.

BRIEF DESCRIPTION OF THE DRAWINGS

FIG. 11 illustrates pixel data (luminance signal) of one macroblock of a reconstructed image stored in the reconstructed image storage of FIG. 1.

FIG. 49A illustrates the relationship between data packs and data pack composites where the leading end positions of the data packs and data pack composites are coincident with each other. FIG. 49B illustrates the relationship between data packs and data pack composites where the leading end positions of the data packs and data pack composites are not coincident with each other.

DESCRIPTION OF THE PREFERRED EMBODIMENTS

Figure 1:
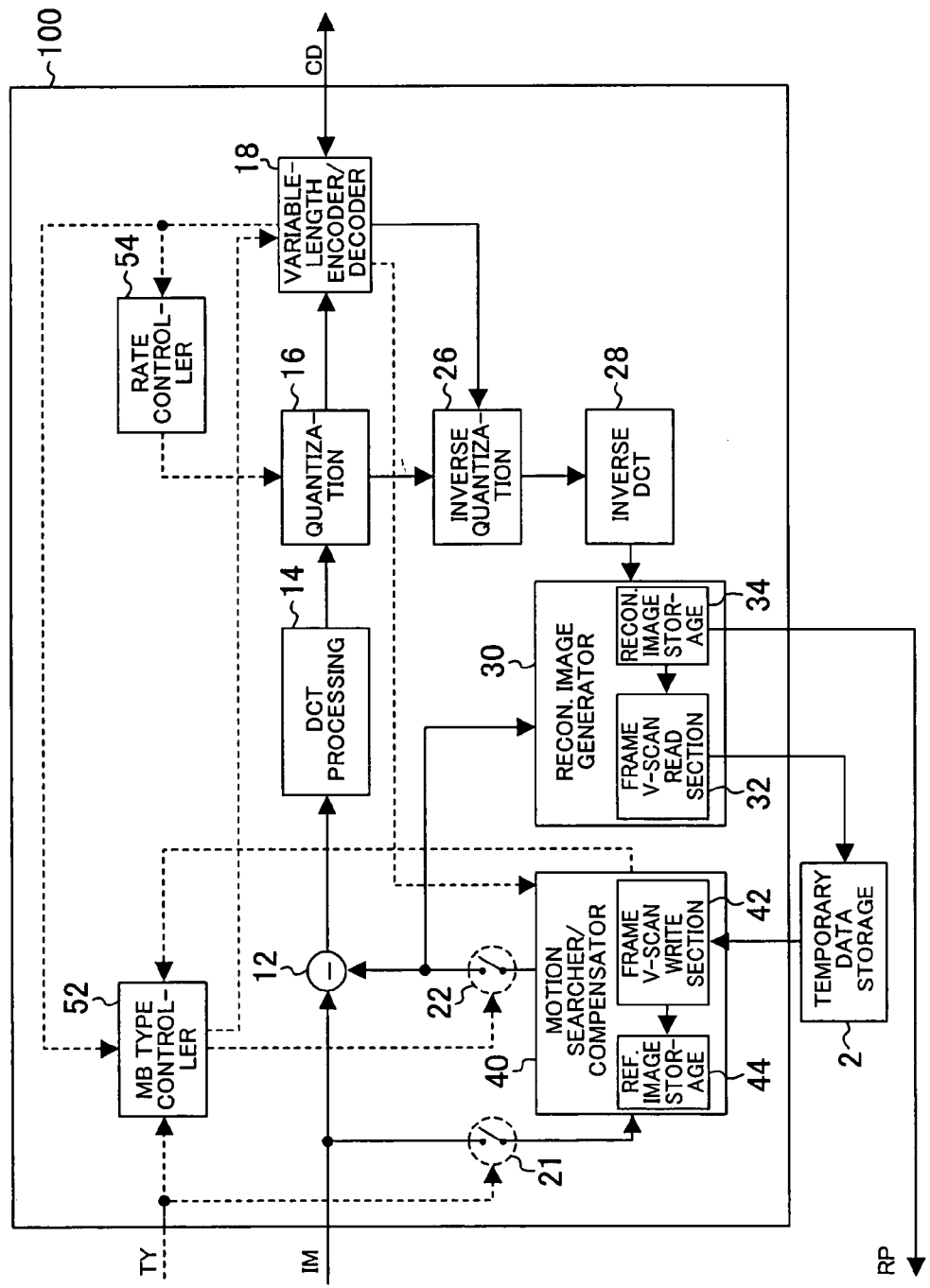
FIG. 1 is a block diagram showing a structure of an image processing device according to embodiment 1 of the present invention.

Hereinafter, embodiments of the present invention will be described with reference to the drawings, in which like elements are indicated by like reference numerals.

Embodiment 1

FIG. 1 is a block diagram showing a structure of an image processing device according to embodiment 1 of the present invention. This image processing device provides improved transfer efficiency of frame pictures.

The image processing device 100 of FIG. 1 includes a subtractor 12, a DCT (discrete cosine transform) processing section 14, a quantization section 16, a variable-length encoder/decoder 18, switches 21 and 22, an inverse quantization section 26, an inverse DCT processing section 28, a reconstructed image generator 30, a motion searcher/compensator 40, a macroblock (MB) type controller 52, and a rate controller 54. The reconstructed image generator 30 includes a frame vertical scan read section 32 and a reconstructed image storage (first image storage) 34. The motion searcher/compensator 40 includes a frame vertical scan write section 42 and a reference image storage (second image storage) 44.

The frame vertical scan read section 32 reads data from the reconstructed image storage 34 and writes the read data in the temporary data storage 2. The frame vertical scan write section 42 reads data from the temporary data storage 2 and writes the read data in the reference image storage 44. In the example described herein, the temporary data storage 2 is an SDRAM (synchronous dynamic random-access memory). It is assumed hereinafter that the burst length (BL) of the SDRAM is 4. The reconstructed image storage 34 and the reference image storage 44 are realized by, for example, an SRAM (static random-access memory) or a flip flop.

In Encoding

The operation of the image processing device 100 in encoding is described. Image encoding type signal TY indicative of the image encoding type of an encode target image (I-picture, P-picture, or B-picture) is input to the switch 21 and the MB type controller 52.

If image encoding type signal TY indicates that the image encoding type is I-picture, the switch 21 is OFF (not conductive). If image encoding type signal TY indicates that the image encoding type is P-picture or B-picture, the switch 21 is ON (conductive).

The MB type controller 52 controls the switch 22 according to image encoding type signal TY and a signal from the motion searcher/compensator 40. Specifically, if image encoding type signal TY indicates that the image encoding type is I-picture, the MB type controller 52 turns the switch 22 OFF. If image encoding type signal TY indicates that the image encoding type is P-picture or B-picture, the MB type controller 52 determines the encoding type of a macroblock to be Intra-coding or Inter-coding according to the result of motion search output from the motion searcher/compensator 40.

If the coding type is Intra-coding, the switch 22 is OFF. If the coding type is Inter-coding, the switch 22 is ON. The MB type controller 52 also outputs the coding type of the macroblock to the variable-length encoder/decoder 18. The rate controller 54 monitors the amount of codes produced by the variable-length encoder/decoder 18 to determine the quantization parameters according to the amount of codes, and outputs the determined quantization parameters to the quantization section 16.

Generation of I-picture is now described. If the image encoding type indicated by image encoding type signal TY is I-picture, the switches 21 and 22 are OFF. Encoding target image IM is input to the subtractor 12 for each macroblock. Since the switch 22 is OFF, the subtractor 12 outputs encoding target image IM as it is to the DCT processing section 14.

The DCT processing section 14 performs a DCT process on the output data of the subtractor 12 and outputs the result of the DCT process to the quantization section 16. The quantization section 16 performs a quantization process on the DCT-processed data and outputs the result of the quantization process to the variable-length encoder/decoder 18 and the inverse quantization section 26. The variable-length encoder/decoder 18 performs a variable-length encoding process on the quantized data and outputs resultant code CD to an external device.

The inverse quantization section 26 performs an inverse quantization process on quantized data received from the quantization section 16 and outputs the result of the inverse quantization process to the inverse DCT processing section 28. The inverse DCT processing section 28 performs an inverse DCT process on the inverse-quantized data and outputs the result of the inverse DCT process to the reconstructed image generator 30.

Since the switch 22 is OFF, the output of the motion searcher/compensator 40 is not supplied to the reconstructed image generator 30. Thus, the reconstructed image generator 30 writes in the reconstructed image storage 34 the data transmitted from the inverse DCT processing section 28 as it is. Thereafter, the frame vertical scan read section 32 reads the data of the reconstructed image storage 34 and stores the data in the temporary data storage 2. The image data stored in the reconstructed image storage 34 and then transmitted to the temporary data storage 2 is referred to as "reconstructed image", which is used as a reference image for encoding of P-picture or B-picture.

Generation of P-picture is now described. If the image encoding type indicated by image encoding type signal TY is P-picture, the switch 21 is ON. Encoding target image IM is input to the subtractor 12 and the motion searcher/compensator 40 for each macroblock.

Figure 2:
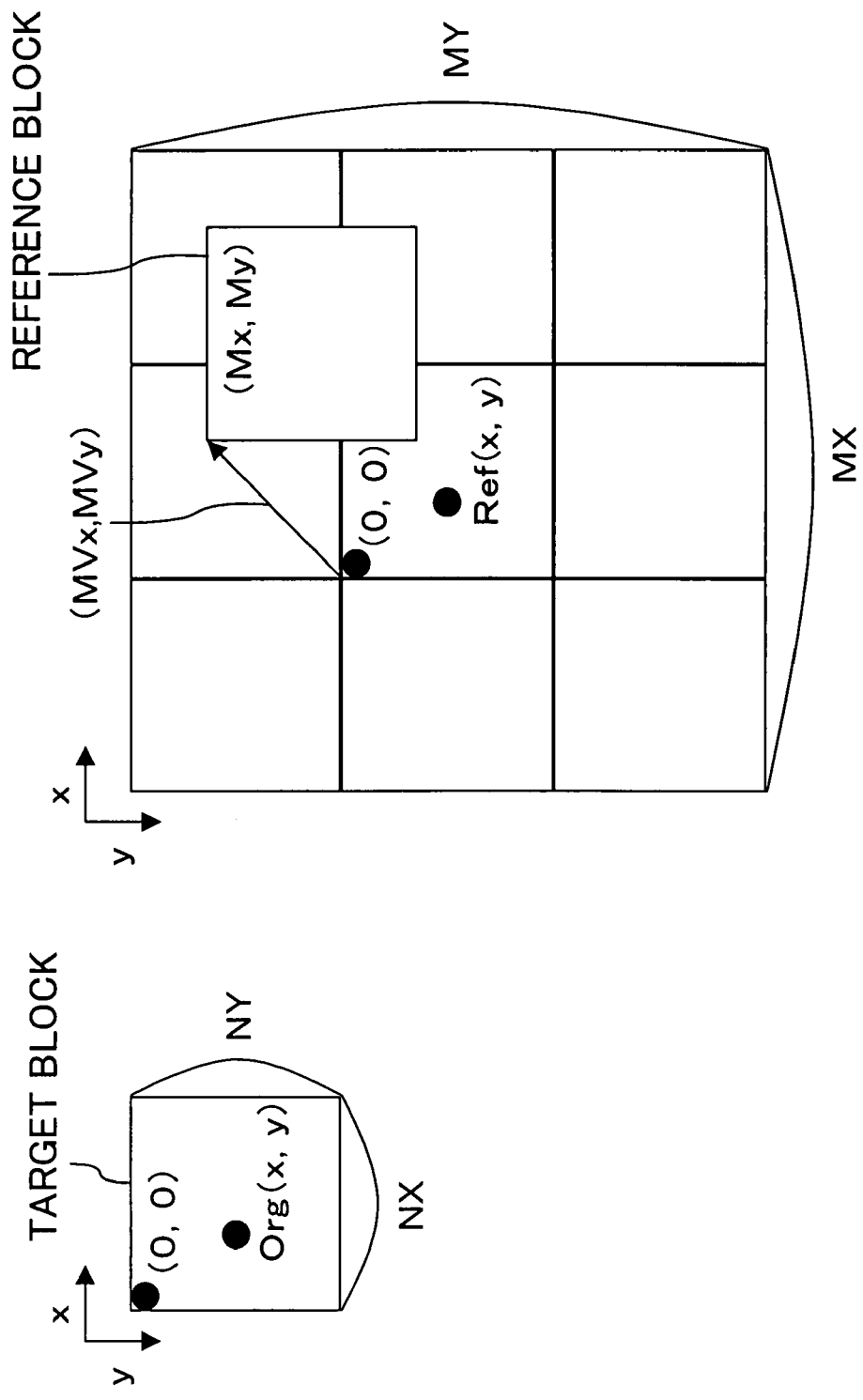
FIG. 2 illustrates motion search.

FIG. 2 illustrates motion search. The frame vertical scan write section 42 reads an image coincident with input encoding target image IM (target block) and images around the coincident image from the temporary data storage 2 and stores the read images in the reference image storage 44. The region of the read pixels is referred to as "reference region". Encoding target image IM has NX (horizontal) by NY (vertical) pixels (NX and NY are natural numbers), and the reference region (MX (horizontal) by MY (vertical) pixels) is larger than encoding target image IM (MX and MY are integers which satisfy MX>NX and MY>NY, respectively). The motion searcher/compensator 40 uses encoding target image IM and a reference block (NX (horizontal) by NY (vertical) pixels) on the reference region to perform a motion search.

One of the generally-employed motion search methods is block matching. Block matching is such a scheme that a target block is compared with reference blocks of a reference region to determine the position of a reference block of the most probable match, and the difference in coordinates between the matching reference block and the target block is detected as a motion vector.

Block matching of a target block and reference blocks is carried out by locating a reference block where the evaluation function, which is the sum of absolute values of differences in pixel value of pixels constituting the blocks, i.e.:

$$(\text{Evaluation Function}) = \Sigma |\text{Ref}(Mx+x, My+y) - \text{Org}(x,y)| \quad (1)$$

exhibits the minimum value. Herein, Ref(Mx+x,My+y) represents the pixel value at position (Mx+x,My+y) in the reference block which exists at a relative position (Mx,My) to the target block. Org(x,y) represents the pixel value at position (x,y) in the target block.

The motion searcher/compensator 40 calculates the minimum value of the evaluation function and outputs the calculated minimum value to the MB type controller 52. The MB type controller 52 determines the coding type of the macroblock to be Intra-coding or Inter-coding according to the minimum value of the evaluation function and outputs the result of the determination to the variable-length encoder/decoder 18 and the switch 22. The variable-length encoder/decoder 18 generates and outputs a code indicative of the coding type of the macroblock.

If the coding type is determined to be Intra-coding, the switch 22 is OFF. The subsequent procedure of the process is the same as that of generation of I-picture. If the coding type is determined to be Inter-coding, the motion searcher/compensator 40 generates a motion-compensated image. This motion-compensated image refers to a reference block which has been determined to have the minimum evaluation function value through the above-described motion search process. In the case of Inter-coding, the switch 22 is ON, and the motion searcher/compensator 40 outputs the resultant motion-compensated image to the subtractor 12 via the switch 22. The subtractor 12 subtracts the motion-compensated image from externally-input encoding target image IM and outputs the result of the subtraction to the DCT processing section 14.

If the switch 22 is ON (Inter-coding), the reconstructed image generator 30 adds together an image processed by the DCT processing section 14, quantization section 16, inverse quantization section 26, and inverse DCT processing section 28 and the motion-compensated image output from the motion searcher/compensator 40, and writes the result of the addition in the reconstructed image storage 34. If the switch 22 is OFF (Intra-coding), the reconstructed image generator 30 writes in the reconstructed image storage 34 an image output from the inverse DCT processing section 28 as it is.

Thereafter, the frame vertical scan read section 32 reads the data of the reconstructed image storage 34 and writes the read reconstructed image in the temporary data storage 2. The other aspects are substantially the same as those of generation of I-picture.

Figure 3:
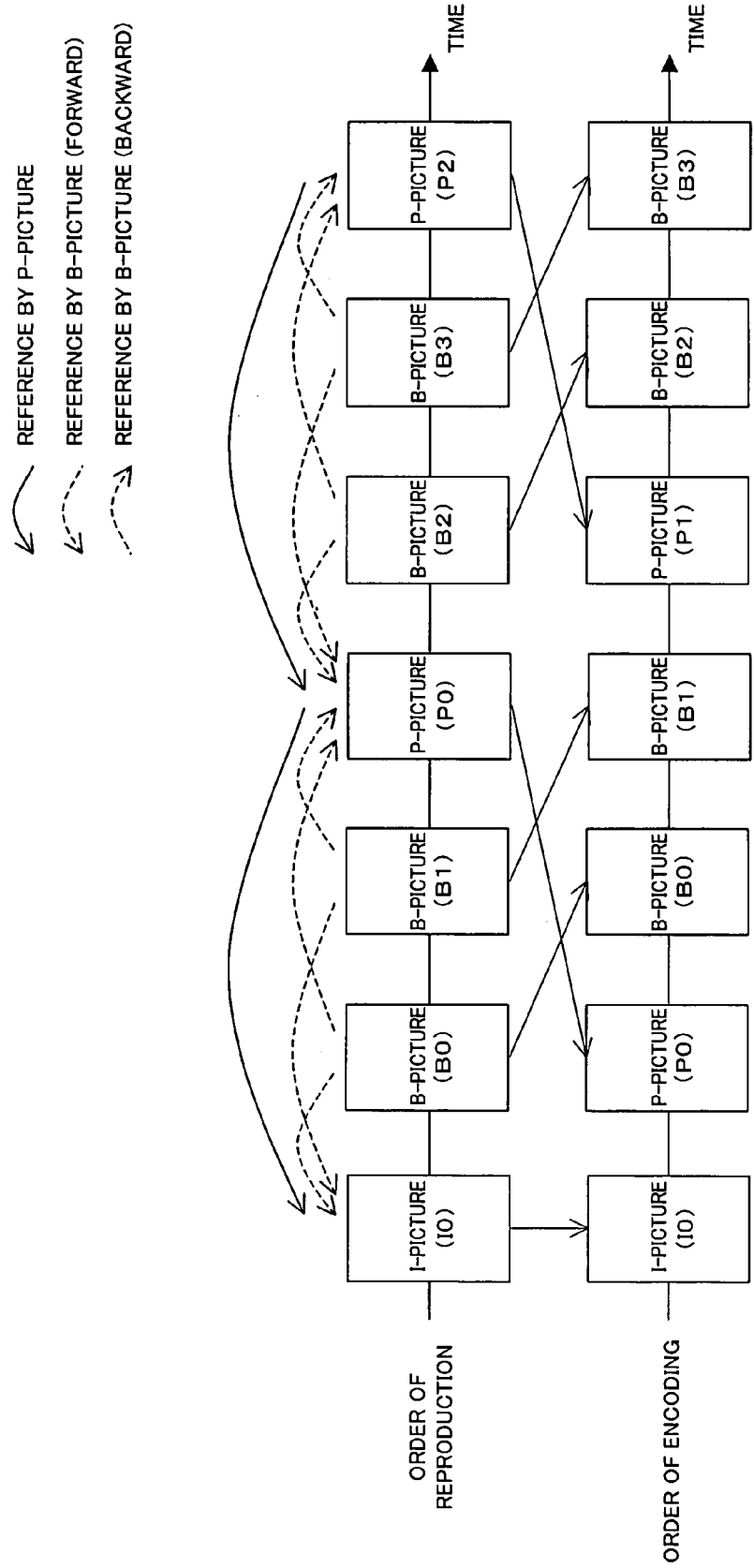
FIG. 3 illustrates reference to pictures in generation of P-picture and B-picture.

Generation of B-picture is now described. FIG. 3 illustrates reference to pictures in generation of P-picture and B-picture. In generation of P-picture, a chronologically preceding I-picture or P-picture is used as a reference region (forward reference region). In generation of B-picture, a chronologically subsequent I-picture or P-picture is used as a reference region (backward reference region) in addition to using a chronologically preceding I-picture or P-picture as a reference region (forward reference region). Thus, an I-picture or P-picture used as the backward reference region of a B-picture need to be encoded prior to the B-picture (see FIG. 3). Therefore, the motion searcher/compensator 40 of FIG. 1 need to read not only the forward reference region but also the backward reference region from the temporary data storage 2.

Since a reconstructed image produced in generation of B-picture is not used as a reference image for other images, generation of B-picture is not accompanied by a production process of a reconstructed image by the inverse quantization section 26, the inverse DCT processing section 28, and the reconstructed image generator 30. The other aspects are substantially the same as those of generation of P-picture.

In Decoding

In decoding, the variable-length encoder/decoder 18 encodes input code CD, in which the image encoding type (I-picture, P-picture, B-picture) and macroblock type (Intra/Inter-coding) are obtained and transmitted to the MB type controller 52.

The MB type controller 52 controls the switch 22 according to the frame type and macroblock type transmitted from the variable-length encoder/decoder 18. Specifically, if the frame type is I-picture, or if the frame type is P-picture or B-picture and the macroblock type is Intra-coding, the switch 22 is OFF. If the frame type is P-picture or B-picture and the macroblock type is Inter-coding, the switch 22 is ON.

In decoding of I-picture, the reconstructed image generator 30 writes in the reconstructed image storage 34 data processed by the variable-length encoder/decoder 18, the inverse quantization section 26, and the inverse DCT processing section 28. The reconstructed image generator 30 outputs the data stored in the reconstructed image storage 34 as reproduced picture RP to an external device. The frame vertical scan read section 32 reads the data of the reconstructed image storage 34 and stores the read data in the temporary data storage 2. The data of the temporary data storage 2 is used as a reference image for decoding of P-picture or B-picture.

Decoding of P-picture is now described. The variable-length encoder/decoder 18 outputs motion vector information obtained by decoding code CD to the motion searcher/compensator 40. The motion searcher/compensator 40 reads a reference image from the temporary data storage 2 to perform motion compensation on the reference image based on the motion vector information, and outputs the result of the motion compensation to the switch 22.

If the switch 22 is ON (Inter-coding), the reconstructed image generator 30 adds together an image processed by the variable-length encoder/decoder 18, the inverse quantization section 26, and the inverse DCT processing section 28 and the motion-compensated image output from the motion searcher/compensator 40, and writes the result of the addition in the reconstructed image storage 34. If the switch 22 is OFF (Intra-coding), the reconstructed image generator 30 writes in the reconstructed image storage 34 an image output from the inverse DCT processing section 28 as it is.

As in the case of I-picture, the reconstructed image generator 30 outputs the data stored in the reconstructed image storage 34 as reproduced picture RP to an external device. The frame vertical scan read section 32 reads the data of the reconstructed image storage 34 and stores the read data in the temporary data storage 2. The data of the temporary data storage 2 is used as a reference image for decoding of P-picture or B-picture.

In the case of decoding of B-picture, a chronologically subsequent I-picture or P-picture is used as a reference region in addition to using a chronologically preceding I-picture or P-picture as a reference region, while a generation process of a reconstructed image is not performed. The other aspects are substantially the same as those of decoding of P-picture.

Transfer of Reconstructed Image

Figure 4:
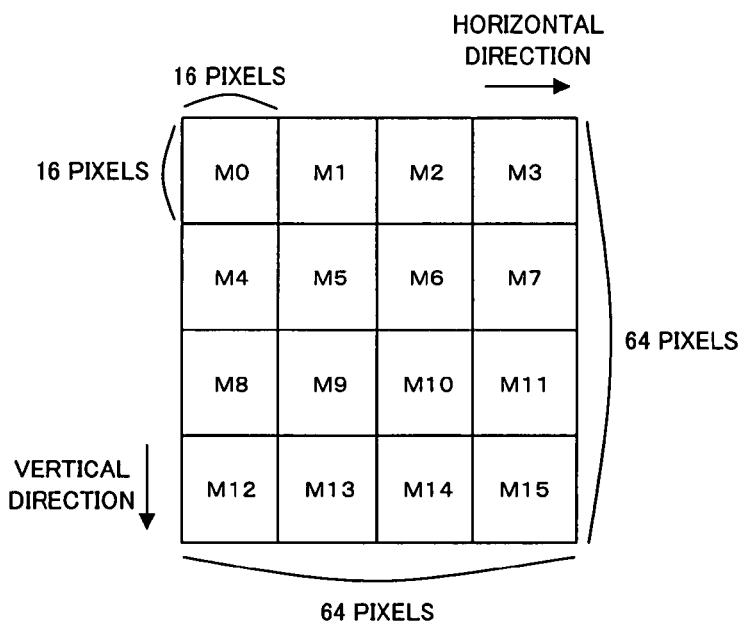
FIG. 4 shows an example of an image subjected to an encoding process.

FIG. 4 shows an example of an image subjected to an encoding process. The image of FIG. 4 has 64 (horizontal) by 64 (vertical) pixels, the position of each pixel being represented by horizontal and vertical coordinates. Assuming that the size of a macroblock is 16 (horizontal) by 16 (vertical) pixels, the image of FIG. 4 has 16 (4 horizontal by 4 vertical) macroblocks M0, M1, . . . and M15. The encoding process is carried out on a macroblock by macroblock basis in the order of macroblocks M0, M1, . . . and M15. Reconstructed images R0, R1, . . . and R15, corresponding to macroblocks M0, M1, . . . and M15, are generated. The reconstructed images are generated in the order of R0, R1, . . . and R15, and stored in the reconstructed image storage 34.

Figure 5:
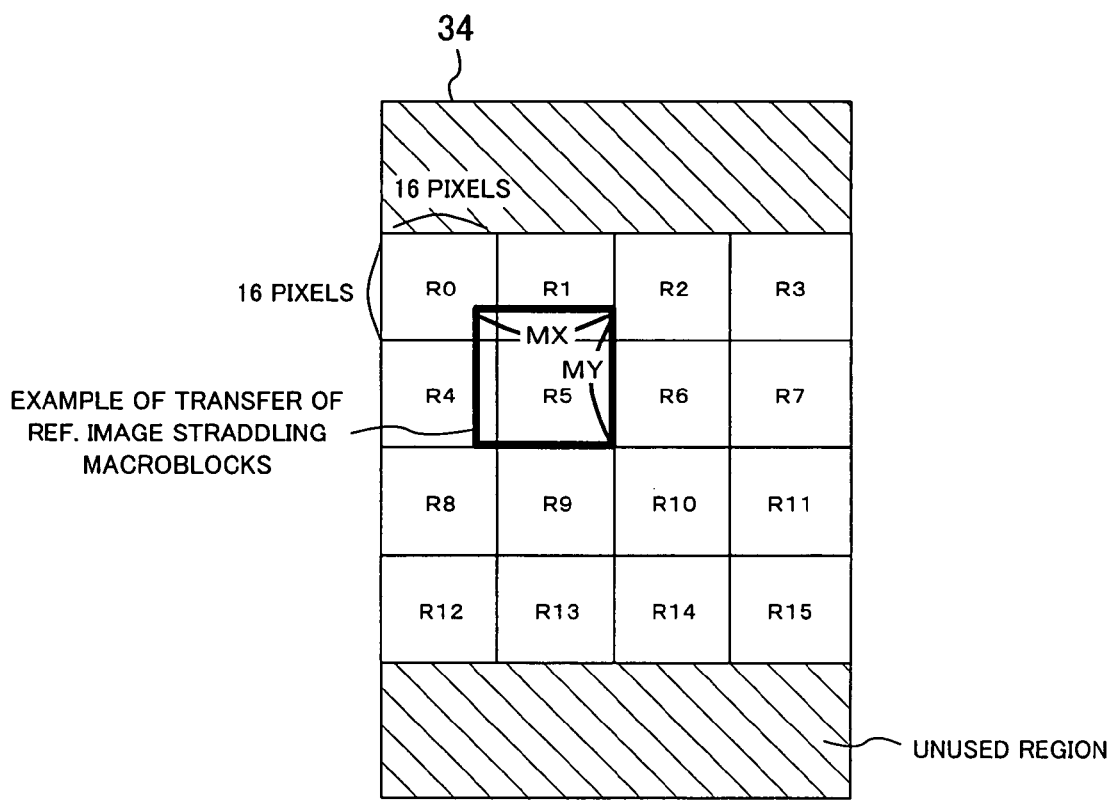
FIG. 5 shows a reconstructed image in a reconstructed image storage of FIG. 1.

FIG. 5 shows a reconstructed image in the reconstructed image storage 34 of FIG. 1. Reconstructed images R0 to R15 are stored in the reconstructed image storage 34 without marring the relationships between pixels in a frame such that an image of the whole frame of 64 (horizontal) by 64 (vertical) pixels is reproduced in the reconstructed image storage 34. This is because there is a case where transfer of a reference image straddling macroblocks is necessary, and in such a case, easy extraction of a reference image is required.

Figure 6:
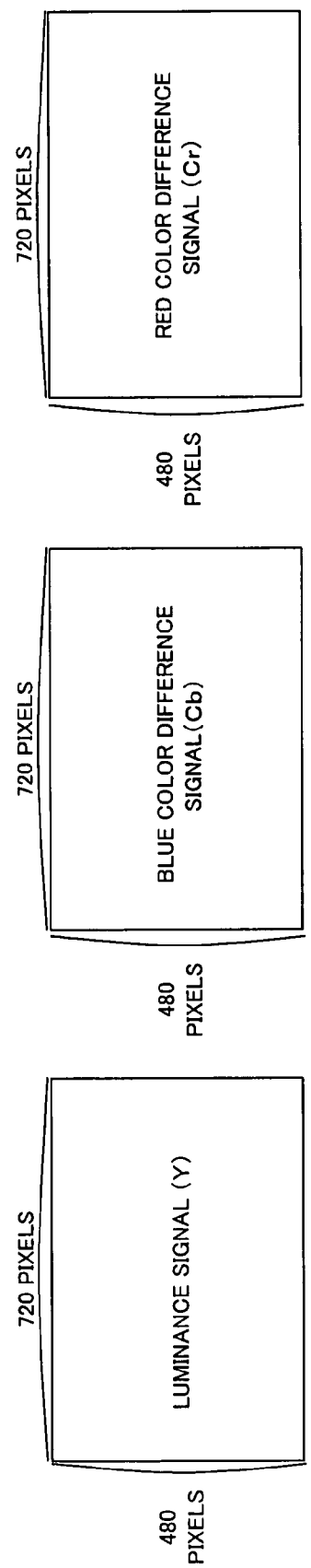
FIG. 6 illustrates an example of the luminance signal and color difference signals (4:4:4 format).

FIG. 6 illustrates an example of the luminance signal and color difference signals (4:4:4 format). A reconstructed image has three signals, i.e., one luminance signal (Y) and two color difference signals (blue color difference signal (Cb) and red color difference signal (Cr)). In the case of 4:4:4 format, the three signals have equal information amounts as shown in FIG. 6.

Figure 7:
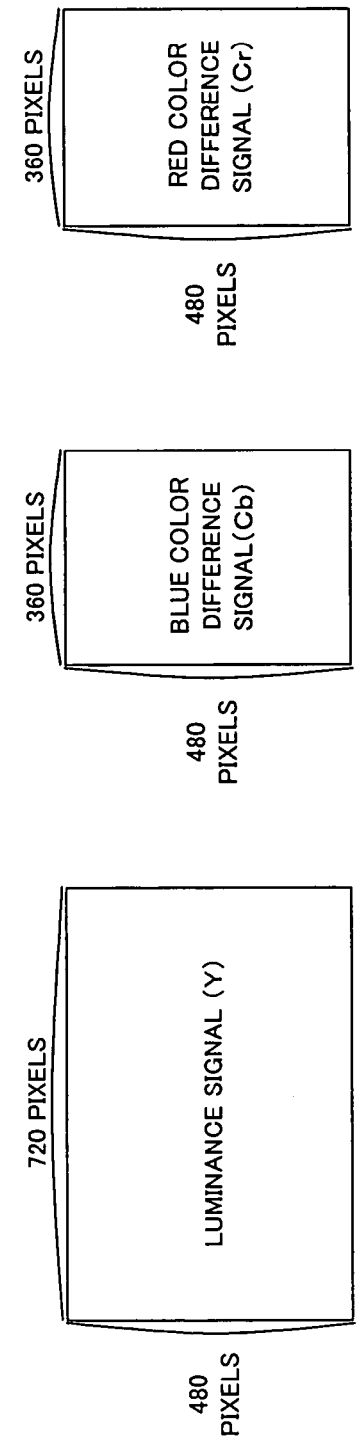
FIG. 7 illustrates an example of the luminance signal and color difference signals (4:2:2 format).

FIG. 7 illustrates an example of the luminance signal and color difference signals (4:2:2 format). Since human eyes are sensitive to the brightness but not so sensitive to colors, the information amount of the color different signal is set smaller than that of the luminance signal in some cases. For example, NTSC (national television system committee) standards provide that the luminance signal has 720 (horizontal) by 480 (vertical) pixels per frame, while the blue color difference signal and red color difference signal are each thinned by horizontal subsampling to have 360 (horizontal) by 480 (vertical) pixels per frame (FIG. 7). The number of pixels in each of the blue color difference signal and red color difference signal is a half of that of the luminance signal.

Figure 8:
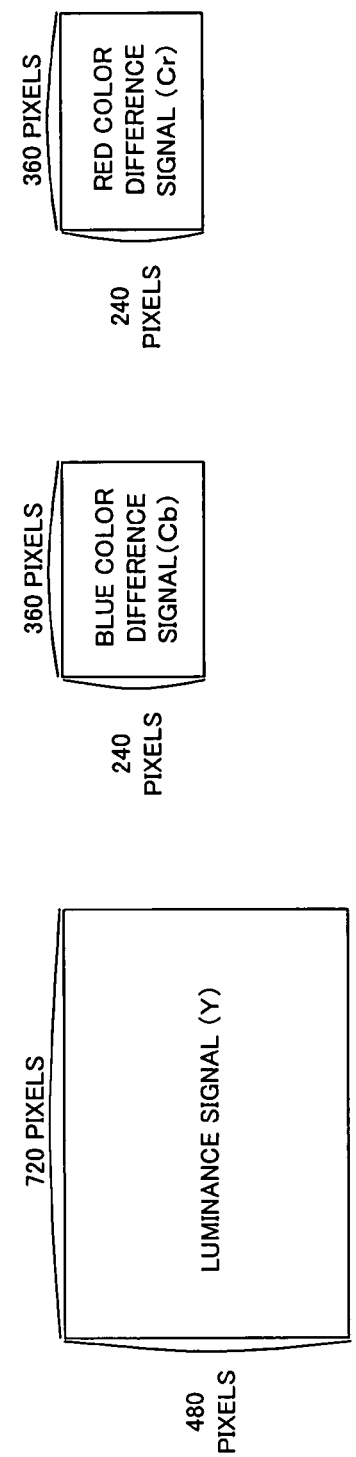
FIG. 8 illustrates an example of the luminance signal and color difference signals (4:2:0 format).

FIG. 8 illustrates an example of the luminance signal and color difference signals (4:2:0 format). In the case of 4:2:0 format, the luminance signal has 720 (horizontal) by 480 (vertical) pixels per frame, while the blue color difference signal and red color difference signal are each thinned by horizontal and vertical subsampling to have 360 (horizontal) by 240 (vertical) pixels per frame. In this case, the number of pixels in each of the blue color difference signal and red color difference signal is a ¼ of that of the luminance signal. In any of the cases of FIG. 6 to FIG. 8, the luminance signal, blue color difference signal, and red color difference signal of a reconstructed image are stored in different regions of the temporary data storage 2.

Figure 9:
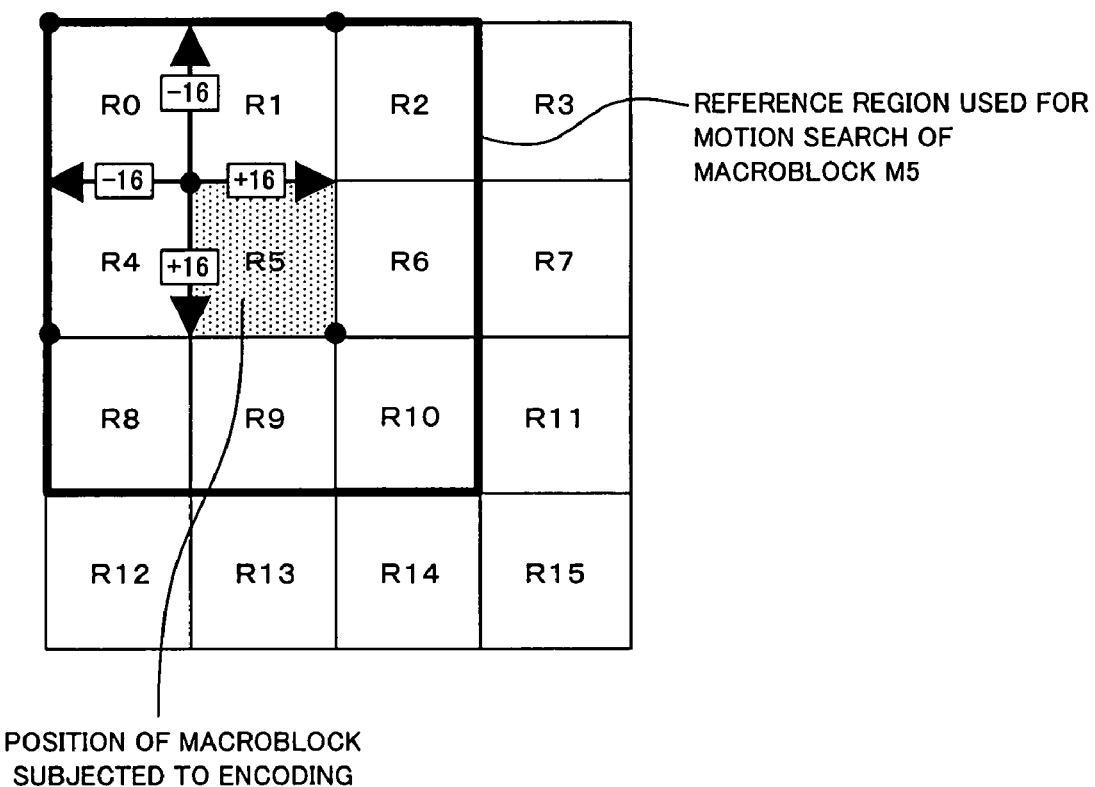
FIG. 9 illustrates an example of a reference region used for motion search.

FIG. 9 illustrates an example of a reference region used for motion search. FIG. 9 shows a reference region of the luminance signal which is used for motion search of macroblock M5 of FIG. 4 where the motion search range is ±16 pixels both horizontally and vertically. In this case, the motion searcher/compensator 40 reads data of 3 (horizontal) by 3 (vertical) macroblocks, i.e., data of 48 (horizontal) by 48 (vertical) pixels, to perform a motion search.

The extent of the reference region read out from the temporary data storage 2 differs between a case where the motion searcher/compensator 40 performs both "motion search and motion compensation" and a case where the motion searcher/compensator 40 performs only "motion compensation". As a matter of course, when a motion search is performed, it is necessary to read a larger extent of reference image. The motion search is performed only in encoding but not performed in decoding. In general, the data used for motion search is only the luminance signal, whereas the color difference signals are not used.

Figure 10:
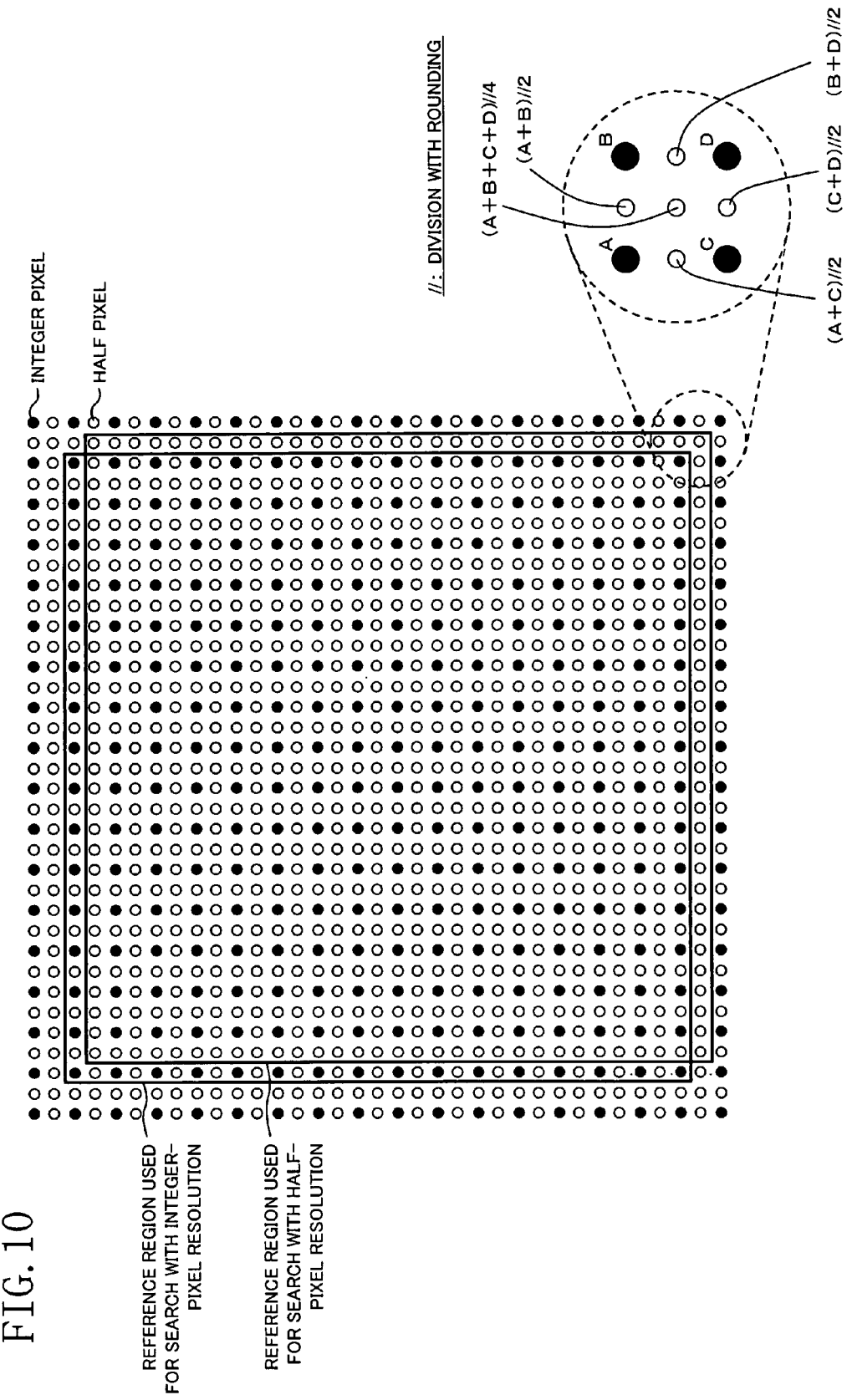
FIG. 10 illustrates a reference region used for a search with half-pixel resolution.

FIG. 10 illustrates a reference region used for a search with half-pixel resolution. In a motion search, there is a case where a search is performed with half-pixel resolution other than cases where searches are performed with integer-pixel resolutions.

In the case of searching for a point horizontally shifted by a half pixel, the motion searcher/compensator 40 performs interpolation of two horizontally adjacent pixels (see the lower right part of FIG. 10) and generates a pixel with half-pixel resolution to perform a motion search using this pixel of half-pixel resolution. Thus, 17 (horizontal) by 16 (vertical) integer pixels are necessary. Likewise, in the case of searching for a point vertically shifted by a half pixel, 16 (horizontal) by 17 (vertical) integer pixels are necessary. In the case of searching for a point shifted by a half pixel both horizontally and vertically, the motion searcher/compensator 40 performs interpolation using 2 (horizontal) by 2 (vertical) pixels (see the lower right part of FIG. 10) and generates a pixel with half-pixel resolution. To this end, 17 (horizontal) by 17 (vertical) integer pixels are necessary.

Next, motion compensation is described. After the point of the minimum evaluation function value is determined through a search with an integer-pixel resolution or half-pixel resolution, the motion searcher/compensator 40 performs motion compensation on the determined point (generation of a reference image having 16 (horizontal) by 16 (vertical) pixels). If the point of the minimum evaluation function value is a point of half-pixel resolution, compensation is carried out using vertical 17 pixels, as a matter of course.

In encoding, the motion searcher/compensator 40 performs motion compensation on the luminance signal using a reference image read out from the temporary data storage 2 for motion search. As for the color difference signals in encoding and as for the luminance signal and color difference signals in decoding, the motion searcher/compensator 40 newly reads out pixels from the temporary data storage 2 for motion compensation.

FIG. 11 illustrates pixel data (luminance signal) of one macroblock of a reconstructed image stored in the reconstructed image storage 34 of FIG. 1. One macroblock consists of 16 by 16 pixels. Now, consider a case where the data bus width of the SDRAM which constitutes the temporary data storage 2 is four times the width of pixel data of, for example, 8 bits. The frame vertical scan read section 32 treats every 4 horizontally-adjoining pixels of the pixel data of FIG. 11 as one data unit such that the pixel data of 4 pixels constitute one data transfer unit (hereinafter, referred to as "data pack"). Transfer of the pixel data to the temporary data storage 2 is carried out on a data pack by data pack basis.

Figure 12:
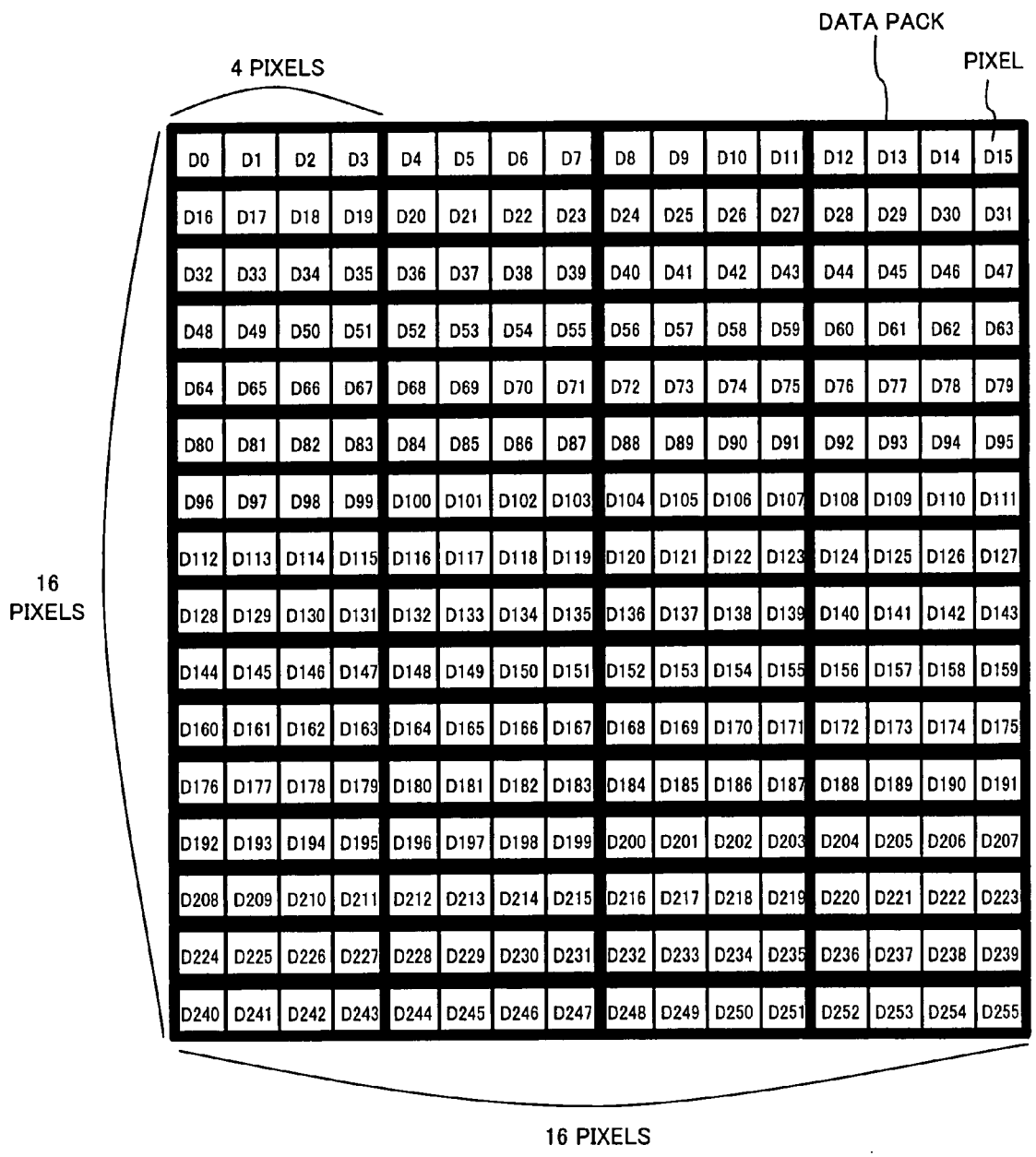
FIG. 12 illustrates the pixel data of FIG. 11 in the form of data packs.

FIG. 12 illustrates the pixel data of FIG. 11 in the form of data packs. The data pack-based transfer requires only 4×16 transfer processes, and therefore, the time required for the transfer of pixel data is reduced as compared with pixel-by-pixel data transfer. In the example described hereinafter, the width of pixel data is one byte, and the data bus width of the SDRAM is 4 bytes.

Figure 13:
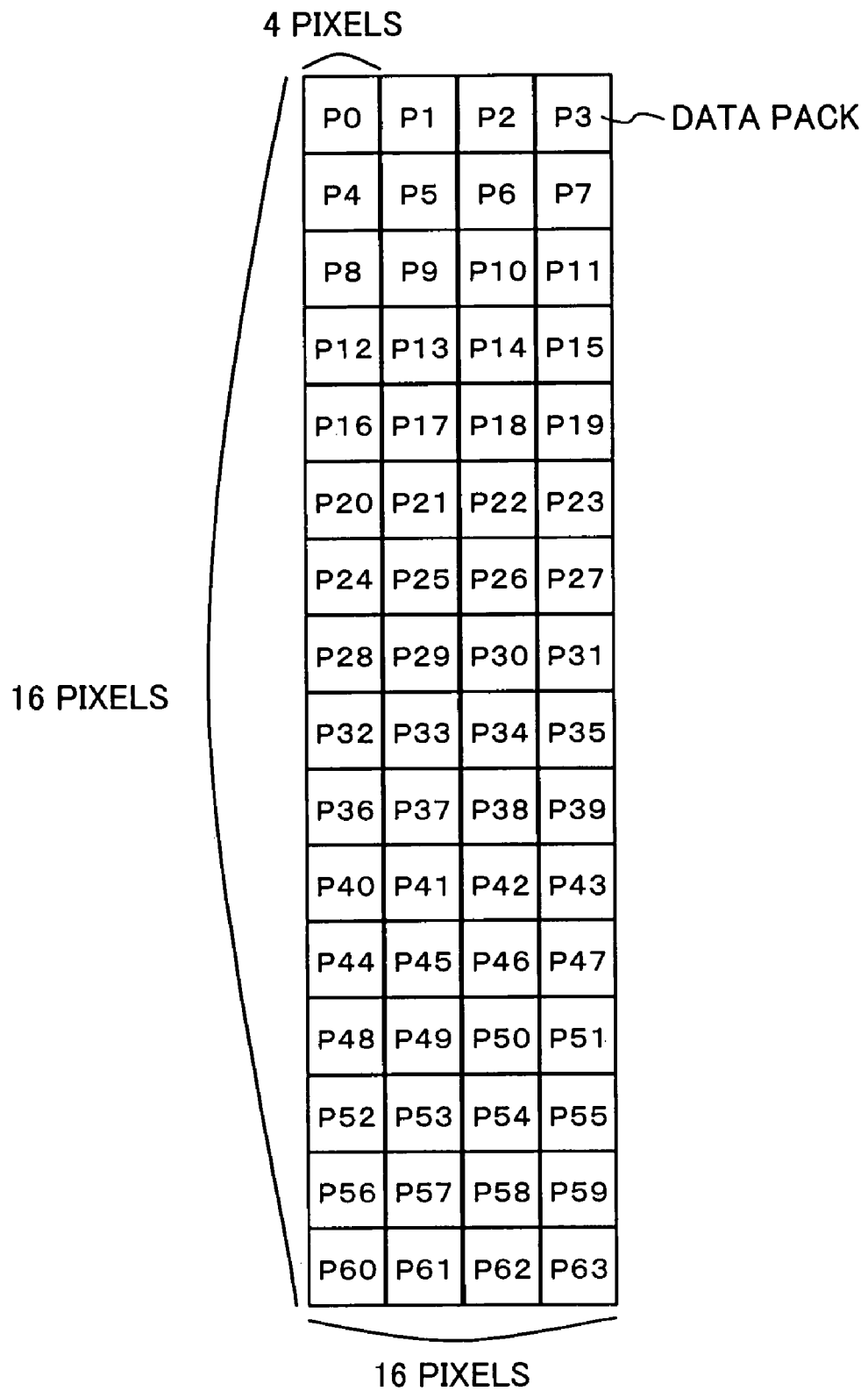
FIG. 13 illustrates the data packs of the luminance signal of one macroblock which correspond to the positions over the image.

FIG. 13 illustrates the data packs of the luminance signal of one macroblock which correspond to the positions over the image data pack P0 corresponds to pixels D0, D1, D2, and D3 of FIG. 12. Likewise, data packs P1, P2, . . . and P63 correspond to pixels D4 to D7, pixels D8 to D11, . . . and pixels D252 to D255, respectively.

Figure 14:
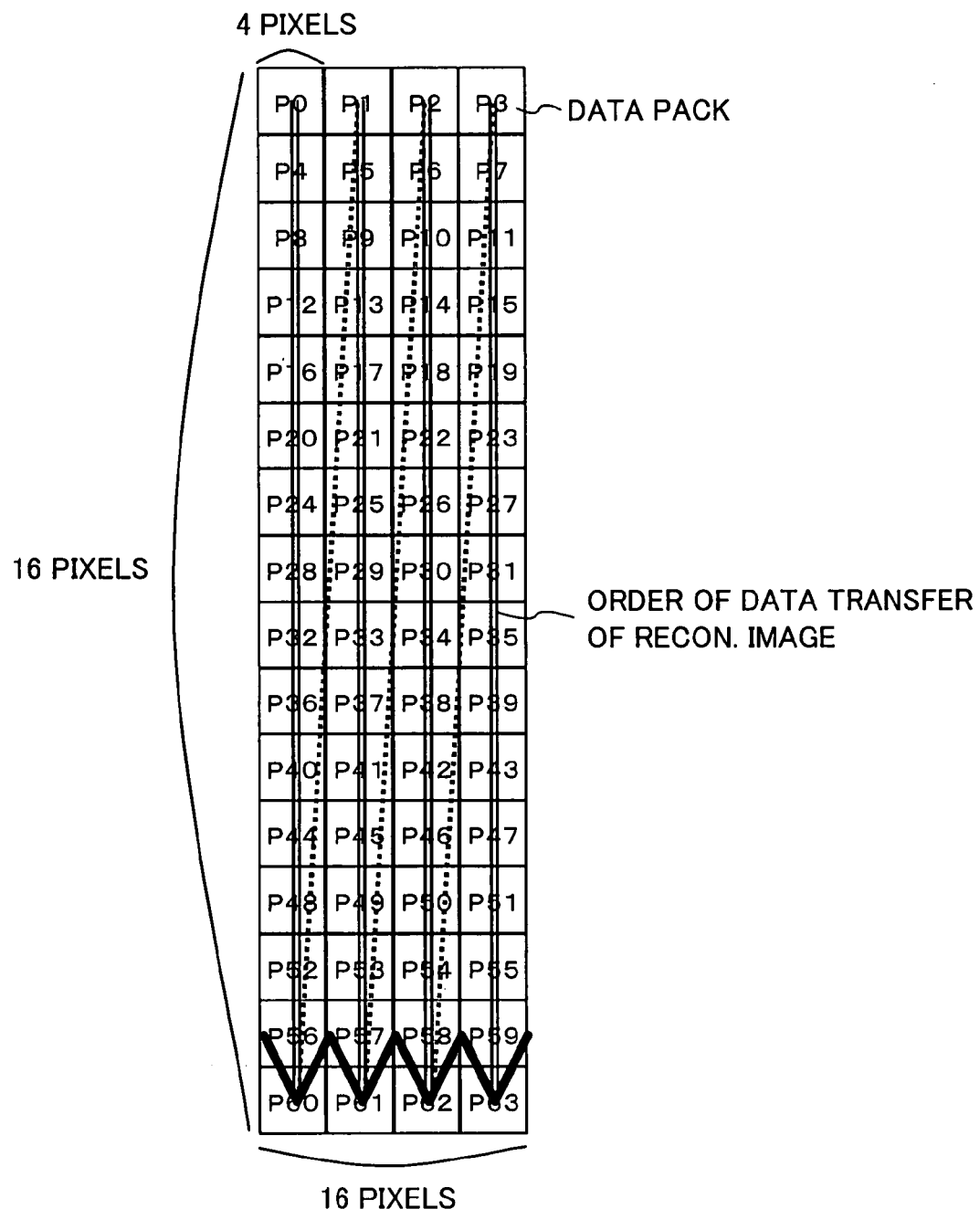
FIG. 14 illustrates the order of transfer of the data of FIG. 13 by a frame vertical scan read section of FIG. 1.

FIG. 14 illustrates the order of transfer of the data of FIG. 13 by the frame vertical scan read section 32 of FIG. 1. The frame vertical scan read section 32 transfers the data of the leftmost column of FIG. 14 from the reconstructed image storage 34 to the temporary data storage 2 in the order of data packs P0, P4, P8, . . . and P60. Then, the frame vertical scan read section 32 transfers the data of the second leftmost column of FIG. 14 from the reconstructed image storage 34 to the temporary data storage 2 in the order of data packs P1, P5, P9, . . . and P61.

Then, the frame vertical scan read section 32 transfers the data of the third leftmost column of FIG. 14 from the reconstructed image storage 34 to the temporary data storage 2 in the order of data packs P2, P6, P10, . . . and P62. Then, the frame vertical scan read section 32 transfers the data of the rightmost column of FIG. 14 from the reconstructed image storage 34 to the temporary data storage 2 in the order of data packs P3, P7, P11, . . . and P63. The data are vertically scanned in this way to complete transfer of one macroblock.

Figure 15:
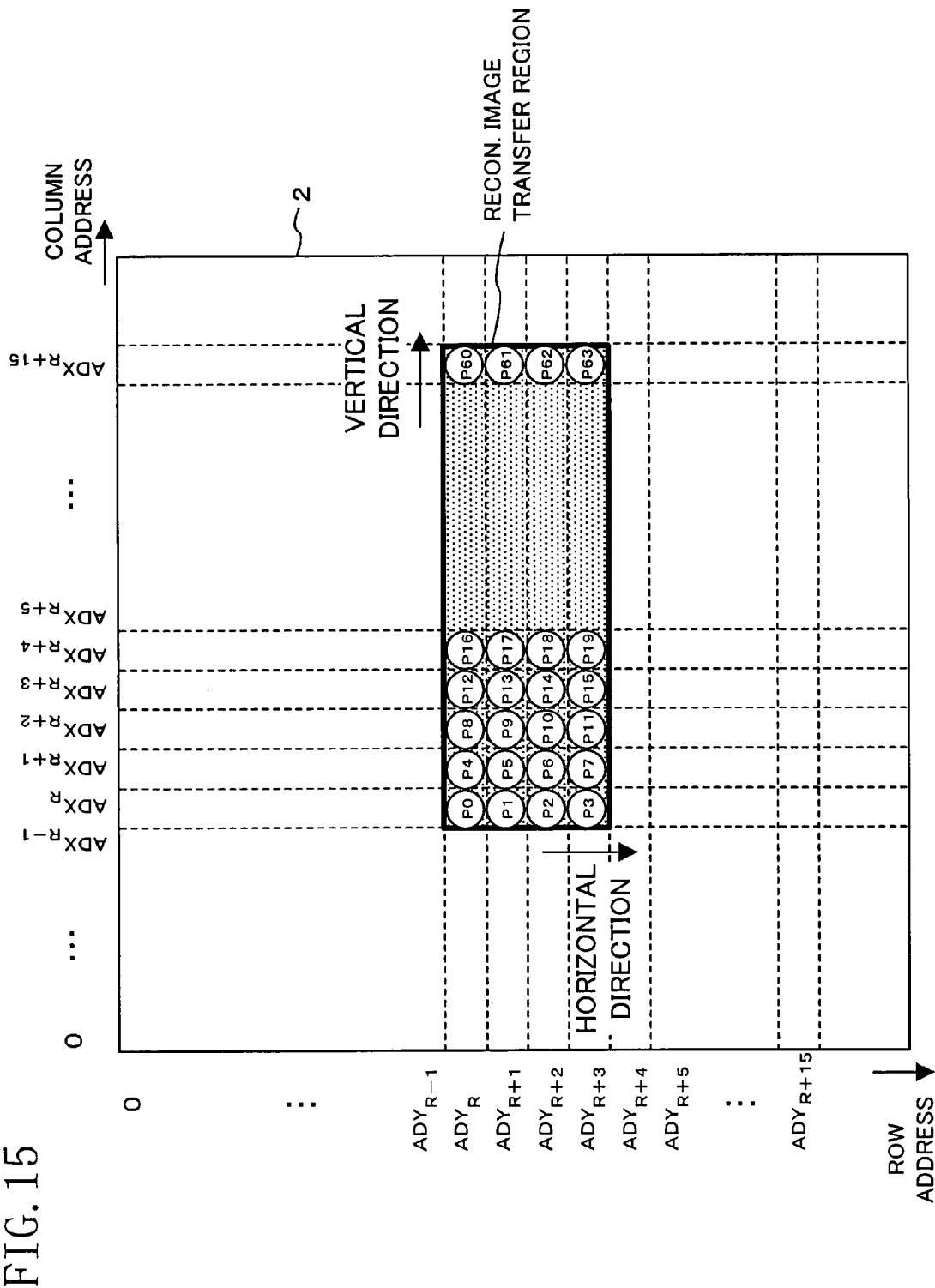
FIG. 15 illustrates an example of mapping of data stored in a temporary data storage of FIG. 1.

FIG. 15 illustrates an example of mapping of data stored in the temporary data storage 2 of FIG. 1. Hereinafter, the location of stored data in the SDRAM of the temporary data storage 2 is expressed using column address ADX and row address ADY as address SD (ADX,ADY). The frame vertical scan read section 32 writes a column of data packs of FIG. 14 in burst mode in a region of the temporary data storage 2 in which column addresses ADXs are consecutive while row address ADY is fixed.

Specifically, the frame vertical scan read section 32 writes data packs P0, P4, P8, . . . and P60 of the leftmost column of FIG. 14 in burst mode in addresses $SD(ADX_R,ADY_R)$, $SD(ADX_{R+1},ADY_R)$, $SD(ADX_{R+2},ADY_R)$, . . . and $SD(ADX_{R+15},ADY_R)$ of the temporary data storage 2, respectively, without changing the row address.

Thereafter, the frame vertical scan read section 32 changes the row address from $ADY_R$ to $ADY_{R+1}$ to write data packs P1, P5, P9, . . . and P61 of the second leftmost column of FIG. 14 in burst mode in addresses $SD(ADX_R,ADY_{R+1})$, $SD(ADX_{R+1},ADY_{R+1})$, $SD(ADX_{R+2},ADY_{R+1})$, . . . and $SD(ADX_{R+15},ADY_{R+1})$ of the temporary data storage 2, respectively.

In the same way, the frame vertical scan read section 32 changes the row address to $ADY_{R+2}$ to write the data of the third leftmost column of FIG. 14 in one row and then changes the row address to $ADY_{R+3}$ to write the data of the rightmost column of FIG. 14 in another one row. Such a procedure reduces the number of changes of the row address from 16 to 4 in transfer of one macroblock.

The above-described manner of storage of data packs as illustrated in FIG. 15 is hereinafter referred to as the frame mapping storage mode.

Figure 16:
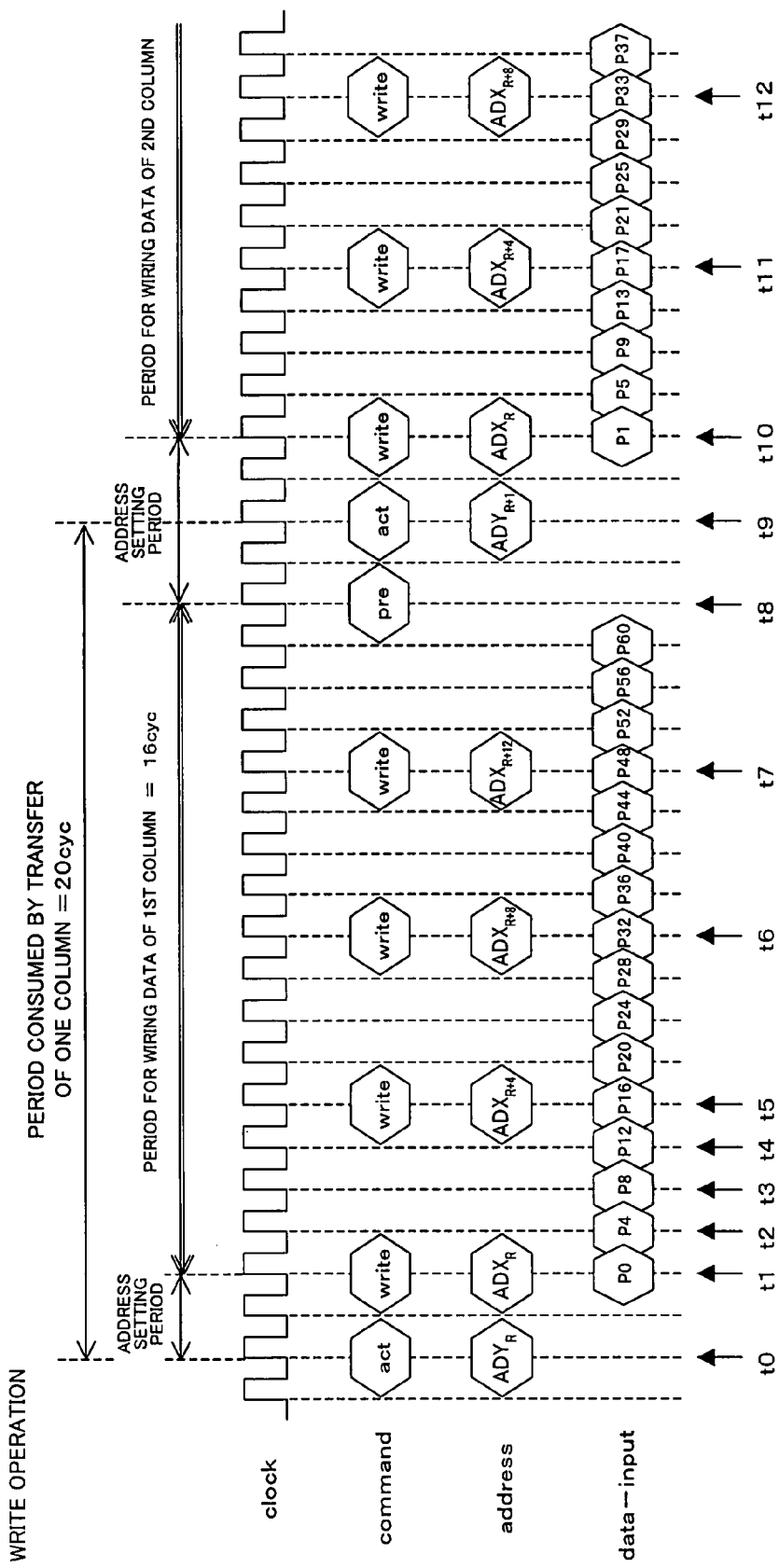
FIG. 16 is a timing chart for the temporary data storage of FIG. 1 for a data write operation as shown in FIG. 14 and FIG. 15.

FIG. 16 is a timing chart for the temporary data storage 2 of FIG. 1 for the data write operation as shown in FIG. 14 and FIG. 15. First, at time t0, the frame vertical scan read section 32 performs setting of row address $ADY_R$ ("act" command) on the temporary data storage 2. At time t1, the frame vertical scan read section 32 sets column address $ADX_R$ to start writing of data packs ("write" command). In the period of time t1 to time t4, data packs P0, P4, P8 and P12 are continuously written.

At time t5, the frame vertical scan read section 32 sets column address $ADX_{R+4}$ in the temporary data storage 2 to start writing of data packs ("write" command), so that data packs P16, P20, P24 and P28 are continuously written. The remaining data packs P32, P36, . . . and P60 of the leftmost column of FIG. 14 are written in the same way such that 4 data packs are written in response to each "write" command.

At time t8, the frame vertical scan read section 32 causes the temporary data storage 2 to execute "pre" command for change of the row address. At time t9, the frame vertical scan read section 32 sets the next row address $ADY_{R+1}$ ("act" command). At time t10, the frame vertical scan read section 32 sets column address $ADX_R$ to start writing of data packs ("write" command), so that data packs P1, P5, P9 and P13 are continuously written. The remaining data packs P17, P21, . . . and P61 of the second leftmost column of FIG. 14 are written in the same way such that 4 data packs are written in response to each "write" command.

Figure 52:
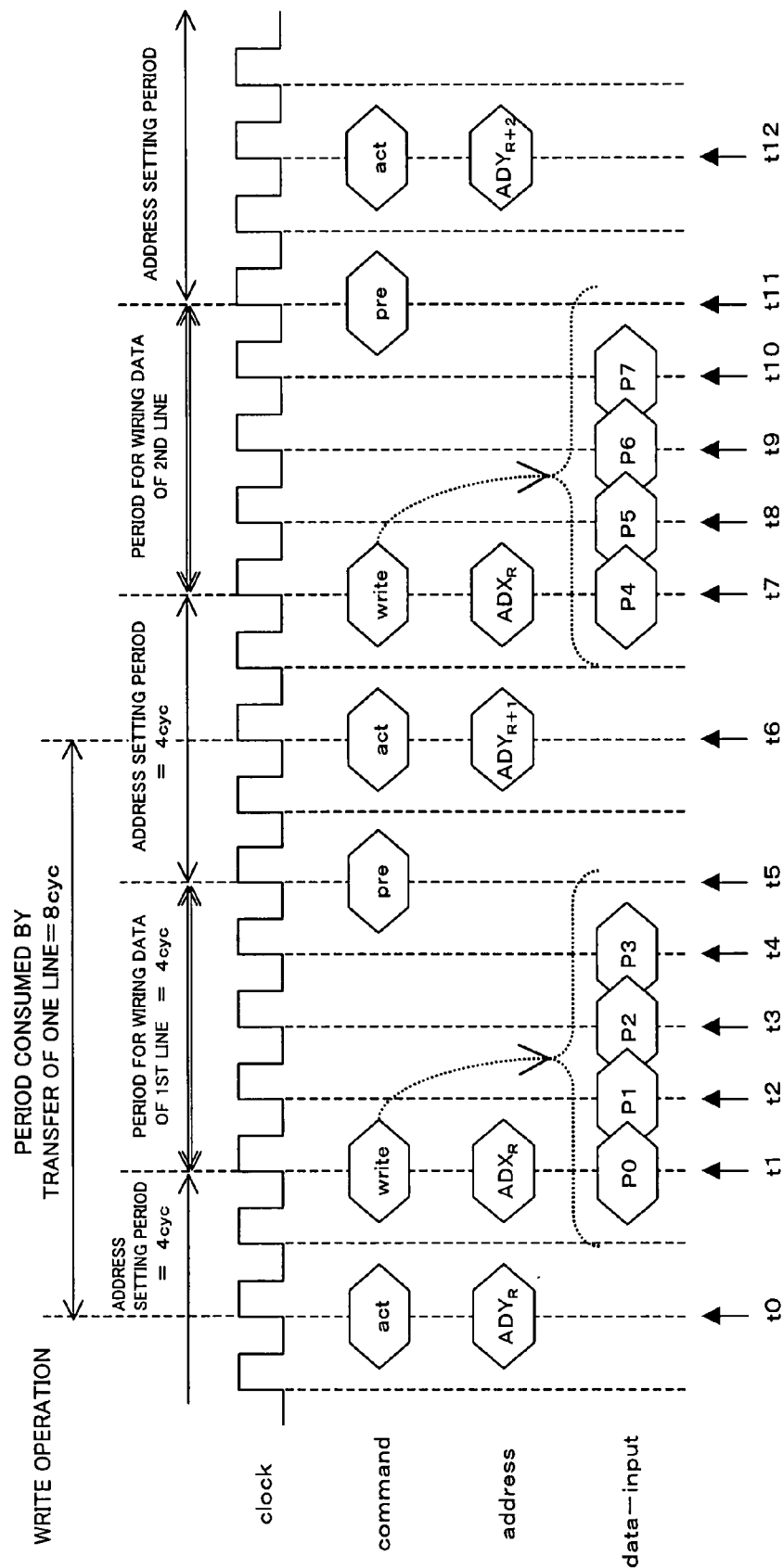
FIG. 52 is a timing chart for the SDRAM in writing of data packs as in FIG. 51.
Figure 53:
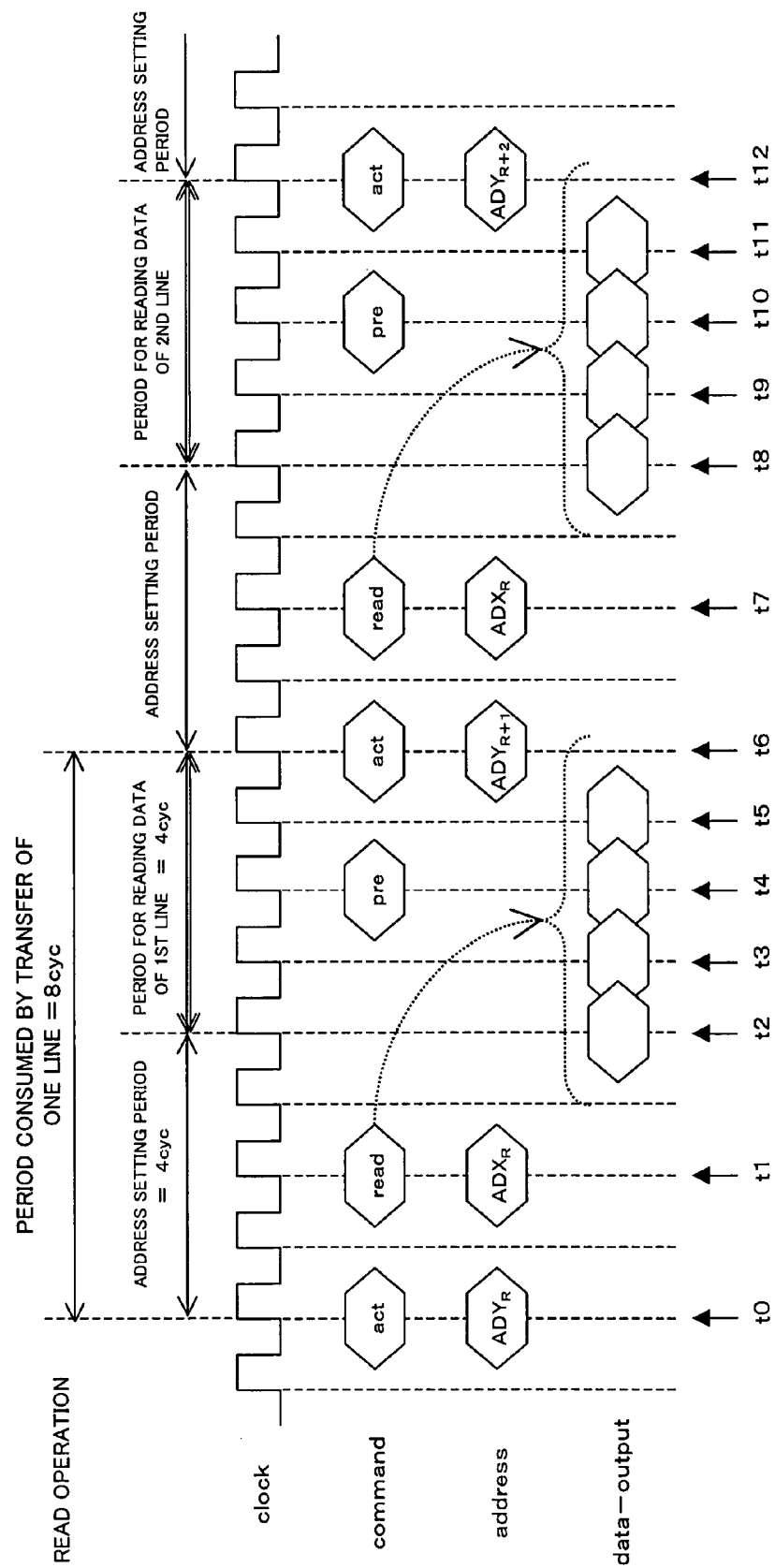
FIG. 53 is a timing chart for the SDRAM in reading of data packs stored as shown in FIG. 51.
Figure 54A:
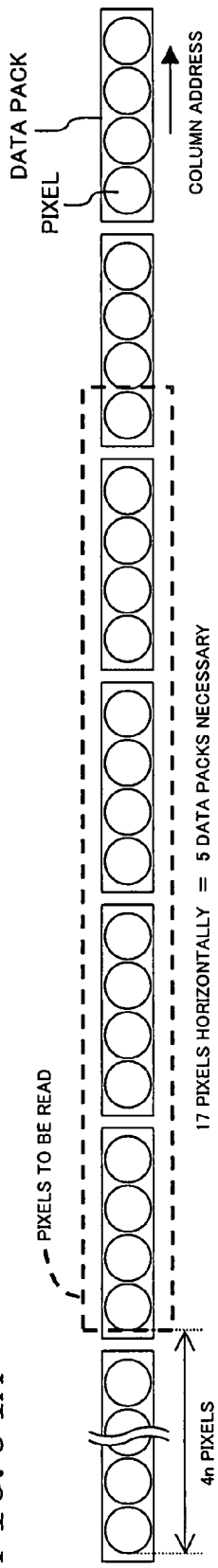
FIG. 54 schematically illustrates transfer of 17 pixels.
Figure 54B:
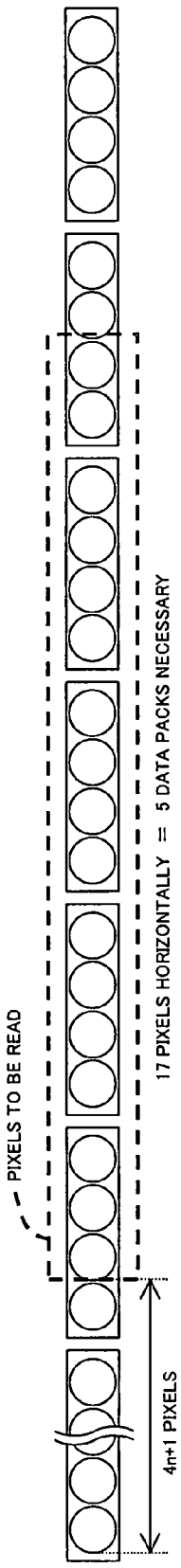
Figure 54C:
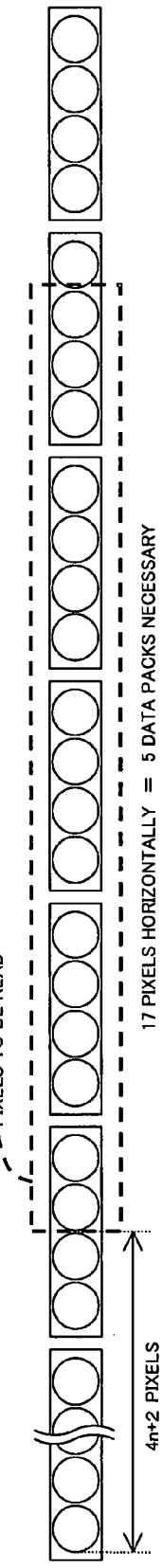
Figure 54D:
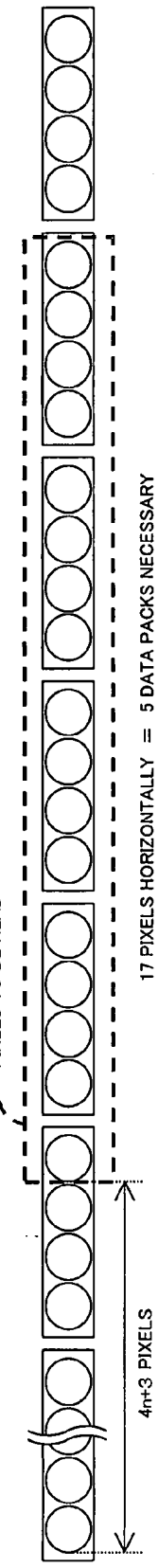
Figure 55:
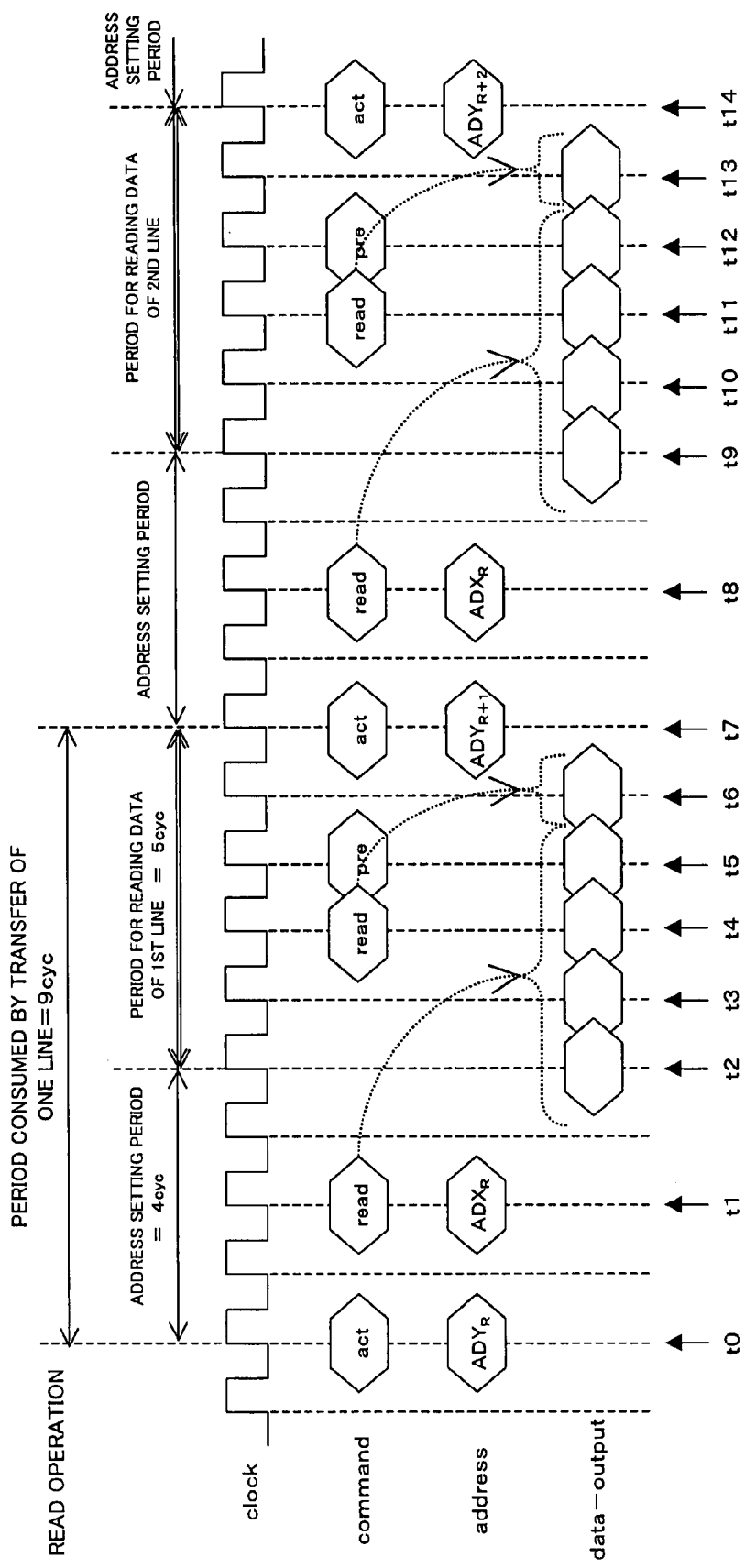
FIG. 55 is a timing chart for the SDRAM for reading of data packs stored as shown in FIG. 51 where the reference image consists of 17 (horizontal) by 17 (vertical) pixels.
Figure 56:
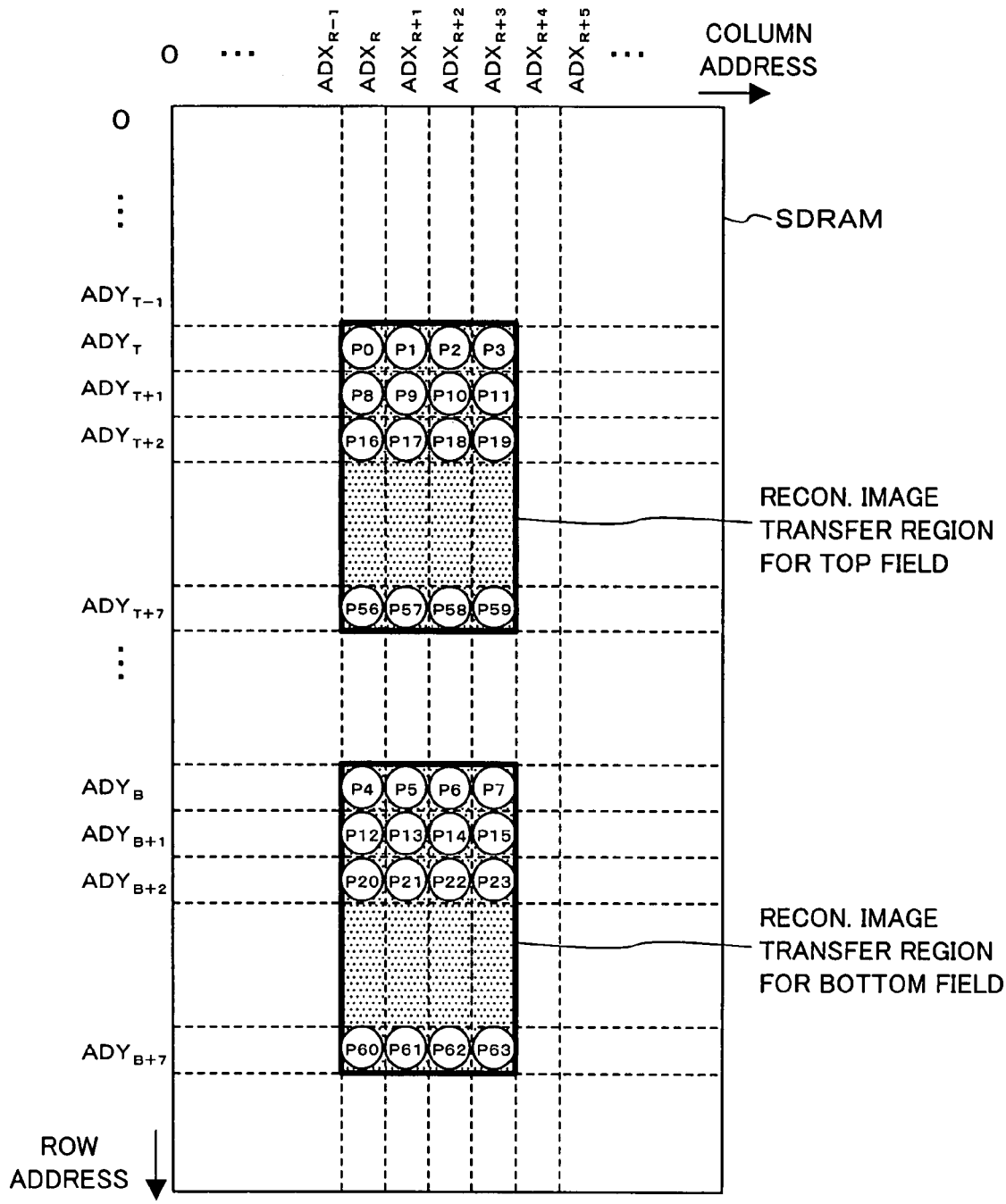
FIG. 56 shows an example of mapping of data stored in the SDRAM where fields of the data are allocated to different regions of the SDRAM.

Assuming that the interval between the current "act" command and the next "act" command is a period required for transferring a column of data of the reconstructed image, transfer of one column requires 20 cycles. Of these cycles, 16 cycles are used for the data transfer process, while the other cycles are required for the address setting process. Thus, the number of transfer cycles for one pixel is 1.25 cycles, which is better in transfer efficiency than the example of transfer of a reconstructed image illustrated in FIG. 52 (2 cycles required for one pixel).

As described above, according to embodiment 1, the reconstructed image is vertically scanned to be read out and then written in the temporary data storage 2 by scanning in a direction where the row address is fixed. Namely, the horizontal direction in the temporary data storage 2 (SDRAM) of FIG. 15 (direction where the row address is fixed) corresponds to the vertical direction of the reconstructed image, while the vertical direction in the temporary data storage 2 (direction where the column address is fixed) corresponds to the horizontal direction of the reconstructed image.

Positional Relationship between Macroblocks

Figure 17:
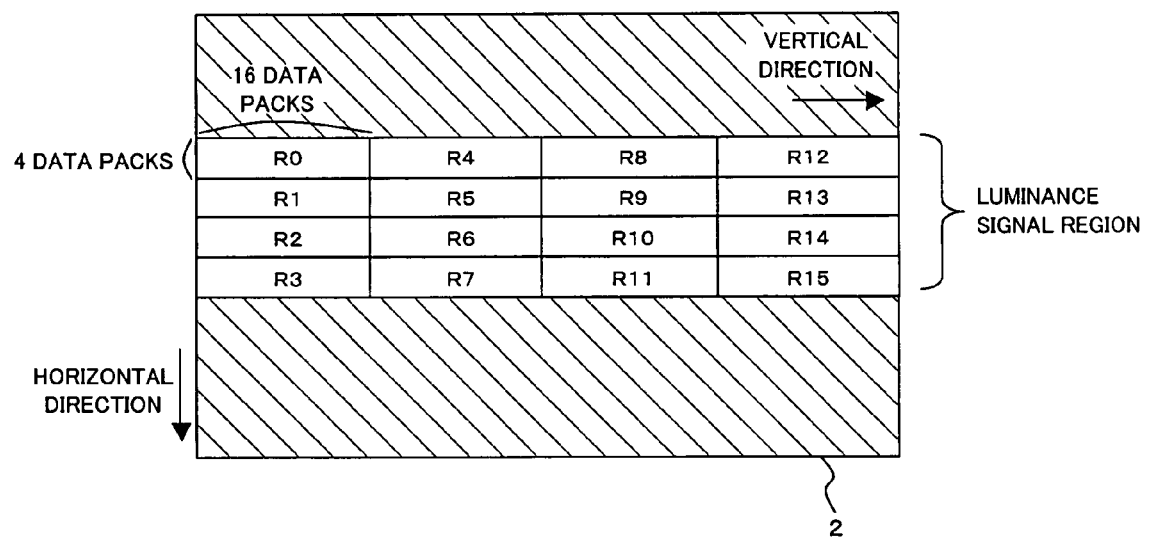
FIG. 17 illustrates the positions in the temporary data storage of FIG. 1 where macroblocks are stored.

FIG. 17 illustrates the positions in the temporary data storage 2 of FIG. 1 where macroblocks are stored. In FIG. 17, the horizontal coordinate correspond to the column address, and the vertical coordinate correspond to the row address. The temporary data storage 2 stores reconstructed images R0 to R15 of FIG. 5 (corresponding to macroblocks M0 to M15) as shown in FIG. 17.

For example, macroblock M6 is a macroblock which is processed next to macroblock M5 and exists on the right of macroblock M5 on the frame of the original image (FIG. 4 and FIG. 5). When storing a reconstructed image of these macroblocks, the temporary data storage 2 stores reconstructed image R6 under reconstructed image R5 (i.e., the column address of reconstructed image R6 is the same as that of reconstructed image R5, while the row address of reconstructed image R6 is greater than that of reconstructed image R5 by 4).

Figure 18:
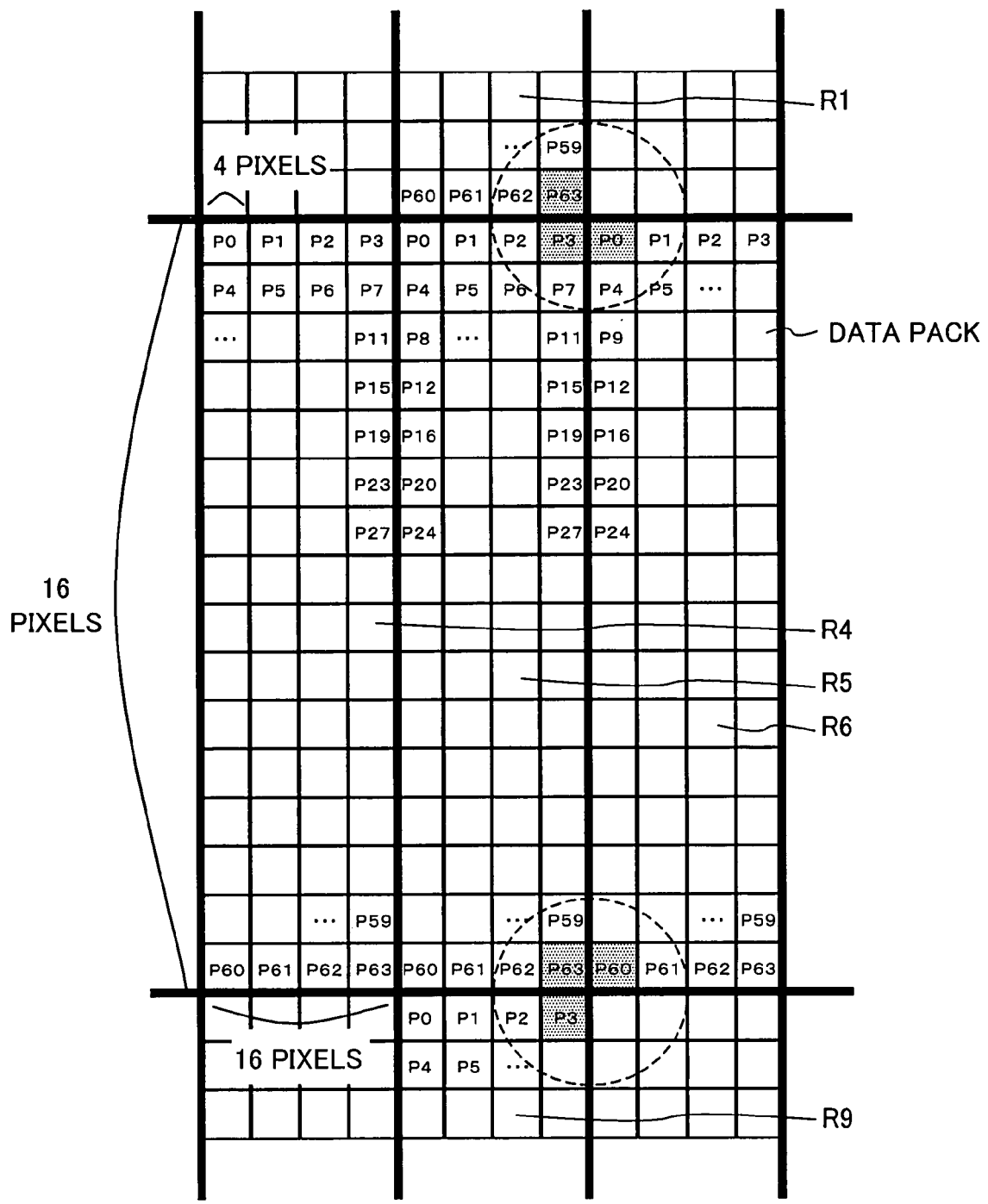
FIG. 18 illustrates part of the reconstructed image of FIG. 5 where a single box represents one data pack.
Figure 19:
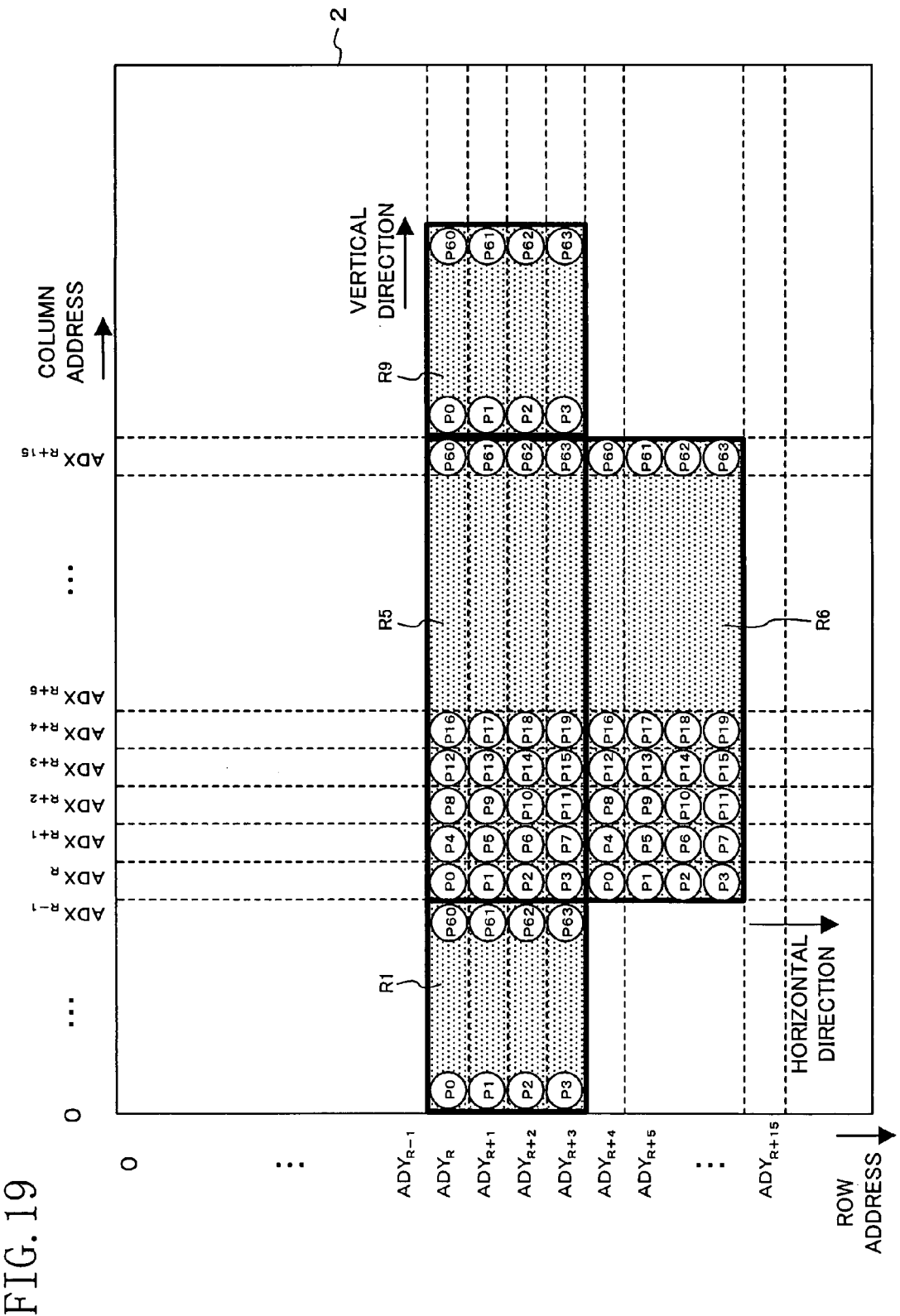
FIG. 19 illustrates mapping of data packs stored in the temporary data storage of FIG. 1 over a plurality of macroblocks.

FIG. 18 illustrates part of the reconstructed image of FIG. 5 where a single box represents one data pack. FIG. 19 illustrates mapping of data packs stored in the temporary data storage 2 of FIG. 1 over a plurality of macroblocks.

Referring to FIG. 18, the focus of description is narrowed onto data P63 of macroblock M1 and data P0 of macroblock M6, which exist on the upper side and right side of data P3 of macroblock M5, respectively, and data P3 of macroblock M9 and data P60 of macroblock M6, which exist on the lower side and right side of data P63 of macroblock M5, respectively.

Since the temporary data storage 2 has a mapping where the horizontal axis and vertical axis are exchanged with respect to those of the reconstructed image storage 34, data P63 of macroblock M1 and data P0 of macroblock M6 exist on the left side and lower side of data P3 of macroblock M5 in FIG. 19, respectively. Data P3 of macroblock M9 and data P60 of macroblock M6 exist on the right side and lower side of data P3 of macroblock M5 in FIG. 19, respectively.

Since the positional relationship between the pixel data is not marred even in the temporary data storage 2 which has the exchanged horizontal and vertical axes, only necessary part of the reconstructed image is readily extracted and transferred as a reference image.

Figure 20:
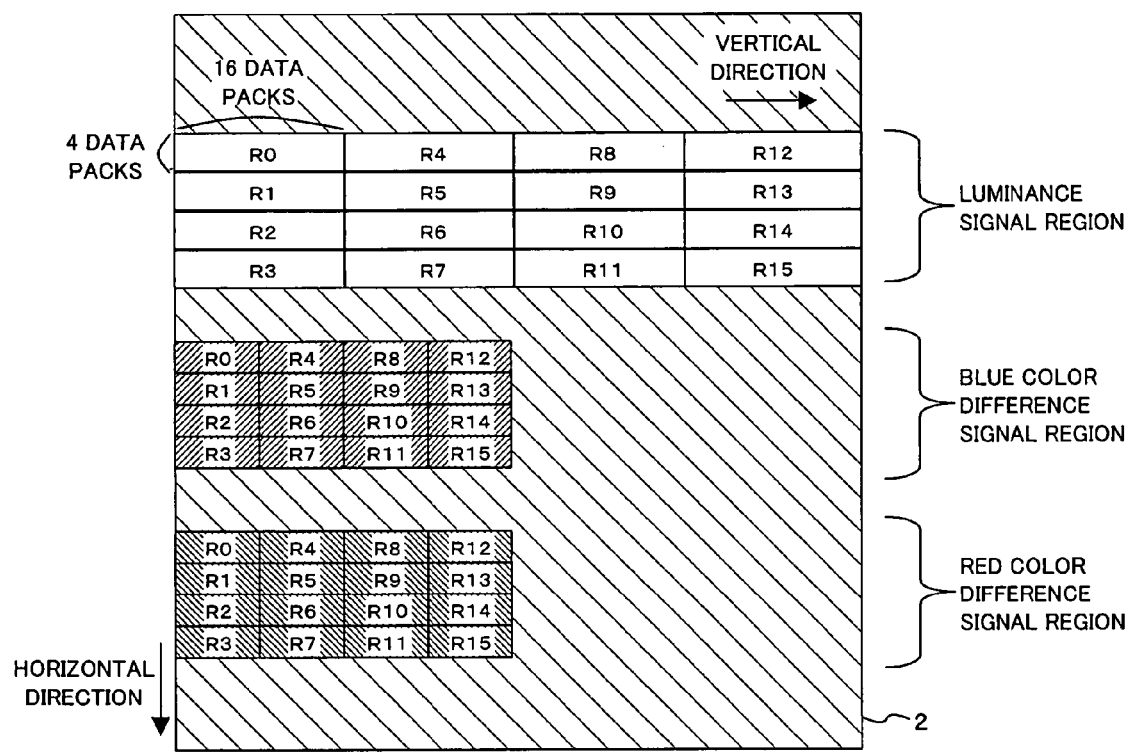
FIG. 20 illustrates the positions in the temporary data storage of FIG. 1 where macroblocks are stored for the luminance signal and color difference signals.

FIG. 20 illustrates the positions in the temporary data storage 2 of FIG. 1 where macroblocks are stored for the luminance signal and color difference signals. The temporary data storage 2 stores the luminance signal, blue color difference signal and red color difference signal of reconstructed images R0 to R15 in different regions as shown in FIG. 20.

Figure 21:
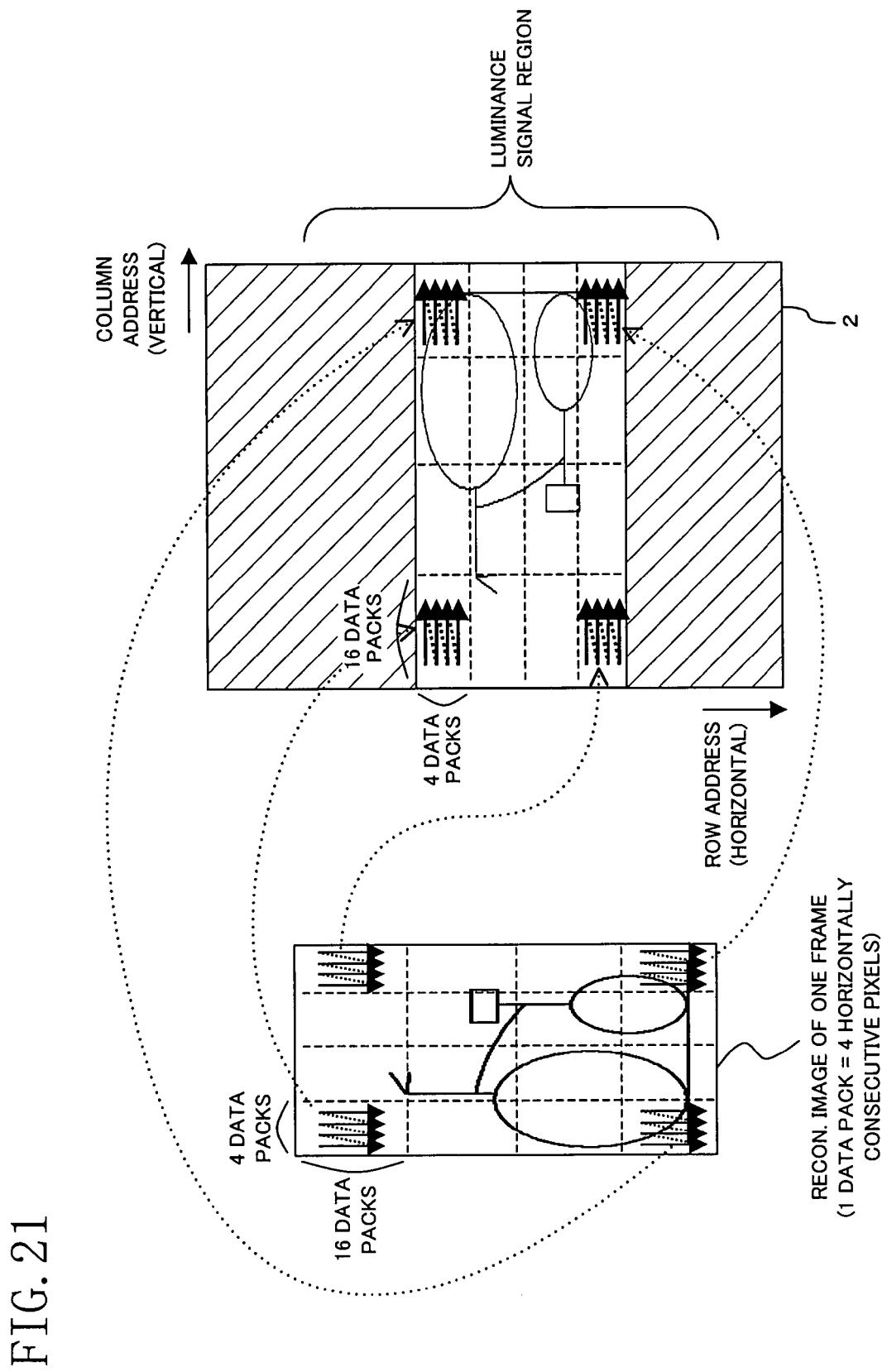
FIG. 21 shows a reconstructed image consisting of 64 (horizontal) by 64 (vertical) pixels where every 4 horizontally consecutive pixels constitute a data pack, and a mapping image of the reconstructed image in the temporary data storage.

FIG. 21 shows a reconstructed image consisting of 64 (horizontal) by 64 (vertical) pixels where every 4 horizontally consecutive pixels constitute a data pack, and a mapping image of the reconstructed image in the temporary data storage 2. The reconstructed image consists of 4 (horizontal) by 16 (vertical) data packs, whereas it consists of 16 horizontal (same row address) by 4 vertical (same column address) data packs in the temporary data storage 2.

Transfer of Reference Image

Figure 22:
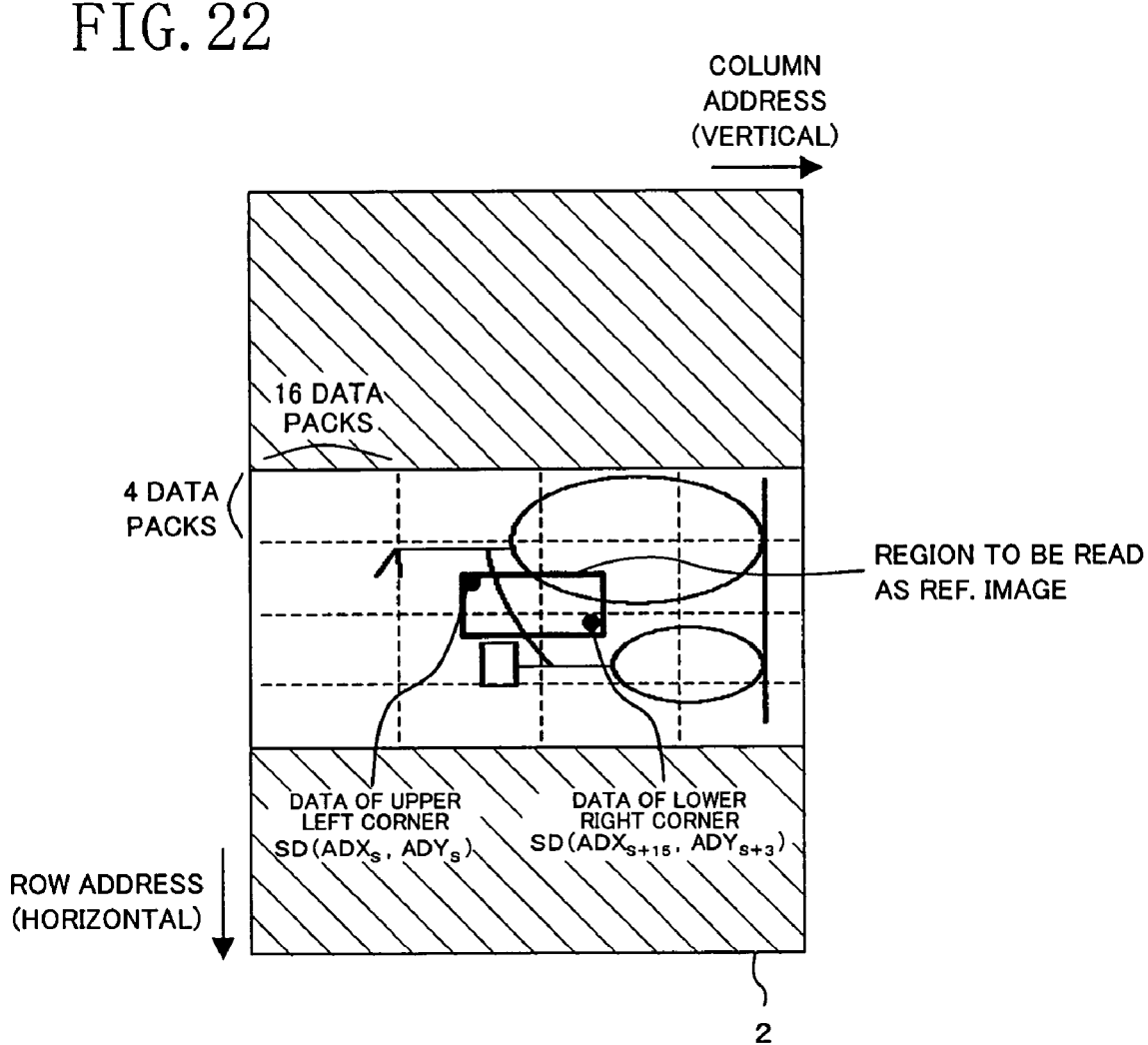
FIG. 22 illustrates an example of a data region read out as a reference image.

Next, transfer of a reference image (reading from the temporary data storage 2) is described. FIG. 22 illustrates an example of a data region read out as a reference image. Herein, consider a case where a reference image of one macroblock is read out. The data of this region is stored in a region designated by 16 (horizontal) by 4 (vertical) addresses.

Figure 23:
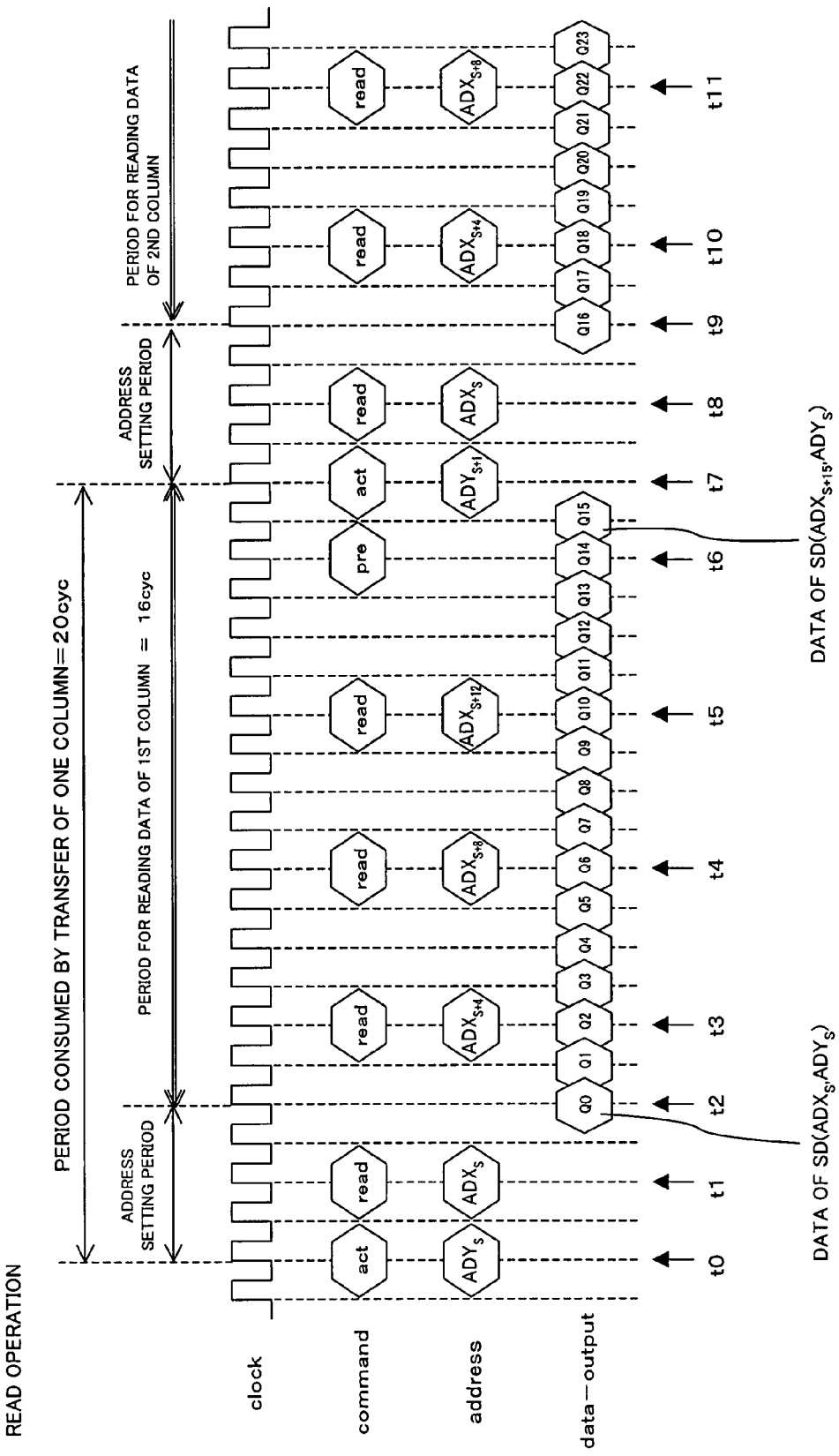
FIG. 23 is a timing chart for the temporary data storage of FIG. 1 in reading of the reference image of FIG. 22.

FIG. 23 is a timing chart for the temporary data storage 2 of FIG. 1 in reading of the reference image of FIG. 22. The frame vertical scan write section 42 reads, for each row of the reference image of FIG. 22, data packs written in the temporary data storage 2 in burst mode from a region in which column addresses ADXs are consecutive while row address ADY is fixed, and writes the read data packs in the reference image storage 44.

Specifically, at time t0, the frame vertical scan write section 42 causes the temporary data storage 2 to execute "act" command to set row address $ADY_S$. At time t1, the frame vertical scan write section 42 causes the temporary data storage 2 to execute "read" command to set column address $ADX_S$. After passage of predetermined cycles (at time t2), the temporary data storage 2 reads data packs Q0, Q1, Q2 and Q3 of 4 addresses from address $SD(ADX_S, ADY_S)$ to address $SD(ADX_{S+3}, ADY_S)$ in burst mode and outputs the read data packs.

Thereafter, at times t3, t4, and t5, the frame vertical scan write section 42 causes the temporary data storage 2 to execute "read" command to set column address $ADX_{S+4}$, $ADX_{S+8}$, and $ADX_{S+12}$, respectively, while the temporary data storage 2 outputs data packs Q4 to Q7, Q8 to Q11, and Q12 to Q15, respectively, on 4 addresses by 4 addresses basis.

In this way, the temporary data storage 2 reads data packs Q0 to Q15 of the same row address. The reference image storage 44 stores the read data packs Q0 to Q15. Since a predetermined number of cycles are necessary between execution of "read" command and output of data, "act" command needs to be executed beforehand in consideration of this gap.

The frame vertical scan write section 42 causes the temporary data storage 2 to execute "pre" command (at time t6) and "act" command (at time t7) with the view of changing the row address in consideration of completion of reading of all data packs Q0 to Q15, thereby setting row address $ADY_{S+1}$. Thereafter, reading of data packs Q16 to Q31 of this row is performed in the same way.

Likewise, the frame vertical scan write section 42 changes the row address to $ADY_{S+2}$ to read the data of the third row of the reference image from the same row and change the row address to $ADY_{S+3}$ to write the data of the fourth row of the reference image in one row. The reference image storage 44 stores the read data packs of each row. Such a procedure reduces the number of changes of the row address to 4 in transfer of one macroblock.

Figure 24:
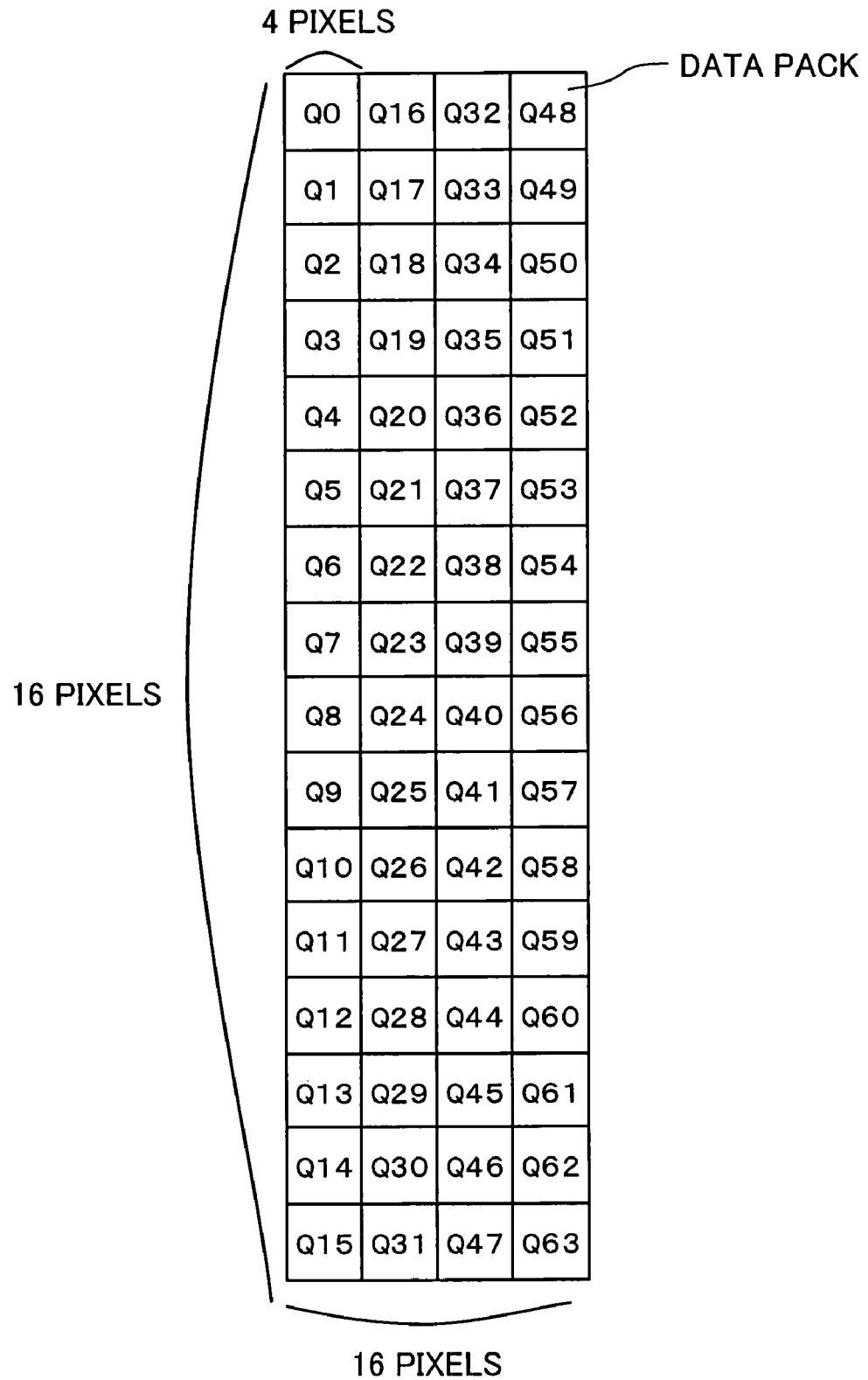
FIG. 24 illustrates data packs in a reference image storage of FIG. 1.

FIG. 24 illustrates data packs in the reference image storage 44 of FIG. 1. The frame vertical scan write section 42 reads data packs from the temporary data storage 2 and writes the read data packs in the reference image storage 44 as shown in FIG. 24. Namely, data packs stored in the same row of the temporary data storage 2 is written in the same column of the reference image storage 44. This means that the horizontal axis and vertical axis are exchanged, and the original image can be restored.

Now, consider a case where one macroblock is transferred as a reference image. As a result of a calculation based on the above-described formula (C1) where "number of accesses to same row address of SDRAM"=16, "number of cycles for address setting of SDRAM"=4, and "number of changes of row address of SDRAM"=4, the number of cycles necessary for transfer of one macroblock is (16+4)×4=80. The number of transfer cycles per data pack is 1.25 (=80/64). It is thus understood that the transfer efficiency is also improved in transfer of a reference image as compared with the conventional case (2 cycles per data pack).

Now, consider a case where data of 17 (horizontal) by 17 (vertical) pixels is transferred as a reference image. In the case where the transfer method of this embodiment is not used, the number of accesses to the same row address is 5, the number of changes of the row address is 17, and hence, the number of cycles necessary is (5+4)×17=153. In the case where the transfer is carried out as illustrated in FIG. 23, the number of accesses to the same row address is 17, the number of changes of the row address is 5, and hence, the transfer completes in (17+4)×5=105 cycles. In this case, the number of transfer cycles per data pack is about 1.23.

As for the color difference signals, a transfer process is carried out similarly to the luminance signal. The number of transfer cycles for the temporary data storage 2 as to the color difference signals is calculated based on formula (C1). It should be noted that writing in the temporary data storage 2 and reading from the temporary data storage 2 require an equal number of transfer cycles.

In the case of 4:2:0 format, each color difference signal (blue color difference signal or red color difference signal) has 8 (horizontal) by 8 (vertical) pixels per macroblock. Therefore, conversion of every 4 horizontally consecutive pixels into one data pack results in 2 (horizontal) by 8 (vertical) data packs. Since "number of accesses to same row address of SDRAM"=8 and "number of changes of row address of SDRAM"=2 for each macroblock, the number of cycles necessary for transfer of one macroblock is (8+4)×2=24. Accordingly, transfer of both of the color difference signals requires 48 cycles. Therefore, the number of transfer cycles per data pack is 1.5 (=48/(2×8×2)).

In the case where the transfer method of this embodiment is not used, "number of accesses to same row address of SDRAM"=2 and "number of changes of row address of SDRAM"=8 for each macroblock. Thus, the number of cycles necessary for transfer of one macroblock is (2+4)×8=48. Namely, 3 cycles are necessary for each data pack. It is thus understood that the transfer efficiency is improved.

In the case of 4:2:2 format, each color difference signal has 8 (horizontal) by 16 (vertical) pixels for one macroblock. Therefore, conversion of every 4 horizontally consecutive pixels into one data pack results in 2 (horizontal) by 16 (vertical) data packs. Since "number of accesses to same row address of SDRAM"=16 and "number of changes of row address of SDRAM"=2 for each macroblock, the number of cycles necessary for transfer of one macroblock is (16+4)×2=40. Accordingly, transfer of both of the color difference signals requires 80 cycles. Therefore, the number of transfer cycles per data pack is 1.25(=80/(2×16×2)).

In the case where the transfer method of this embodiment is not used, "number of accesses to same row address of SDRAM"=2 and "number of changes of row address of SDRAM"=16 for each macroblock. Thus, the number of cycles necessary for transfer of one macroblock is (2+4)×16=96. Namely, 3 cycles are necessary for each data pack. It is thus understood that this embodiment provides improved transfer efficiency.

In the case where the color difference signals are in 4:4:4 format, the calculation of the number of cycles can be carried out in the same way as the case of the luminance signal, and therefore, the descriptions thereof are herein omitted.

The above descriptions have been provided with the example of macroblock consisting of 4 (horizontal) by 16 (vertical) data packs, but the number of data packs of the macroblock is not limited to this example. For example, the present invention is applicable to a case where one macroblock has DX (horizontal) by DY (vertical) data packs (DX and DY are natural numbers). If DX≧DY, the macroblock may be horizontally scanned to write data packs on a DX packs by DX packs basis in burst mode in consecutive addresses of the temporary data storage 2. If DX<DY, the macroblock may be vertically scanned to write data packs on a DY packs by DY packs basis in burst mode in consecutive addresses of the temporary data storage 2.

According to this method, the scanning direction is switched according to the arrangement of data packs. Thus, the speed of data transfer is increased irrespective of the shape of a region on an image which is occupied by data packs or the aspect ratio of an image.

Embodiment 2

Figure 25:
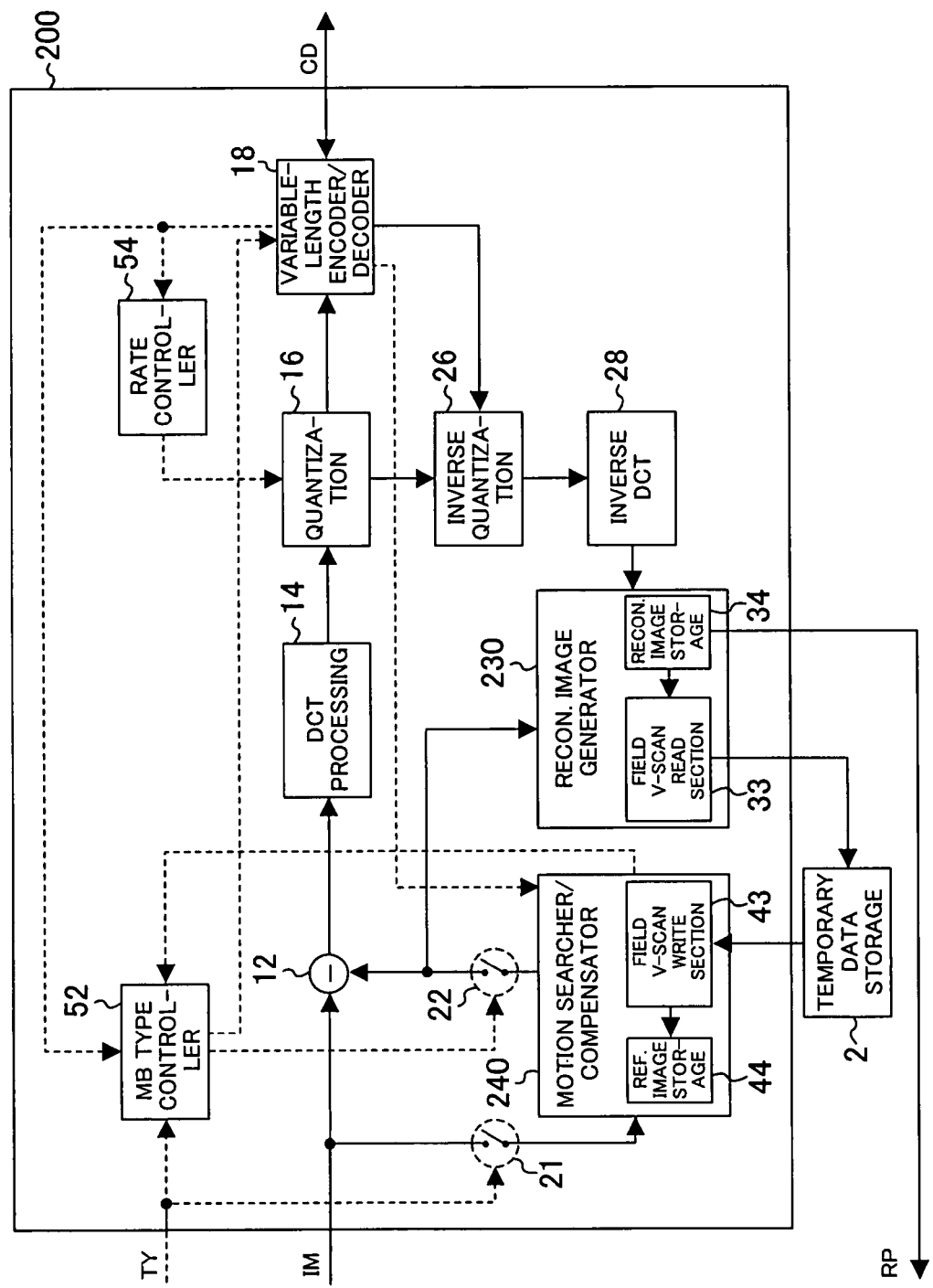
FIG. 25 is a block diagram showing a structure of an image processing device according to embodiment 2 of the present invention.

FIG. 25 is a block diagram showing a structure of an image processing device according to embodiment 2 of the present invention. This image processing device provides improved transfer efficiency of field pictures.

The image processing device 200 of FIG. 25 is substantially the same as the image processing device 100 of FIG. 1 except that the image processing device 200 includes a reconstructed image generator 230 and a motion searcher/compensator 240 in place of the reconstructed image generator 30 and the motion searcher/compensator 40, respectively. The reconstructed image generator 230 includes a field vertical scan read section 33 and a reconstructed image storage 34. The motion searcher/compensator 240 includes a field vertical scan write section 43 and a reference image storage 44.

Figure 26:
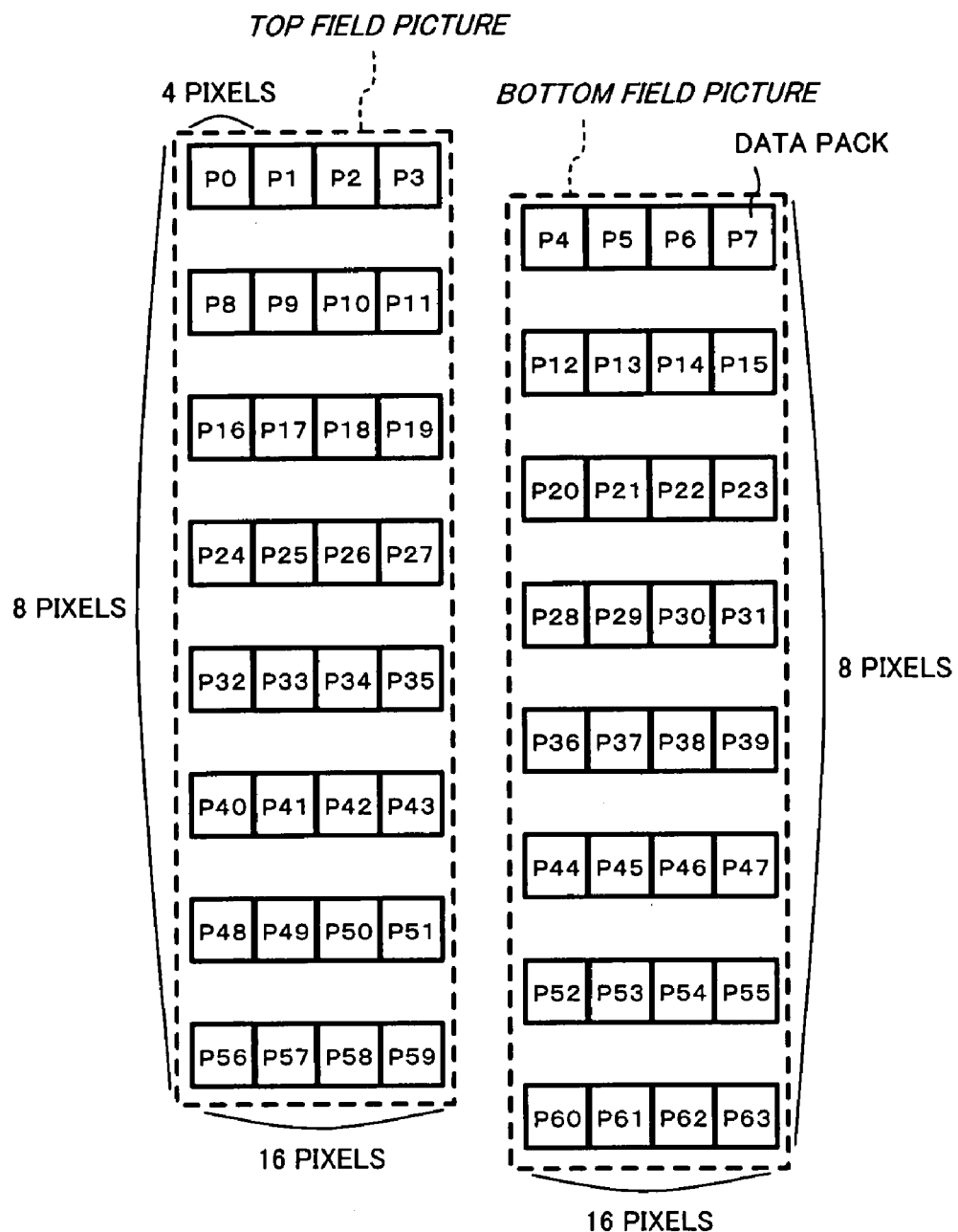
FIG. 26 shows the pixel data of FIG. 13 separated into two fields.
Figure 27:
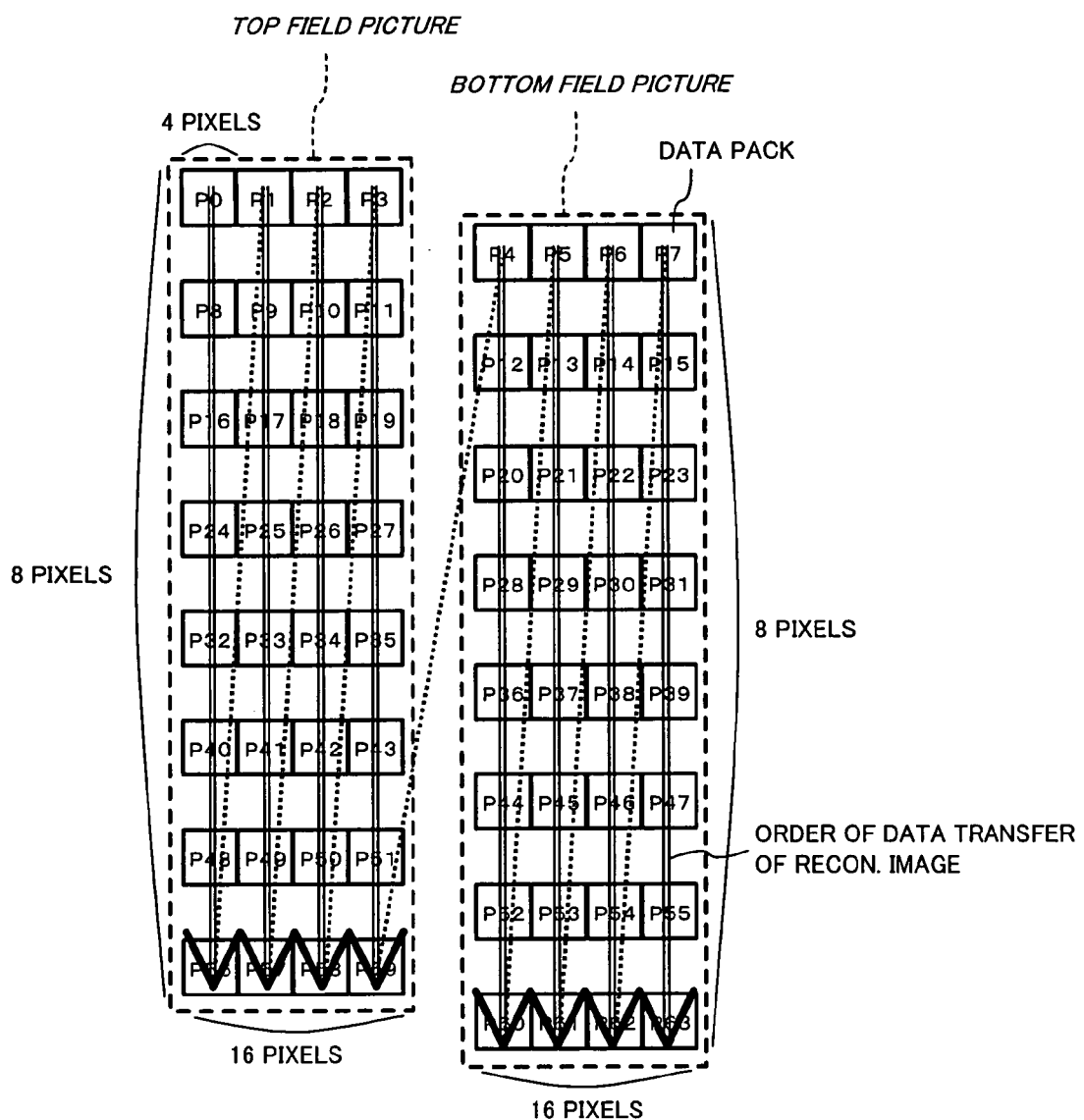
FIG. 27 illustrates the order of transfer of the data of FIG. 26 by a field vertical scan read section of FIG. 25.

FIG. 26 shows the pixel data of FIG. 13 separated into two fields. FIG. 27 illustrates the order of transfer of the data of FIG. 26 by the field vertical scan read section 33 of FIG. 25. The field vertical scan read section 33 separately reads data packs of odd-numbered lines (TOP field) of the image of FIG. 13 and data packs of even-numbered lines (BOTTOM field) of the image of FIG. 13 and writes the read data packs in the temporary data storage 2.

Specifically, the field vertical scan read section 33 first transfers the data of the leftmost column of the TOP field picture of FIG. 27 in the order of data packs P0, P8, P16, . . . and P56 from the reconstructed image storage 34 to the temporary data storage 2. Then, the field vertical scan read section 33 transfers the data of the second leftmost column of the TOP field picture of FIG. 27 in the order of data packs P1, P9, P17, ... and P57 from the reconstructed image storage 34 to the temporary data storage 2.

Then, the field vertical scan read section 33 transfers the data of the third leftmost column of the TOP field picture of FIG. 27 in the order of data packs P2, P10, P18, ... and P58 from the reconstructed image storage 34 to the temporary data storage 2. Then, the field vertical scan read section 33 transfers the data of the rightmost column of the TOP field picture of FIG. 27 in the order of data packs P3, P11, P19, ... and P59 from the reconstructed image storage 34 to the temporary data storage 2. Thus, transfer of the TOP field of one macroblock completes.

Thereafter, the field vertical scan read section 33 transfers the data of the leftmost column of the BOTTOM field picture of FIG. 27 in the order of data packs P4, P12, P20, ... and P60 from the reconstructed image storage 34 to the temporary data storage 2. Subsequently, the field vertical scan read section 33 transfers the BOTTOM field picture of FIG. 27 in the order of data packs P5, P13, P21, ..., P61, P6, P14, P22, ..., P62, P7, P15, P23, ... and P63 from the reconstructed image storage 34 to the temporary data storage 2 in the same way. Thus, transfer of the BOTTOM field of one macroblock completes. Hence, transfer of one macroblock completes.

Figure 28:
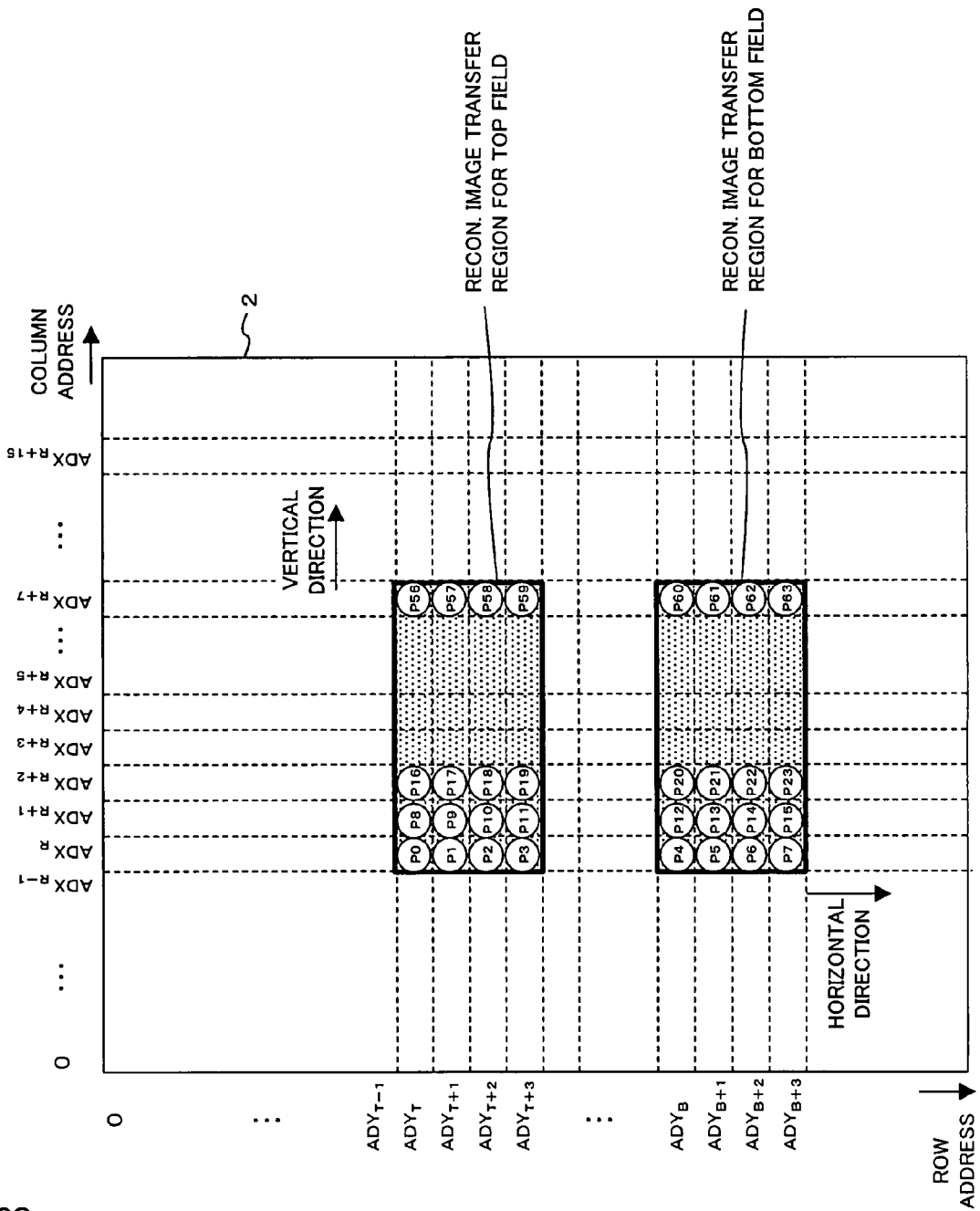
FIG. 28 illustrates an example of mapping of data stored in a temporary data storage of FIG. 25.

FIG. 28 illustrates an example of mapping of data stored in the temporary data storage 2 of FIG. 25. The field vertical scan read section 33 writes the data packs of the TOP field and the data packs of the BOTTOM field in different regions of the temporary data storage 2 in burst mode.

Specifically, the field vertical scan read section 33 writes data packs P0, P8, P16, ... and P56 of the leftmost column of the TOP field of FIG. 27 in addresses $SD(ADX_R, ADY_T)$, $SD(ADX_{R+1}, ADY_T)$, $SD(ADX_{R+2}, ADY_T)$, ... and $SD(ADX_{R+7}, ADY_T)$ of the temporary data storage 2, respectively, in burst mode without changing the row address. Then, the field vertical scan read section 33 changes the row address from $ADY_T$ to $ADY_{T+1}$ to write data packs P1, P9, P17, ... and P57 of the second leftmost column of the TOP field in addresses $SD(ADX_R, ADY_{T+1})$, $SD(ADX_{R+1}, ADY_{T+1})$, $SD(ADX_{R+2}, ADY_{T+1})$, ... and $SD(ADX_{R+7}, ADY_{T+1})$, respectively, in burst mode without changing the row address.

In the same way, the field vertical scan read section 33 changes the row address to $ADY_{T+2}$ to write the data of the third leftmost column of the TOP field in one row and then changes the row address to $ADY_{T+3}$ to write the data of the rightmost column of the TOP field in another one row.

Subsequently, the field vertical scan read section 33 writes data packs P4, P12, P20, ... and P60 of the leftmost column of the BOTTOM field of FIG. 27 in addresses $SD(ADX_R, ADY_B)$, $SD(ADX_{R+1}, ADY_B)$, $SD(ADX_{R+2}, ADY_B)$, ... and $SD(ADX_{R+7}, ADY_B)$ of the temporary data storage 2, respectively, in burst mode without changing the row address.

In the same way, the field vertical scan read section 33 changes the row address to $ADY_{B+1}$ to write the data of the second leftmost column of the BOTTOM field in one row, then changes the row address to $ADY_{B+2}$ to write the data of the third leftmost column of the BOTTOM field in another one row, and then changes the row address to $ADY_{B+3}$ to write the data of the rightmost column of the BOTTOM field in still another one row. Thus, such a procedure reduces the number of changes of the row address in data transfer even in the case of a field picture.

The above-described manner of storage of data packs as illustrated in FIG. 28 is hereinafter referred to as the field mapping storage mode.

In the case where a reconstructed image is transferred to the temporary data storage 2, "number of accesses to same row address of SDRAM"=8, "number of cycles for address setting of SDRAM"=4, and "number of changes of row address of SDRAM"=4 for each field of each macroblock. As a result of a calculation based on the above-described formula (C1), the number of cycles necessary for transfer of one of the fields of one macroblock is (8+4)×4=48, and the number of transfer cycles per data pack is 1.5 (=48×2/64). It is thus understood that the transfer efficiency is improved as compared with the conventional case (2(=(4+4)×8×2/64) cycles per data pack).

Figure 29:
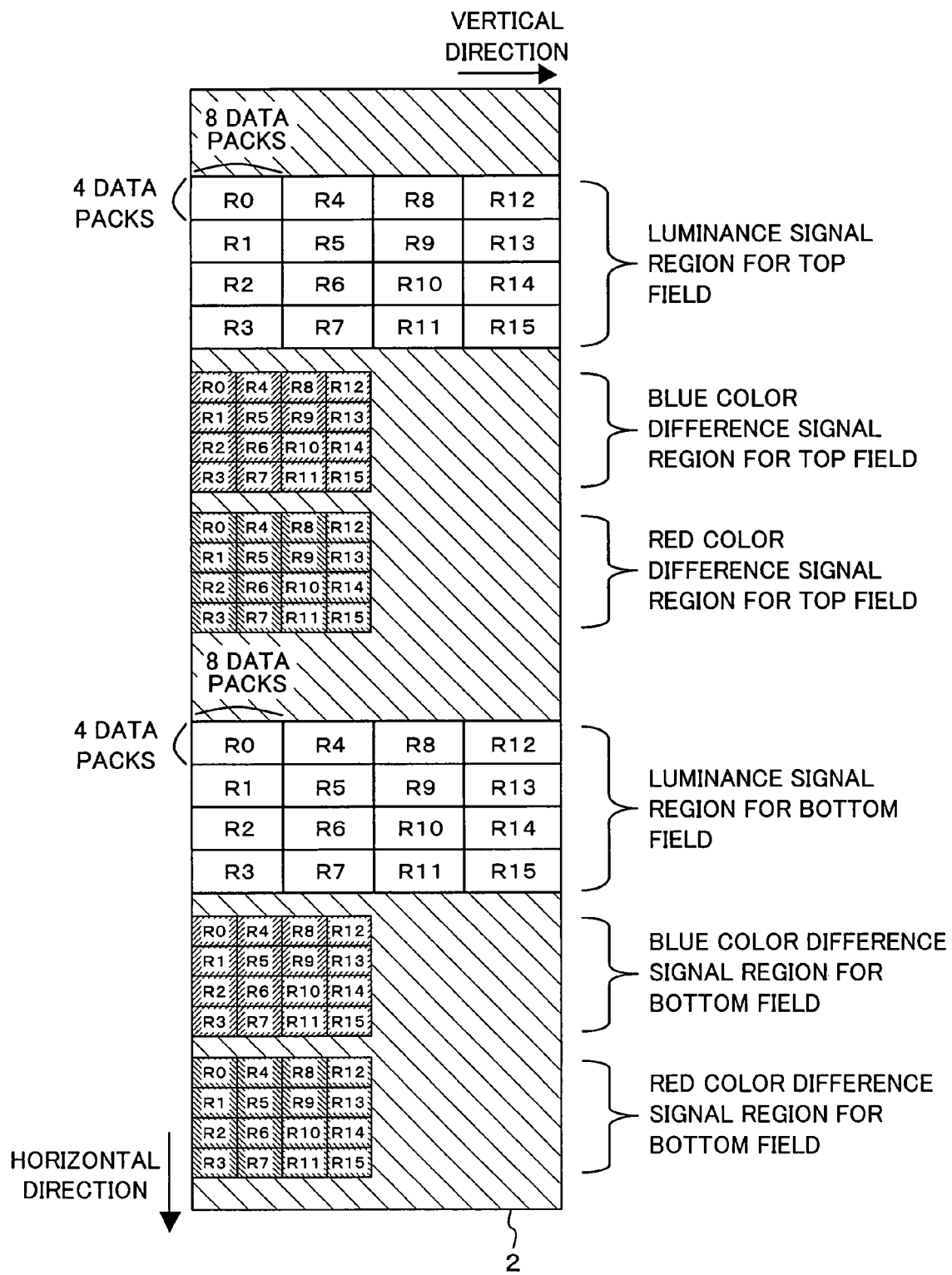
FIG. 29 illustrates the positions in the temporary data storage of FIG. 25 where macroblocks are stored for the luminance signal and color difference signals.

FIG. 29 illustrates the positions in the temporary data storage 2 of FIG. 25 where macroblocks are stored for the luminance signal and color difference signals. The temporary data storage 2 stores the signals for the TOP field and the signals for the BOTTOM field of reconstructed images R0 to R15 in different regions as shown in FIG. 29.

For the same reasons described as to the example of FIG. 21, the positional relationship between pixel data is not marred even in the temporary data storage 2. Therefore, only necessary part of a necessary field of the reconstructed image is readily extracted and transferred as a reference image.

The field vertical scan write section 43 performs transfer (reading) of the reference image in substantially the same way as the example of FIG. 23 except that the data packs of the TOP field and the data packs of the BOTTOM field are separately read from the temporary data storage 2 in burst mode. Specifically, in the example of FIG. 29, data packs are read from 4 row addresses for each field (5 row addresses for each field in the case of a reference image consisting of 17 (horizontal) by 17 (vertical) pixels), and data packs corresponding to 8 column addresses are read from one row address (9 column addresses in the case of a reference image consisting of 17 (horizontal) by 17 (vertical) pixels).

Now, consider a case where one macroblock is transferred as a reference image. Since "number of accesses to same row address of SDRAM"=8, "number of cycles for address setting of SDRAM"=4, and "number of changes of row address of SDRAM"=4 for each field, transfer of one field of one macroblock requires 48 cycles as in the case of transfer to the temporary data storage 2, and hence, the number of transfer cycles per data pack is 1.5. It is thus understood that the transfer efficiency is also improved in transfer of a reference image as compared with the conventional case (2 cycles per data pack).

Now, consider a case where data consisting of 17 (horizontal) by 17 (vertical) pixels is transferred as a reference image. In the case where the transfer method of this embodiment is not used, the number of accesses to the same row address is 5 and the number of changes of the row address is 9 for each field. Based on formula (C1), the number of cycles necessary is (5+4)×9=81. On the other hand, in the case of this embodiment, the number of accesses to the same row address is 9, the number of changes of the row address is 5, and hence, the transfer completes in (9+4)×5=65 cycles. In this case, the number of transfer cycles per data pack is about 1.44.

The transfer process is also carried out for the color difference signals in the same way as the case of the luminance signal. As for the color difference signals, the number of transfer cycles regarding the temporary data storage 2 is calculated based on formula (C1). It should be noted that writing in the temporary data storage 2 and reading from the temporary data storage 2 require an equal number of transfer cycles.

In the case of 4:2:0 format, each color difference signal (blue color difference signal or red color difference signal) has 8 (horizontal) by 8 (vertical) pixels per macroblock. Therefore, conversion of every 4 horizontally consecutive pixels into one data pack results in 2 (horizontal) by 4 (vertical) data packs for each field. Since "number of accesses to same row address of SDRAM"=4 and "number of changes of row address of SDRAM"=2 for each field of one macroblock, the number of cycles necessary for the transfer is (4+4)×2=16. Accordingly, transfer of both of the color difference signals of both fields requires 64 cycles. Therefore, the number of transfer cycles per data pack is 2 (=64/(2×4×2×2)).

In the case where the transfer method of this embodiment is not used, "number of accesses to same row address of SDRAM"=2 and "number of changes of row address of SDRAM"=4 for each field of one macroblock. Thus, the number of cycles necessary for the transfer is (2+4)×4=24. Namely, 3 cycles are necessary for each data pack. It is thus understood that this embodiment provides improved transfer efficiency.

In the case of 4:2:2 format, each color difference signal has 8 (horizontal) by 16 (vertical) pixels per macroblock. Therefore, conversion of every 4 horizontally consecutive pixels into one data pack results in 2 (horizontal) by 8 (vertical) data packs for each field. Since "number of accesses to same row address of SDRAM"=8 and "number of changes of row address of SDRAM"=2 for each field of one macroblock, the number of cycles necessary for the transfer is (8+4)×2=24. Accordingly, transfer of both of the color difference signals of both fields requires 96 cycles. Therefore, the number of transfer cycles per data pack is 1.5 (=96/(2×8×2×2)).

In the case where the transfer method of this embodiment is not used, "number of accesses to same row address of SDRAM"=2 and "number of changes of row address of SDRAM"=8 for each field of one macroblock. Thus, the number of cycles necessary for the transfer is (2+4)×8=48. Namely, 3 cycles are necessary for each data pack. It is thus understood that this embodiment provides improved transfer efficiency.

In the case where the color difference signals are in 4:4:4 format, the calculation of the number of cycles can be carried out in the same way as the case of the luminance signal, and therefore, the descriptions thereof are herein omitted.

Although in the examples described above, in the temporary data storage 2, the range of the column addresses in which the data of the TOP field are stored, $ADX_R$ to $ADX_{R+7}$, is the same as the range of the column addresses in which the data of the BOTTOM field are stored as illustrated in FIG. 28, the data of the respective fields may be stored in different ranges of column addresses.

Figure 30:
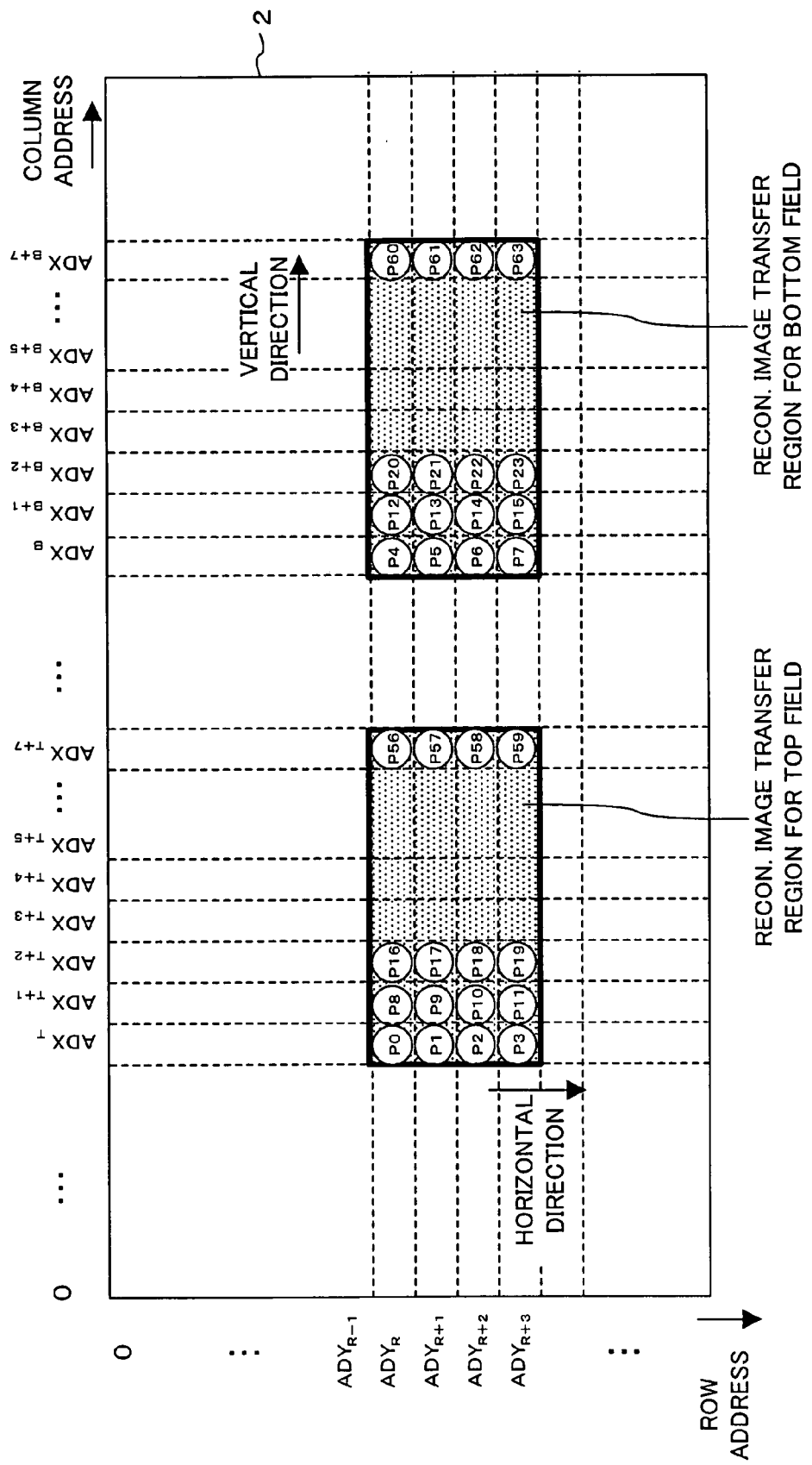
FIG. 30 illustrates another example of mapping of data stored in the temporary data storage of FIG. 25.

FIG. 30 illustrates another example of mapping of data stored in the temporary data storage 2 of FIG. 25. FIG. 30 shows another example of field mapping. As illustrated in this example, data packs of a line of the top field and data packs of a line of the BOTTOM field may be written while the row address is fixed.

For example, the data of the TOP field and the data of the BOTTOM field are alternately transferred. Specifically, in the case of transferring the data packs of FIG. 26, the leftmost column of the TOP field is first transferred in the order of data packs P0, P8, P16, . . . and P56. Then, the leftmost column of the BOTTOM field is transferred in the order of data packs P4, P12, P20, . . . and P60. In this case, these data packs are stored in the same row of row address $ADY_R$ as illustrated in FIG. 30.

Subsequently, the second leftmost column of the TOP field is first transferred in the order of data packs P1, P9, P17, . . . and P57. Then, the second leftmost column of the BOTTOM field is transferred in the order of data packs P5, P13, P21, . . . and P61. These data packs are stored in the row of row address $ADY_{R+1}$ of FIG. 30.

Then, the third leftmost column of the TOP field is transferred in the order of data packs P2, P10, P18, . . . and P58, and then, the third leftmost column of the BOTTOM field is transferred in the order of data packs P6, P14, P22, . . . and P62. These data packs are stored in the row of row address $ADY_{R+2}$ of FIG. 30.

Lastly, the rightmost column of the TOP field is transferred in the order of data packs P3, P11, P19, . . . and P59, and then, the rightmost column of the BOTTOM field is transferred in the order of data packs P7, P15, P23, . . . and P63. Thus, transfer of one macroblock completes. These data packs are stored in the row of row address $ADY_{R+3}$ of FIG. 30.

According to the storage method with the mapping of FIG. 30, the pixels of the same column of the reconstructed image of the TOP field and the BOTTOM field are stored in regions designated by the same row address. Therefore, for the total of the TOP field and the BOTTOM field, it is only necessary to change the row address 4 times per macroblock. Namely, it is only necessary to change the row address 4 times for each field, and therefore, the speed of data transfer is increased.

Embodiment 3

In embodiment 3, an example of storage of the color difference signals is described. First, a process of a frame picture by the image processing device of FIG. 1 is described.

Figure 31:
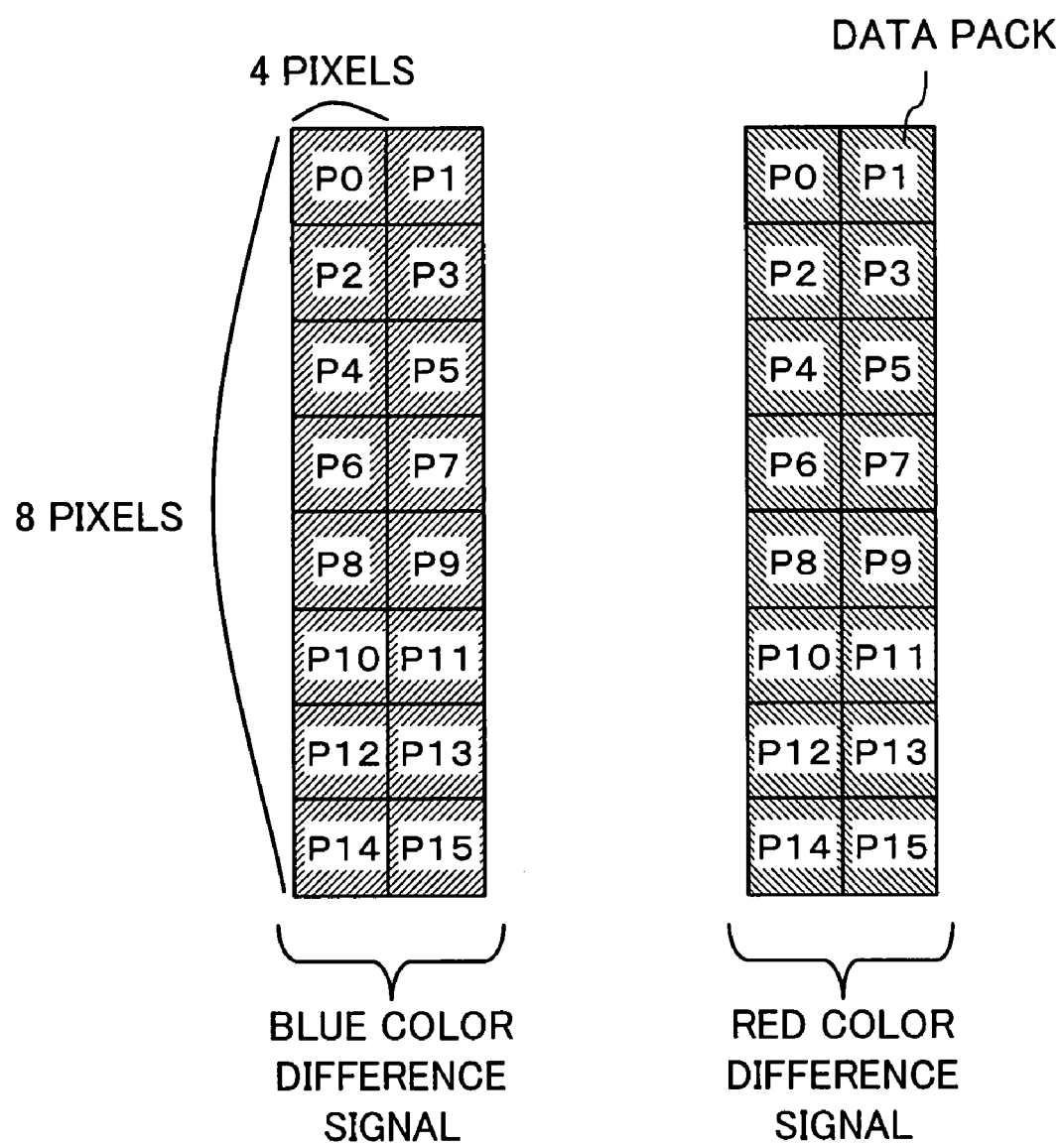
FIG. 31 shows data packs of the blue color difference signal and red color difference signal (4:2:0 format) of one macroblock in a frame picture such that the data packs correspond to positions over a display.

FIG. 31 shows data packs of the blue color difference signal and red color difference signal (4:2:0 format) of one macroblock in a frame picture such that the data packs correspond to positions over a display. In FIG. 31, each color difference signal (each having 8 (horizontal) by 8 (vertical) pixels) includes data packs each consisting of 4 horizontally consecutive pixels as does the luminance signal.

Figure 32:
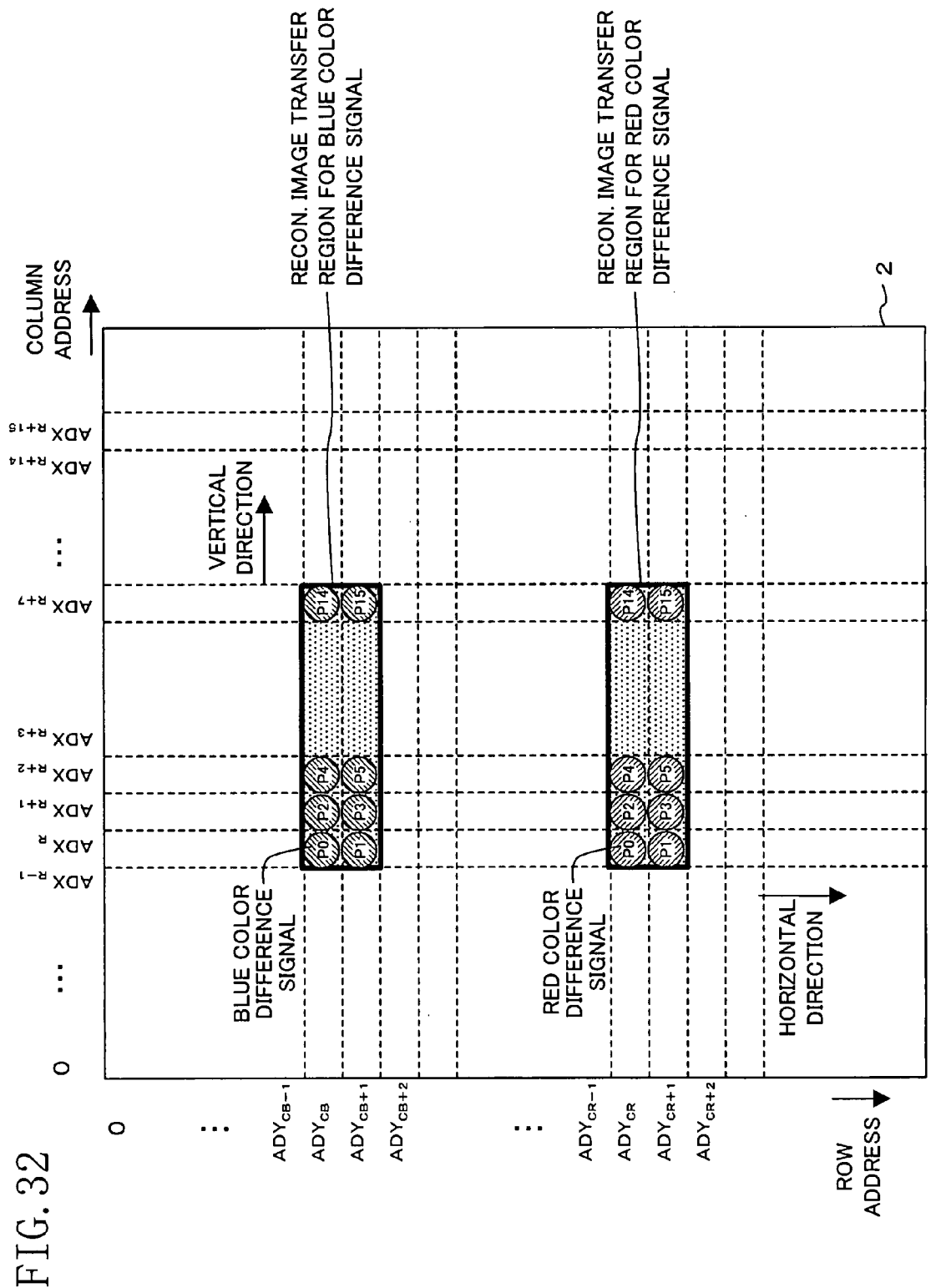
FIG. 32 illustrates an example of mapping of the color difference signals in the temporary data storage of FIG. 1.

FIG. 32 illustrates an example of mapping of the color difference signals in the temporary data storage 2 of FIG. 1. FIG. 32 shows an example where the blue color difference signal and the red color difference signal are stored in different regions as in embodiment 1. In this case, the frame vertical scan read section 32 of FIG. 1 writes the blue color difference signal of FIG. 31 in the temporary data storage 2 in the order of P0→P2→ . . . →P14→P1→P3→ . . . →P15, and then writes the red color difference signal of FIG. 31 in the temporary data storage 2 in the order of P0→P2→ . . . P14→P1→P3→ . . . →P15. Data packs P0, P2, . . . and P14 of the blue color difference signal (hereinafter, simply referred to as "blue data packs P0, P2, . . . and P14") are stored in one row address, and data packs P0, P2, . . . and P14 of the red color difference signal (hereinafter, simply referred to as "red data packs P0, P2, . . . and P14") are stored in another one row address.

Figure 33:
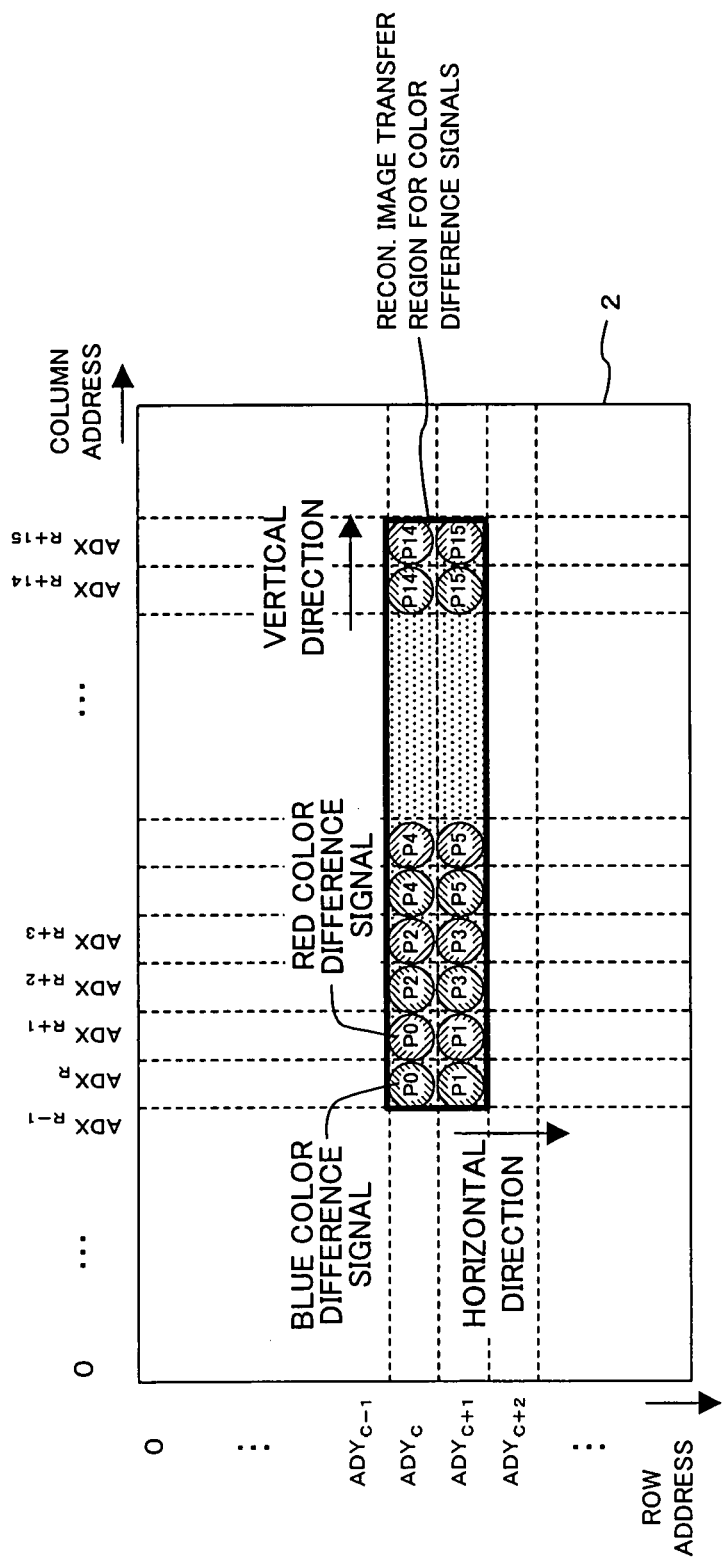
FIG. 33 illustrates another example of mapping of the color difference signals in the temporary data storage of FIG. 1.

FIG. 33 illustrates another example of mapping of the color difference signals in the temporary data storage 2 of FIG. 1. No matter which of 4:4:4, 4:2:2, or 4:2:0 the image format is, the blue color difference signal and the red color difference signal have equal amounts of information. The data of an identical position of the color difference signals (e.g., blue data pack P0 and red data pack P0 in FIG. 31) are used for display of the same pixel and therefore need to be read out at the same timing.

The frame vertical scan read section 32 of FIG. 1 writes the data of the color difference signals of FIG. 31 in the temporary data storage 2 in the order of blue data pack P0→red data pack P0→blue data pack P2→red data pack P2→ . . . →blue data pack P14→red data pack P14 as illustrated in FIG. 33. Herein, blue data packs P0, P2, . . . and P14 and red data packs P0, P2, . . . and P14 are written in one row address. Namely, a column of the data packs of the blue color difference signal of FIG. 31 and a column of the data packs of the red color difference signal of FIG. 31 are stored in the same row address, whereby both of the color difference signals are stored in the same region.

In the example of FIG. 32, it is necessary to designate the row address 4 times per macroblock to transfer the color difference signals. Calculating the number of transfer cycles necessary for transfer of both of the color difference signals based on formula (C1) where "number of accesses to same row address of SDRAM"=8, "number of cycles for address setting of SDRAM"=4, and "number of changes of row address of SDRAM"=4 for each macroblock, the number of cycles necessary for the transfer is (8+4)×4=48, and accordingly, the number of transfer cycles per data pack is 1.5 (=48/(2×8×2)).

In the example of FIG. 33, it is necessary to designate the row address only 2 times per macroblock. Since "number of accesses to same row address of SDRAM"=16 and "number of changes of row address of SDRAM"=2 for each macroblock, the number of transfer cycles necessary for transfer of both of the color difference signals is (16+4)×2=40. Accordingly, the number of transfer cycles per data pack is 1.25 (=40/(2×8×2)), which confirms improved transfer efficiency.

Next, an example where the image processing device of FIG. 25 processes a field picture is described.

Figure 34:
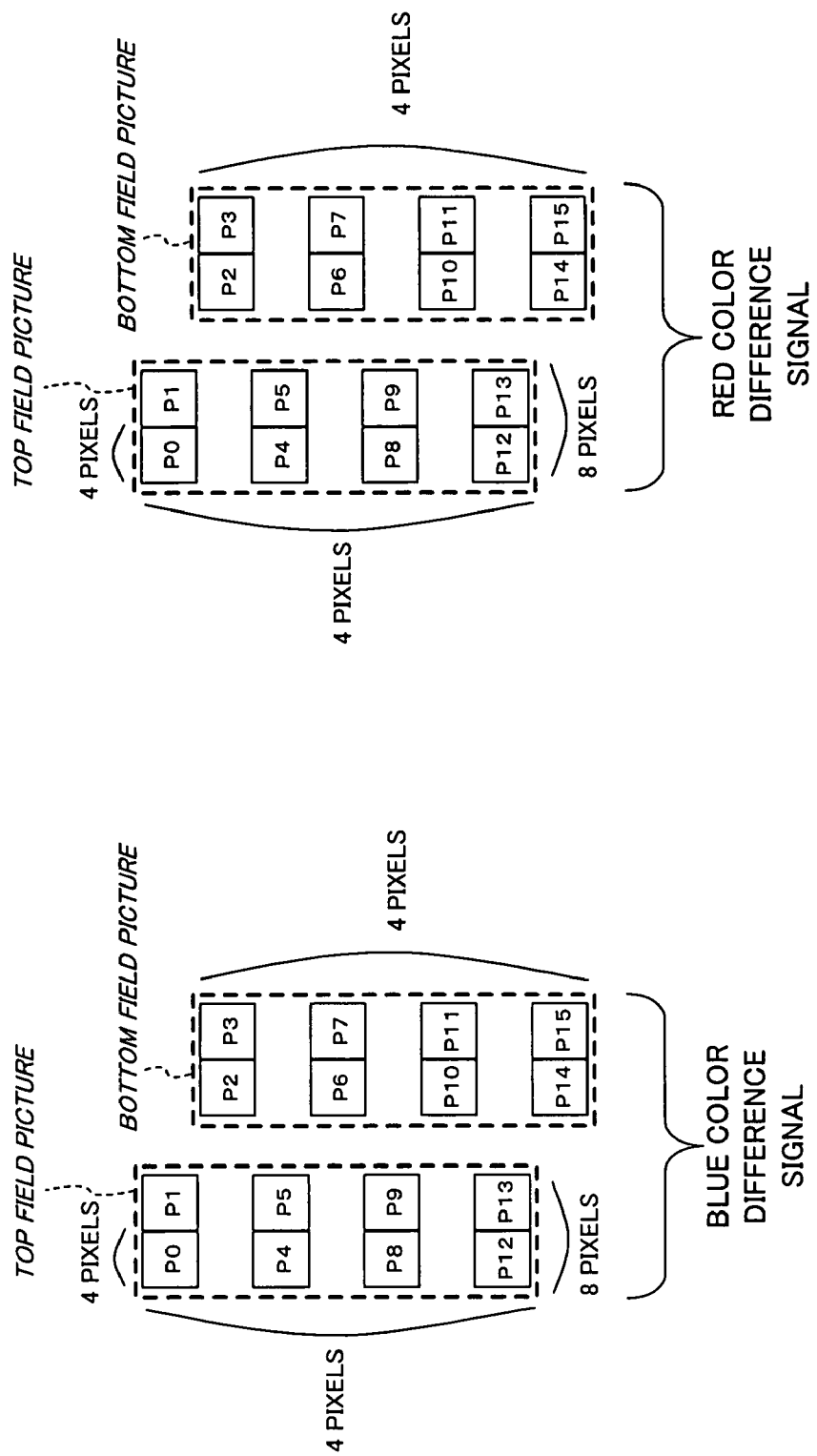
FIG. 34 shows data packs of the blue color difference signal and red color difference signal (4:2:0 format) of one macroblock in a field picture such that the data packs correspond to positions over a display.

FIG. 34 shows data packs of the blue color difference signal and red color difference signal (4:2:0 format) of one macroblock in a field picture such that the data packs correspond to positions over a display. In FIG. 34, each color difference signal (each having 8 (horizontal) by 8 (vertical) pixels) includes data packs each consisting of 4 horizontally consecutive pixels as does the luminance signal.

Figure 35:
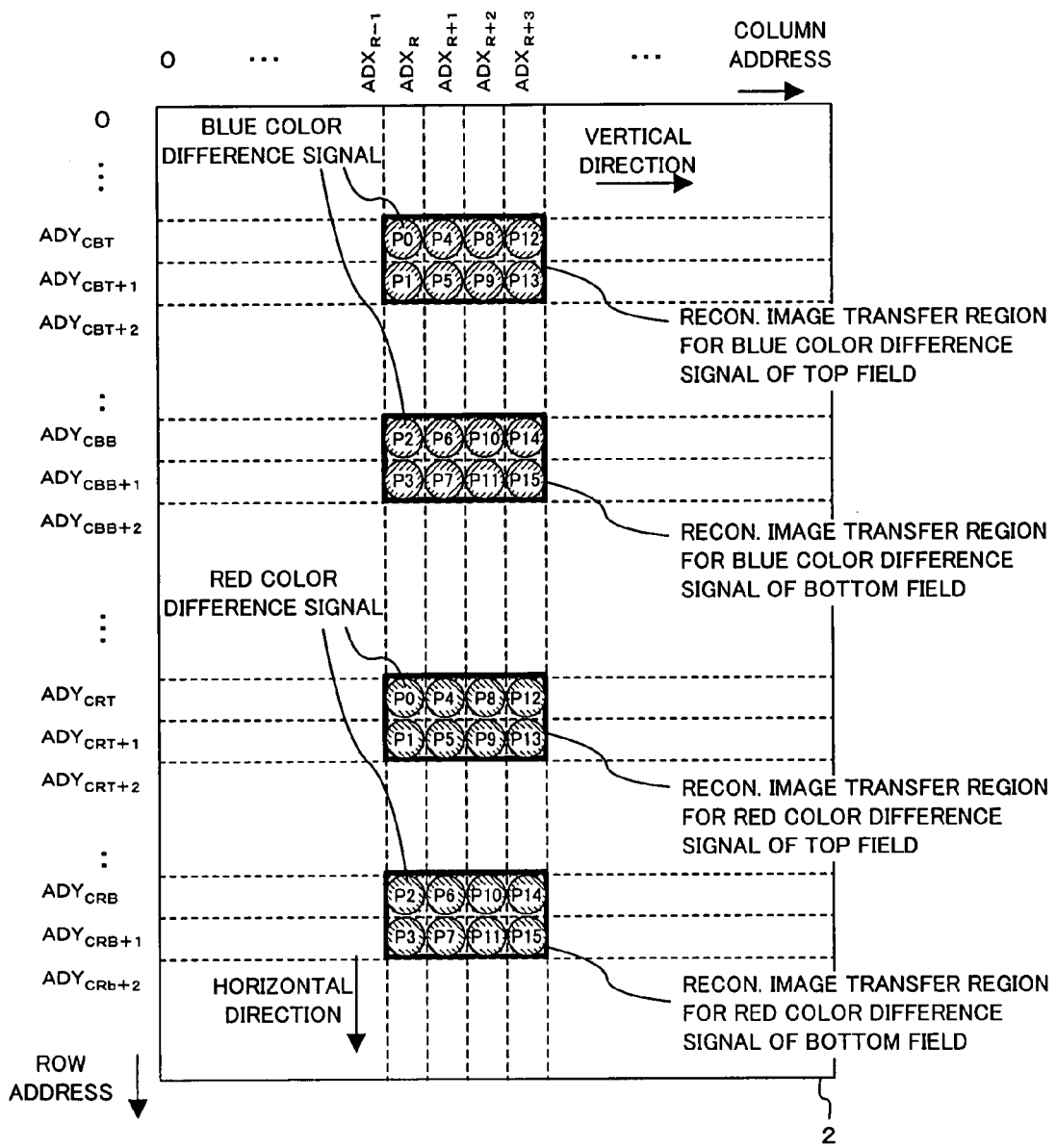
FIG. 35 illustrates an example of mapping of the color difference signals in the temporary data storage of FIG. 25.

FIG. 35 illustrates an example of mapping of the color difference signals in the temporary data storage 2 of FIG. 25. FIG. 35 shows an example where the blue color difference signal and the red color difference signal are stored in different regions as in embodiment 2. In this case, the field vertical scan read section 33 of FIG. 1 writes the blue color difference signal of the TOP field of FIG. 34 in the temporary data storage 2 in the order of P0→P4→ . . . →P12→P1→P5→ . . . →P13, and then writes the blue color difference signal of the BOTTOM field of FIG. 34 in the temporary data storage 2 in the order of P2→P6→ . . . →P14→P3→P7→ . . . →P15 as illustrated in FIG. 35. Then, the field vertical scan read section 33 writes the red color difference signal of the TOP field of FIG. 34 in the temporary data storage 2 in the order of P0→P4→ . . . →P12→P1→P5→ . . . →P13, and then writes the red color difference signal of the BOTTOM field of FIG. 34 in the temporary data storage 2 in the order of P2→P6→ . . . →P14→P3→P7→ . . . →P15 as illustrated in FIG. 35. Data packs P0, P4, . . . and P12 of the blue color difference signal (hereinafter, simply referred to as "blue data packs P0, P4, . . . and P12") are stored in one row address, and data packs P0, P4, . . . and P12 of the red color difference signal (hereinafter, simply referred to as "red data packs P0, P4, . . . and P12") are stored in another one row address.

Figure 36:
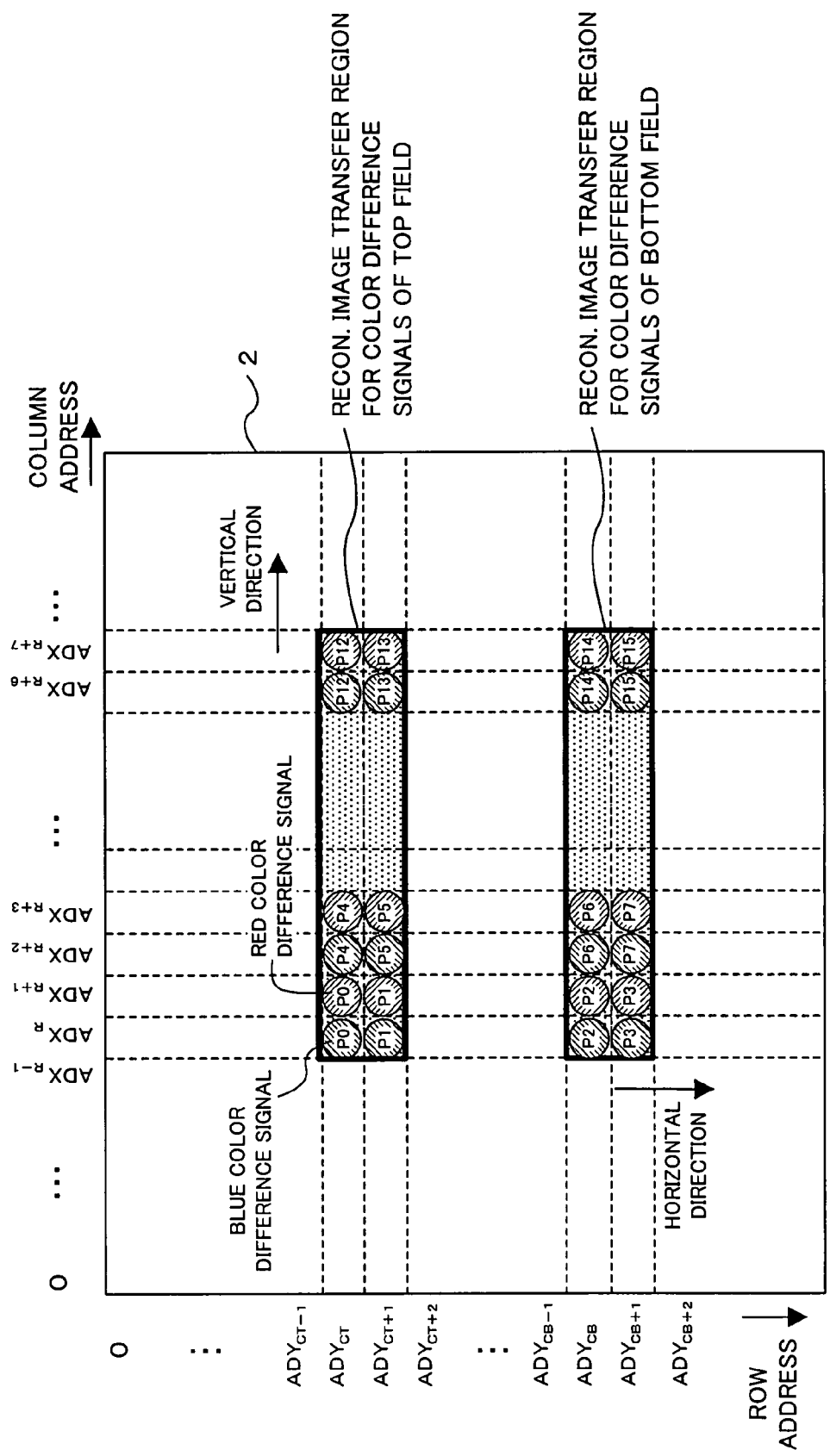
FIG. 36 illustrates another example of mapping of the color difference signals in the temporary data storage of FIG. 25.

FIG. 36 illustrates another example of mapping of the color difference signals in the temporary data storage 2 of FIG. 25. Even in a field picture, the data of an identical position of the color difference signals (e.g., blue data pack P0 and red data pack P0 in FIG. 34) are used for display of the same pixel and therefore need to be read out at the same timing.

The field vertical scan read section 33 of FIG. 25 writes the data of the color difference signals of FIG. 34 in the temporary data storage 2 in the order of blue data pack P0→red data pack P0→blue data pack P4→red data pack P4→ . . . →blue data pack P12→red data pack P12 as illustrated in FIG. 36. Herein, blue data packs P0, P4, . . . and P12 and red data packs P0, P4, . . . and P12 are written in one row address. Namely, a column of the data packs of the blue color difference signal of FIG. 34 and a column of the data packs of the red color difference signal of FIG. 34 are stored in the same row address, whereby both of the color difference signals are stored in the same region.

In the example of FIG. 35, it is necessary to designate the row address 8 times per macroblock to transfer the color difference signals. Calculating the number of transfer cycles necessary for transfer of both of the color difference signals based on formula (C1) where "number of accesses to same row address of SDRAM"=4, "number of cycles for address setting of SDRAM"=4, and "number of changes of row address of SDRAM"=8 for each macroblock, the number of cycles necessary for the transfer is (4+4)×8=64, and accordingly, the number of transfer cycles per data pack is 2 (=64/(2×8 ×2)).

In the example of FIG. 36, it is necessary to designate the row address only 4 times per macroblock. Since "number of accesses to same row address of SDRAM"=8 and "number of changes of row address of SDRAM"=4 for each macroblock, the number of transfer cycles necessary for transfer of both of the color difference signals is (8+4)×4=48. Accordingly, the number of transfer cycles per data pack is 1.5 (=48/(2×8×2)), which confirms improved transfer efficiency.

Although the above descriptions are provided in connection with the image of 4:2:0 format, this embodiment is also applicable to 4:2:2 format and 4:4:4 format such that the color difference signals can be stored as illustrated in FIG. 33 and FIG. 36.

Figure 37:
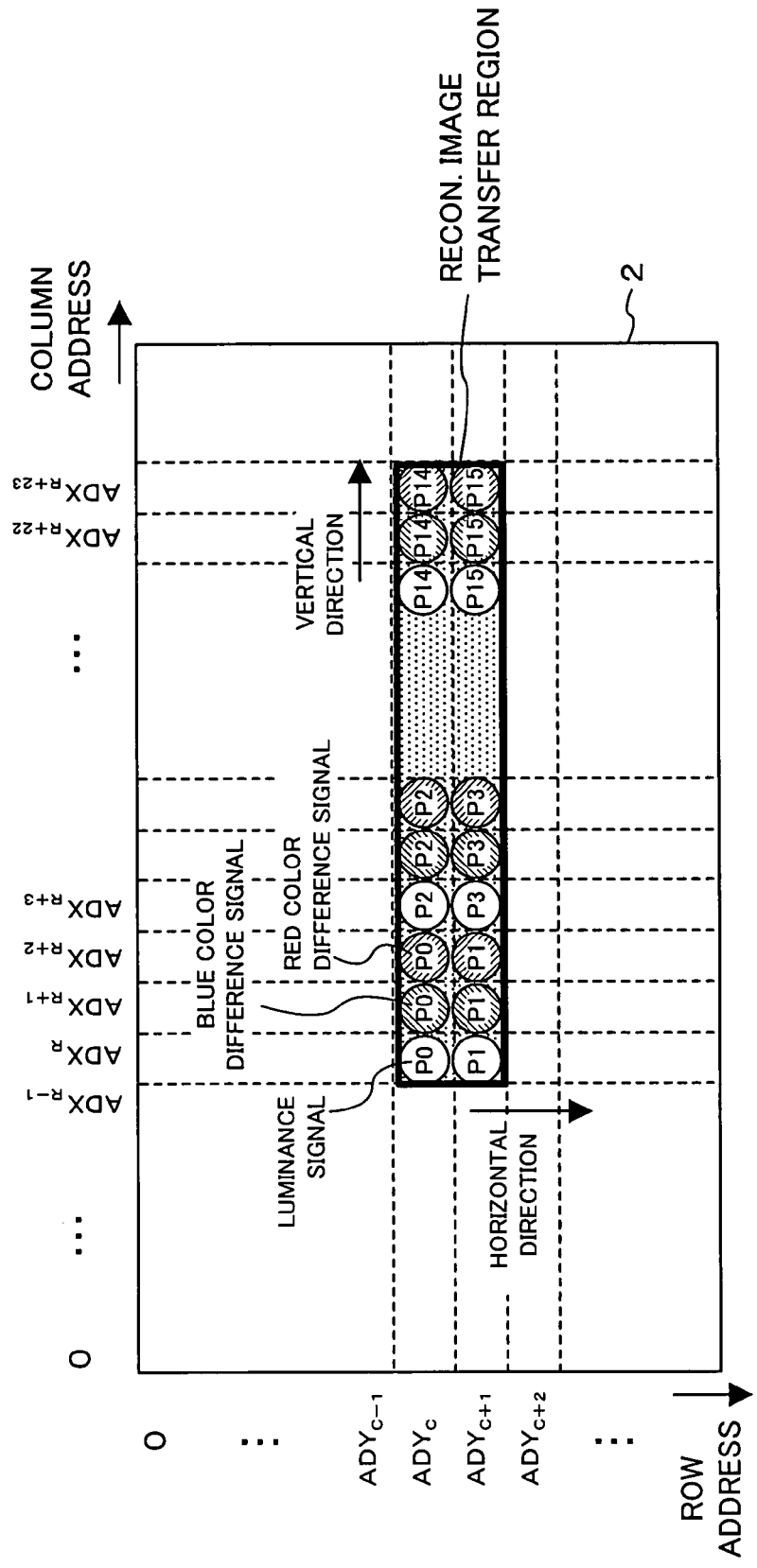
FIG. 37 illustrates an example of mapping of the luminance signal and color difference signals in the temporary data storage of FIG. 1.

FIG. 37 illustrates an example of mapping of the luminance signal and color difference signals in the temporary data storage 2 of FIG. 1. In the case where the image format is 4:4:4, the luminance signal, the blue color difference signal, and the red color difference signal have equal amounts of information. Therefore, the frame vertical scan read section 32 of FIG. 1 may sequentially store the luminance signal, the blue color difference signal, and the red color difference signal in one row address of the temporary data storage 2 on a data pack by data pack basis as illustrated in FIG. 37.

Figure 38:
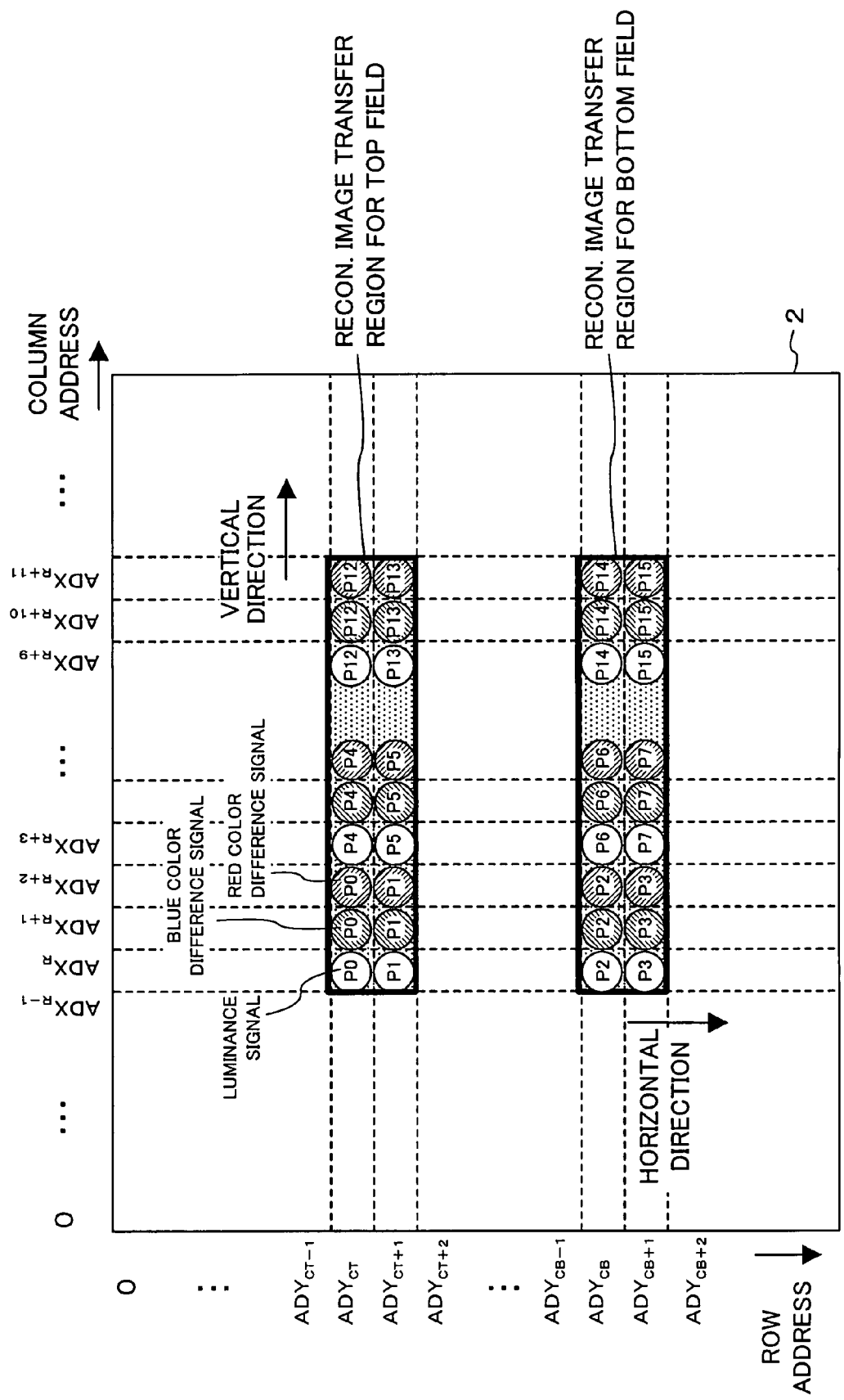
FIG. 38 illustrates an example of mapping of the luminance signal and color difference signals in the temporary data storage of FIG. 25.

FIG. 38 illustrates an example of mapping of the luminance signal and color difference signals in the temporary data storage 2 of FIG. 25. In the case where the image format is 4:4:4, the field vertical scan read section 33 of FIG. 25 may sequentially store the luminance signal, the blue color difference signal, and the red color difference signal in one row address of the temporary data storage 2 on a data pack by data pack basis as illustrated in FIG. 38.

The procedures of data storage illustrated in FIG. 37 and FIG. 38 reduce the number of changes of the row address of the SDRAM in data transfer and therefore provide improved transfer efficiency.

Alternatively, the mode of data storage in the temporary data storage 2 may be adaptively changed according to the format of an image which is to be processed. Specifically, in the case where the image format is 4:2:0 or 4:2:2, only the color difference signals are alternately mapped as illustrated in FIG. 33 or FIG. 36. In the case where the image format is 4:4:4, the luminance signal and the color difference signals are alternately mapped as illustrated in FIG. 37 or FIG. 38.

In each of FIG. 35, FIG. 36 and FIG. 38, the data of pixels of the TOP field (the luminance signal and the color difference signals) and the data of pixels of the BOTTOM field may be stored in the same row address as illustrated in FIG. 30.

In encoding, such a mode is possible that the luminance signal is stored in the frame mapping format, while the color difference signals are stored using any one of the frame mapping format, the field mapping format, and the combination of frame mapping format and field mapping format.

Embodiment 4

Figure 39:
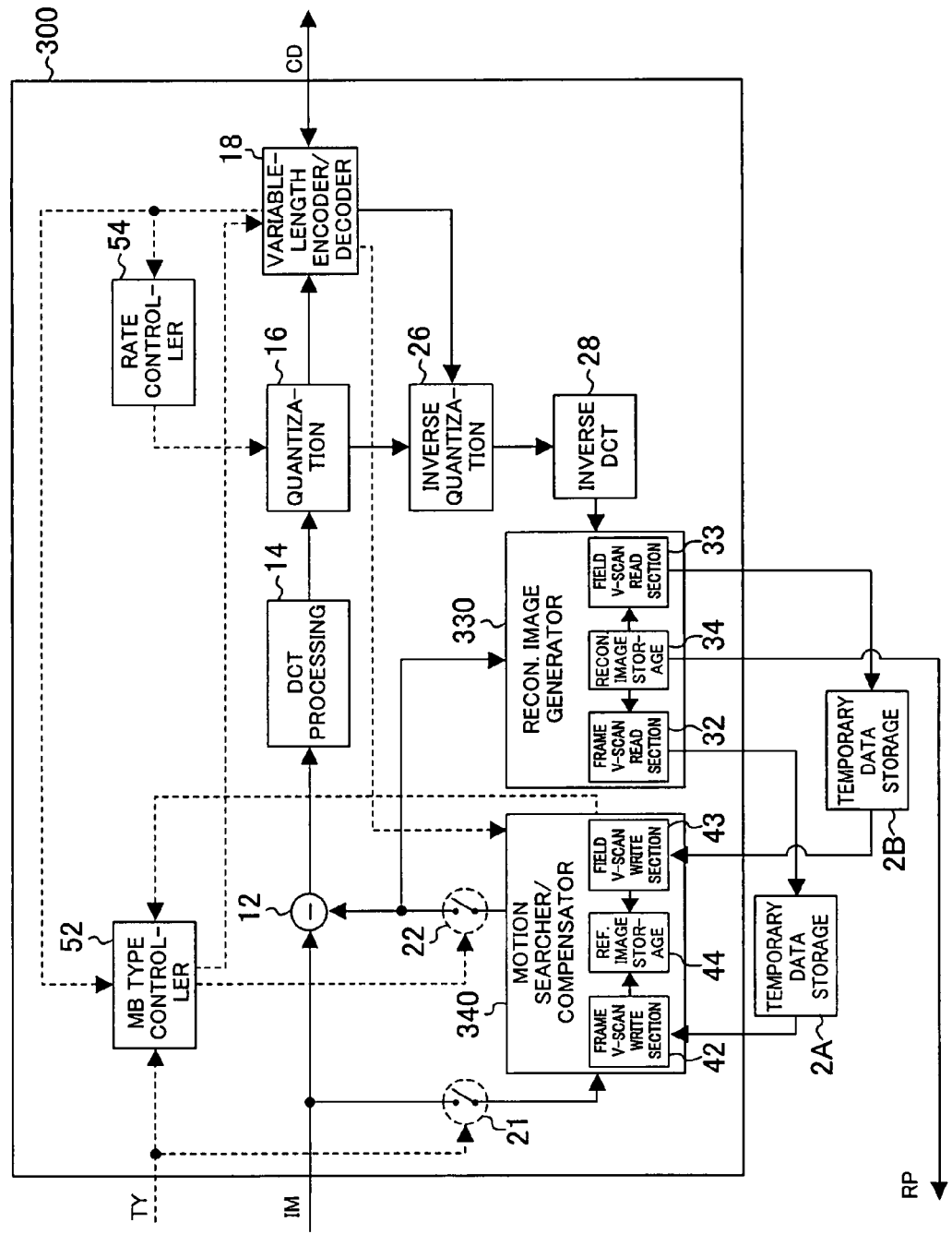
FIG. 39 is a block diagram showing a structure of an image processing device according to embodiment 4 of the present invention.

FIG. 39 is a block diagram showing a structure of an image processing device according to embodiment 4 of the present invention. The image processing device 300 of FIG. 39 is substantially the same as the image processing device 100 of FIG. 1 except that the image processing device 300 includes a reconstructed image generator 330 and a motion searcher/compensator 340 in place of the reconstructed image generator 30 and the motion searcher/compensator 40.

The reconstructed image generator 330 includes a field vertical scan read section 33 in addition to the components of the reconstructed image generator 30 of FIG. 1. The motion searcher/compensator 340 includes a field vertical scan write section 43 in addition to the components of the motion searcher/compensator 40 of FIG. 1. Herein, temporary data storages 2A and 2B are used in place of the temporary data storage 2. In the example described herein, the temporary data storages 2A and 2B are SDRAMs.

The operation of the frame vertical scan read section 32 is substantially the same as that described in embodiment 1. Specifically, the frame vertical scan read section 32 vertically scans an image as shown in FIG. 14 to transfer data packs of the luminance signal in the order of the scanning on a macroblock by macroblock basis from the reconstructed image storage 34 to the temporary data storage 2A. The transferred data packs are stored in the temporary data storage 2A in the frame mapping format. The frame vertical scan read section 32 vertically scans the image in like manner to transfer data packs of the color difference signals in the order of the scanning on a macroblock by macroblock basis from the reconstructed image storage 34 to the temporary data storage 2A. The transferred data packs are stored in the temporary data storage 2A in the frame mapping format.

The operation of the field vertical scan read section 33 is substantially the same as that described in embodiment 2. Specifically, the field vertical scan read section 33 vertically scans an image as shown in FIG. 27 to transfer data packs of the luminance signal in the order of the scanning on a macroblock by macroblock basis from the reconstructed image storage 34 to the temporary data storage 2B. The transferred data packs are stored in the temporary data storage 2B in the field mapping format. The frame vertical scan read section 32 vertically scans the image in like manner to transfer data packs of the color difference signals in the order of the scanning on a macroblock by macroblock basis from the reconstructed image storage 34 to the temporary data storage 2B. The transferred data packs are stored in the temporary data storage 2B in the field mapping format.

The motion searcher/compensator 340 reads the reference image from the temporary data storages 2A and 2B on a macroblock by macroblock basis. The motion searcher/compensator 340 selectively uses the frame search/compensation mode and the field search/compensation mode for each macroblock.

In the frame search/compensation mode, the frame vertical scan write section 42 reads data from the temporary data storage 2A in which the data is stored in the frame mapping format and stores the read data in the reference image storage 44. In the field search/compensation mode, the field vertical scan write section 43 reads data from the temporary data storage 2B in which the data is stored in the field mapping format and stores the read data in the reference image storage 44.

Since the temporary data storage 2A and the temporary data storage 2B are used to store an image in both the frame mapping format and the field mapping format, transfer of a reference image can be carried out with high transfer efficiency by selectively using a frame-formatted process or a field-formatted process. Further, data can be written in the temporary data storage 2A and the temporary data storage 2B in a parallel fashion. Therefore, a reconstructed image can be written with a high speed.

The reference image is read from any one of the temporary data storage 2A and the temporary data storage 2B. Therefore, supply of a clock to one of the temporary data storages 2A and 2B which is not used for reading of data may be stopped. This can reduce the power consumption.

Figure 40:
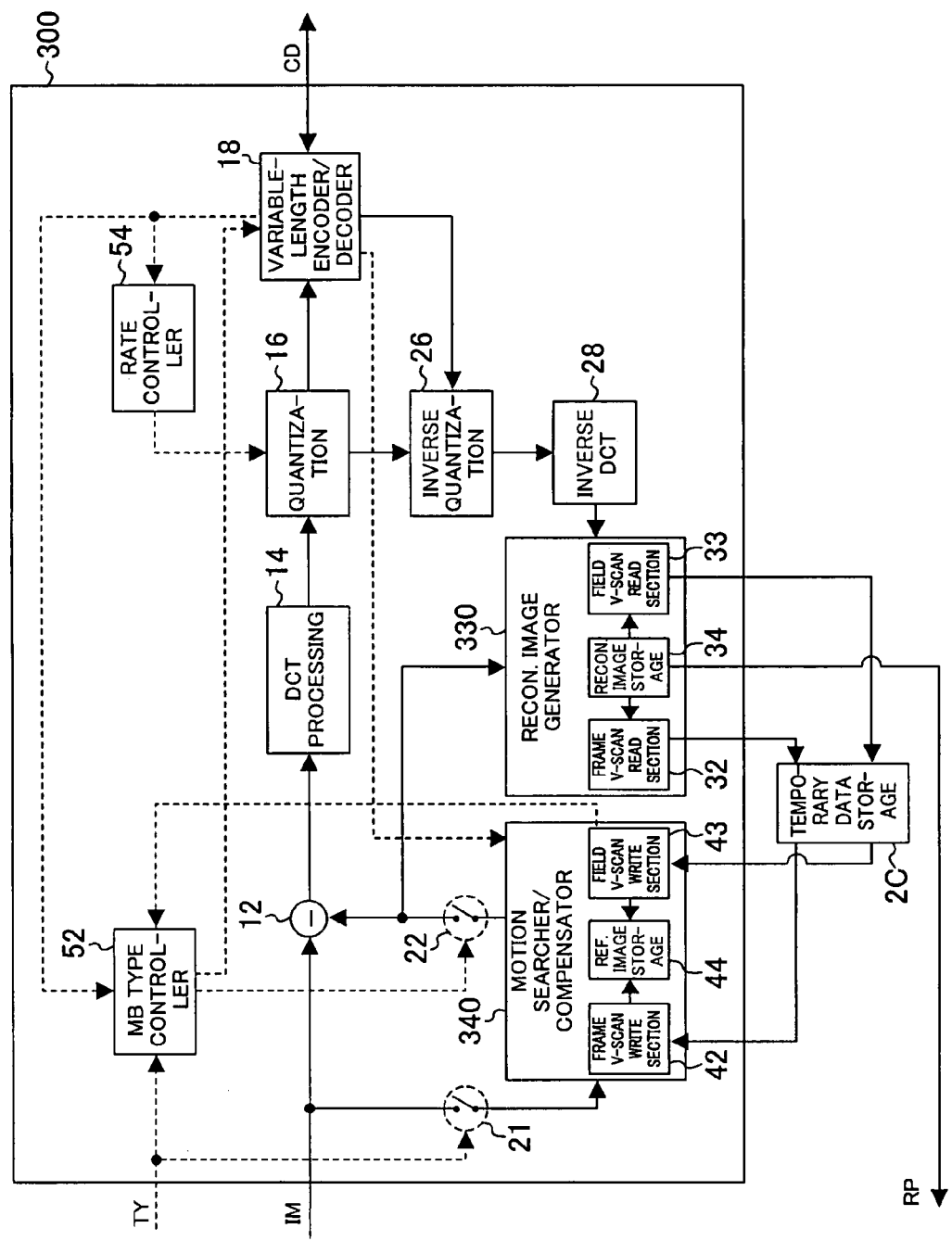
FIG. 40 is a block diagram showing the image processing device of FIG. 39 and a temporary data storage capable of high speed operation.

FIG. 40 is a block diagram showing the image processing device 300 of FIG. 39 and a temporary data storage 2C capable of high speed operation. As shown in FIG. 40, the image processing device 300 of FIG. 39 may use the temporary data storage 2C. The temporary data storage 2C is, for example, a SDRAM and is capable of data transfer two times faster than the temporary data storage 2A or 2B of FIG. 39.

In FIG. 40, the frame vertical scan read section 32 and the field vertical scan read section 33 transfer data not to the temporary data storages 2A and 2B but to different regions of the temporary data storage 2C, and the transferred data are stored therein. The frame vertical scan write section 42 or the field vertical scan write section 43 reads data from the temporary data storage 2C and stores the read data in the reference image storage 44. In this way, the image processing device may use only one temporary data storage 2C.

Figure 41:
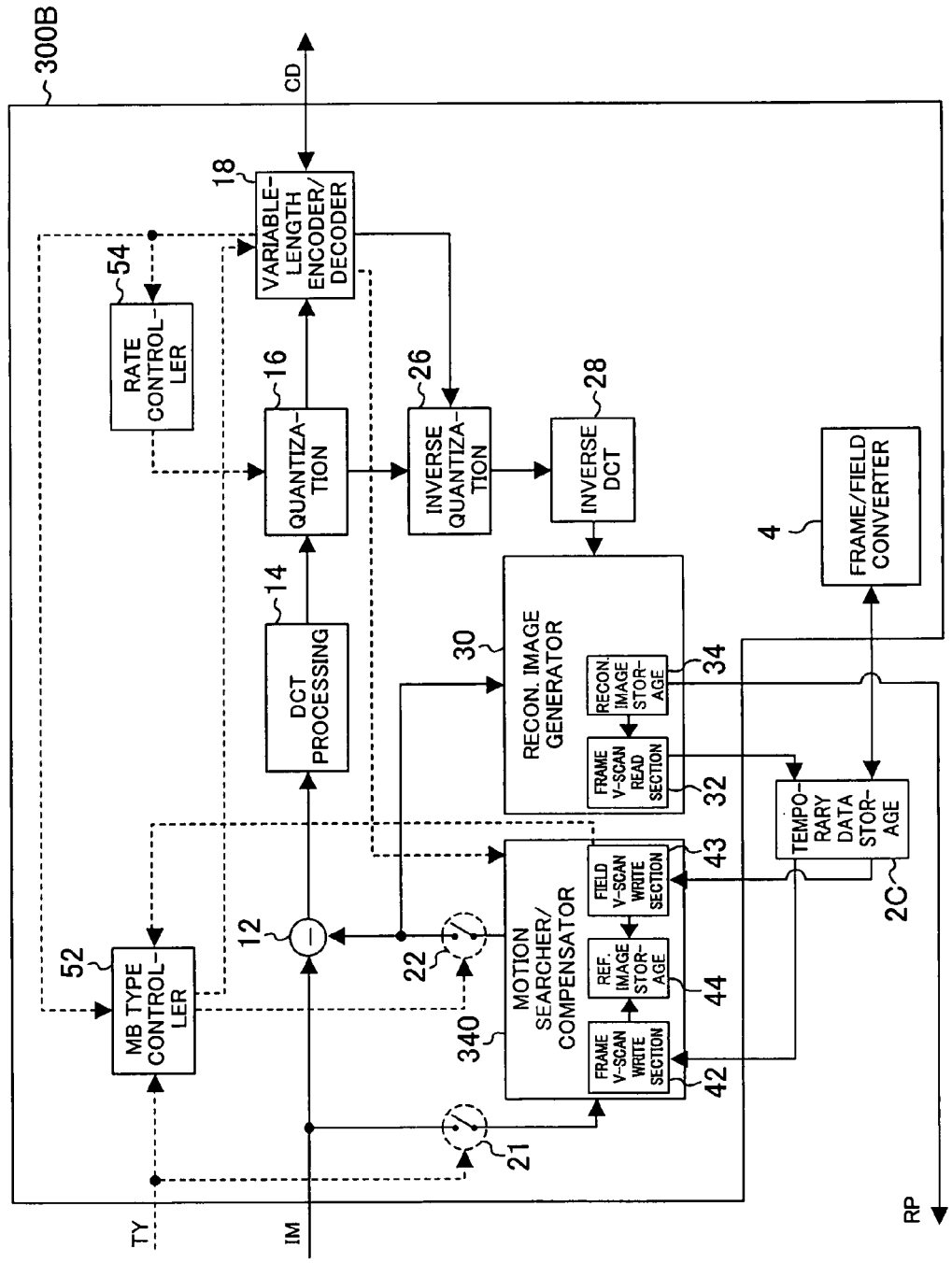
FIG. 41 is a block diagram showing a structure of a variation of the image processing device of FIG. 39.

FIG. 41 is a block diagram showing a structure of a variation of the image processing device of FIG. 39. The image processing device 300B of FIG. 41 is substantially the same as the image processing device of FIG. 39 except that the image processing device 300B includes the reconstructed image generator 30 of FIG. 1 in place of the reconstructed image generator 330 and further includes a frame/field converter 4.

The operation of the frame vertical scan read section 32 is substantially the same as that described in embodiment 1. Specifically, the frame vertical scan read section 32 transfers data packs of the luminance signal and color difference signals from the reconstructed image storage 34 to the temporary data storage 2C, and the transferred data packs are stored in the temporary data storage 2C in the frame mapping format. Thereafter, the frame/field converter 4 reads the reconstructed image of the frame mapping format from the temporary data storage 2C and stores the read data in the field mapping format in a region of the temporary data storage 2C which is different from a region allocated to data of the frame mapping format.

In this way, the image processing device of FIG. 41 can also store the reconstructed image in both the frame mapping format and the field mapping format.

Figure 42:
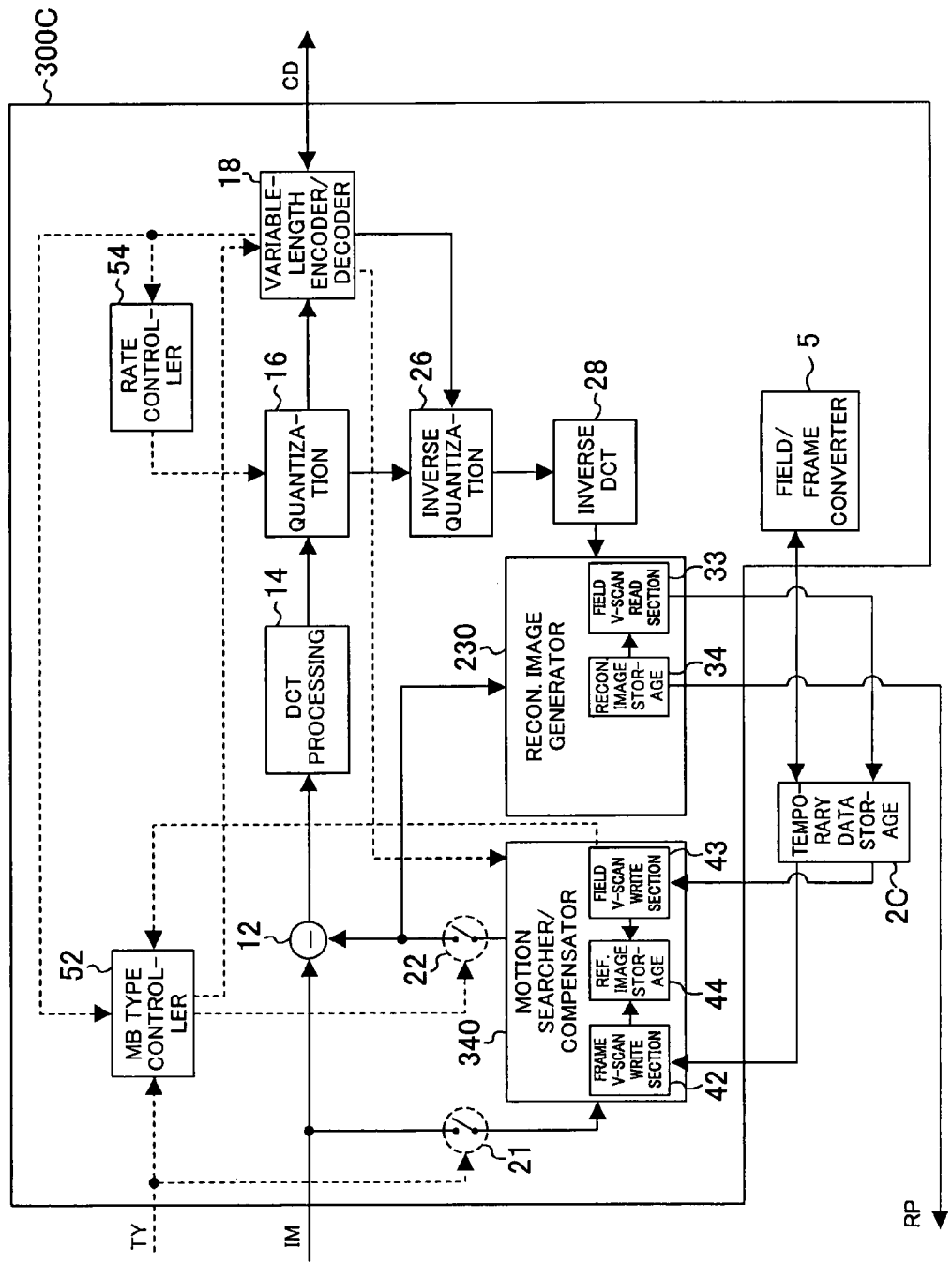
FIG. 42 is a block diagram showing a structure of another variation of the image processing device of FIG. 39.

FIG. 42 is a block diagram showing a structure of another variation of the image processing device of FIG. 39. The image processing device 300C of FIG. 42 is substantially the same as the image processing device of FIG. 39 except that the image processing device 300C includes the reconstructed image generator 230 of FIG. 25 in place of the reconstructed image generator 330 and further includes a field/frame converter 5.

The operation of the field vertical scan read section 33 is substantially the same as that described in embodiment 2. Specifically, the field vertical scan read section 33 transfers data packs of the luminance signal and color difference signals from the reconstructed image storage 34 to the temporary data storage 2C, and the transferred data packs are stored in the temporary data storage 2C in the field mapping format. Thereafter, the field/frame converter 5 reads the reconstructed image of the field mapping format from the temporary data storage 2C and stores the read data in the frame mapping format in a region of the temporary data storage 2C which is different from a region allocated to data of the field mapping format.

In this way, the image processing device of FIG. 42 can also store the reconstructed image in both the frame mapping format and the field mapping format.

According to the image processing device of FIG. 41 and FIG. 42, there is such a trade-off that the operation period of the temporary data storage 2C is prolonged while the amount of data of the reconstructed image transferred from the reconstructed image generators 30 and 230 decreases.

The temporary data storage 2C of FIG. 40 to FIG. 42 basically needs to have both a data region for frame mapping format and a data region for field mapping format. However, the temporary data storage 2C may store data of a reconstructed image only in one of the frame mapping format and field mapping format. Alternatively, data of a reconstructed image in the frame mapping format only, in the field mapping format only, or in both the frame and field mapping formats (hereinafter, referred to as "three mapping modes") may be adaptively stored in the temporary data storage 2C according to the conditions.

If the size of an image to be processed is CIF (384 (horizontal) by 288 (vertical) pixels), the process with both of the mapping formats is easily carried out. However, if the size of an image to be processed is HD (1920 (horizontal) by 1080 (vertical) pixels), the process with both of the mapping formats requires two HD-size regions (for frame mapping format and field mapping format) in the temporary data storage 2C. Therefore, a large-capacity SDRAM is necessary, which increases the cost. In view of such, for example, in a process of a HD image, the process is carried out using any one of reconstructed image data of frame mapping format and reconstructed image data of field mapping format. Namely, reconstructed image data in any of the three mapping modes which is selected according to the size of an image to be processed is used. As a result, whatever structure the temporary data storage 2C has, the best performance for the structure of the temporary data storage 2C can be achieved.

In a decoding process, the variable-length encoder/decoder 18 may analyze the header of a code which is to be decoded to select the mapping mode in the temporary data storage 2C according to the image size information included in the header information. With this, a region optimal to the image size can be used, and the decoding process can efficiently be carried out.

Alternatively, consider a case where the temporary data storage 2C is shared with another processor. In this case, the mapping mode may be changed according to the access load on the temporary data storage 2C. For example, if the other processor frequently uses the temporary data storage 2C, a mapping mode which requires less accesses to the temporary data storage 2C, i.e., frame mapping or field mapping, is used. If access by the other processor is infrequent, both of the mapping modes are used.

By changing the mapping mode according to the load on the temporary data storage 2C (traffic of bus), the temporary data storage 2C can provide high performance no matter what load is applied.

Figure 43:
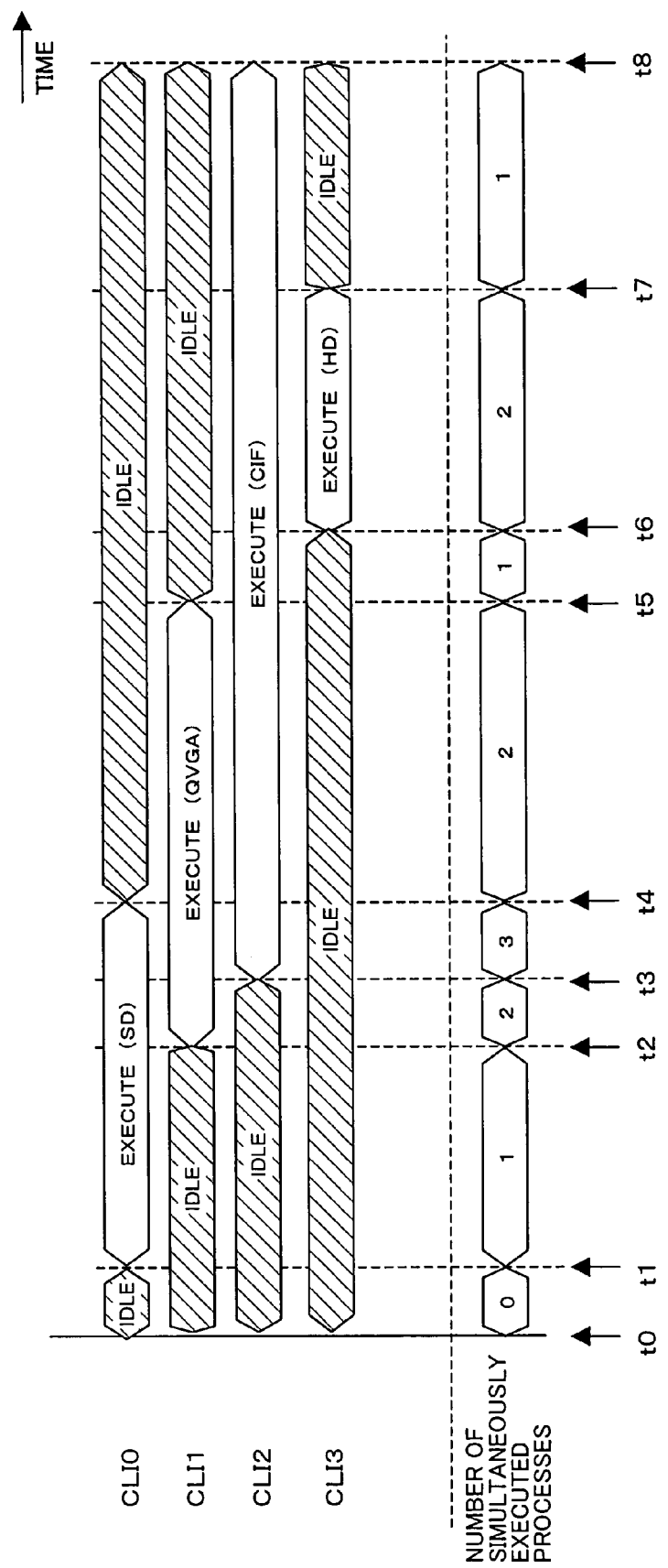
FIG. 43 is a timing chart illustrating an example of a multi-codec process.

FIG. 43 is a timing chart illustrating an example of a multi-codec process. Herein, consider a case where the image processing device of FIG. 40 processes requests from four clients, Clients CLI0, CLI1, CLI2, and CLI3, where:

Client CLI0 . . . Encoding of SD (720 (horizontal) by 480 (vertical)) size image Client CLI1 . . . Decoding of QVGA (320 (horizontal) by 240 (vertical)) size image Client CLI2 . . . Encoding of CIF (384 (horizontal) by 288 (vertical)) size image Client CLI3 . . . Decoding of HD (1920 (horizontal) by 1080 (vertical)) size image Referring to FIG. 43, at time t0, there is no request from any client. At time t1, a request for encoding of a SD-size image is issued by Client CLI0, and the image processing device 300 of FIG. 40 starts an encoding process for this request. At time t2, a request for decoding of a QVGA-size image is issued by Client CLI1, and after time t2, the image processing device 300 executes the encoding process for Client CLI0 and the decoding process for Client CLI1 alternately on a frame by frame basis in a time-division manner.

At time t3, a request for encoding of a CIF-size image is issued by Client CLI2, and after time t3, the image processing device 300 executes the encoding process for Client CLI0, the decoding process for Client CLI1, and the encoding process for Client CLI2 alternately on a frame by frame basis. Then, the encoding process for Client CLI0 completes at time t4, and the decoding process for Client CLI1 completes at time t5. Between time t5 and time t6 at which a request for decoding of a HD-size image is issued by Client CLI3, the image processing device 300 executes only the encoding process for Client CLI2.

After time t6, the image processing device 300 executes the decoding process for Client CLI3 on a frame by frame basis in addition to the encoding process for Client CLI2. At time t7, the decoding process for Client CLI3 completes. At time t8, the encoding process for Client CLI2 completes, i.e., the processes for all the requests from the clients complete. It should be noted that the processes for the respective clients are carried out using different regions of the temporary data storage 2C.

In the case where the encoding process of a SD-size image for Client CLI0 at time t1 is carried out using both the frame mapping format and field mapping format, the subsequent decoding process of a QVGA-size image for Client CLI1 at time t2 needs to use a region of the temporary data storage 2C which is not used for the encoding process of Client CLI0.

When receiving a request for a decoding process from Client CLI1, the image processing device 300 calculates the capacity of available region of the temporary data storage 2C and selects the mapping mode according to the calculated capacity. In other words, if a region which enables use of both of the mapping formats is secured, the process for Client CLI1 can be started using both of the mapping formats. If such a region cannot be secured, only one of the frame mapping and field mapping is used to start the process. With such control, at the start of a process for a request from a new client, an optimum region of the temporary data storage 2C can be allocated to the process for the client.

It should be noted that, at the time of receiving a request for image processing from a new client, or at the end of a process, the image processing device 300 may re-select the mapping mode for all the clients including a client currently being serviced and re-allocate regions to all the clients. At time t3, a process request is issued by Client CLI2. At this point in time, for example, the mapping mode is re-selected for three clients including Client CLI0 and Client CLI1 which are currently serviced with previously-allocated regions. At time t4, the process for Client CLI0 completes. At this point in time, for example, the mapping mode is re-selected for Client CLI1 and Client CLI2 which are currently serviced.

Since the mapping mode is determined for each of the processes of all the clients every time the number of clients is changed in this way, the mapping mode for every process always remains optimal.

Each of the clients may be enabled to designate the mapping mode as it demands at the time of issuance of a process request. If a mapping region cannot be secured for the request with the designated mapping mode, the client may be notified of the unavailability. For example, consider a case where a client which demands to use both of the mapping formats for processing starts a process request. If a region which enables use of both of the mapping formats is secured in the temporary data storage 2C, the process is carried out using both of the mapping formats. If such a region cannot be secured, the client is notified of the unavailability.

The notified client may again issue a process request claiming a process which requires a restricted region to be secured (for example, a process only with frame mapping) or may issue a release request to another client which is currently serviced for the purpose of inheriting a region. Since when a necessary region cannot be secured the client is notified of the unavailability, the client can issue a process request without checking the quantity of the remainder of the temporary data storage 2C.

A specific example of the multi-codec process of FIG. 43 is now described. At time t5, there is no request but one from Client CLI2, and therefore, only the region for both of the mapping formats used in the encoding process for Client CLI2 is secured in the temporary data storage 2C. At time t6, a request for decoding of a HD-size image which claims "a process with both of the mapping formats" is issued by Client CLI3.

At this point in time, the image processing device 300 checks a region of the temporary data storage 2C which is not used for Client CLI2 to confirm whether a sufficient area for both of the mapping formats can be secured in the region. If possible, the image processing device 300 uses both of the mapping formats to start a process for Client CLI3. If not possible, the image processing device 300 notifies Client CLI3 of the unavailability.

Under circumstances where the process for Client CLI3 is allowed to be carried out using frame mapping or field mapping, Client CLI3 may re-select "a process with frame mapping" or "a process with field mapping" and issue a request for decoding.

However, the process cannot be started under circumstances where "a process with both of the mapping formats" is necessary. In this case, Client CLI3 gives up the process or issues a request to another client (in this case, Client CLI2) for release of a region. If Client CLI2 accommodates the request to release a region, the image processing device 300 checks whether a sufficient area for both of the mapping formats can be secured in the region. If possible, the image processing device 300 uses both of the mapping formats to start a process. If not possible, the image processing device 300 notifies Client CLI3 of the unavailability. With this procedure, a region necessary for a process can easily be secured.

Since allocation of regions in the temporary data storage 2C is monitored on a realtime basis such that optimum allocation of regions is always achieved, high efficiency transfer can be carried out for the temporary data storage 2C.

Figure 44:
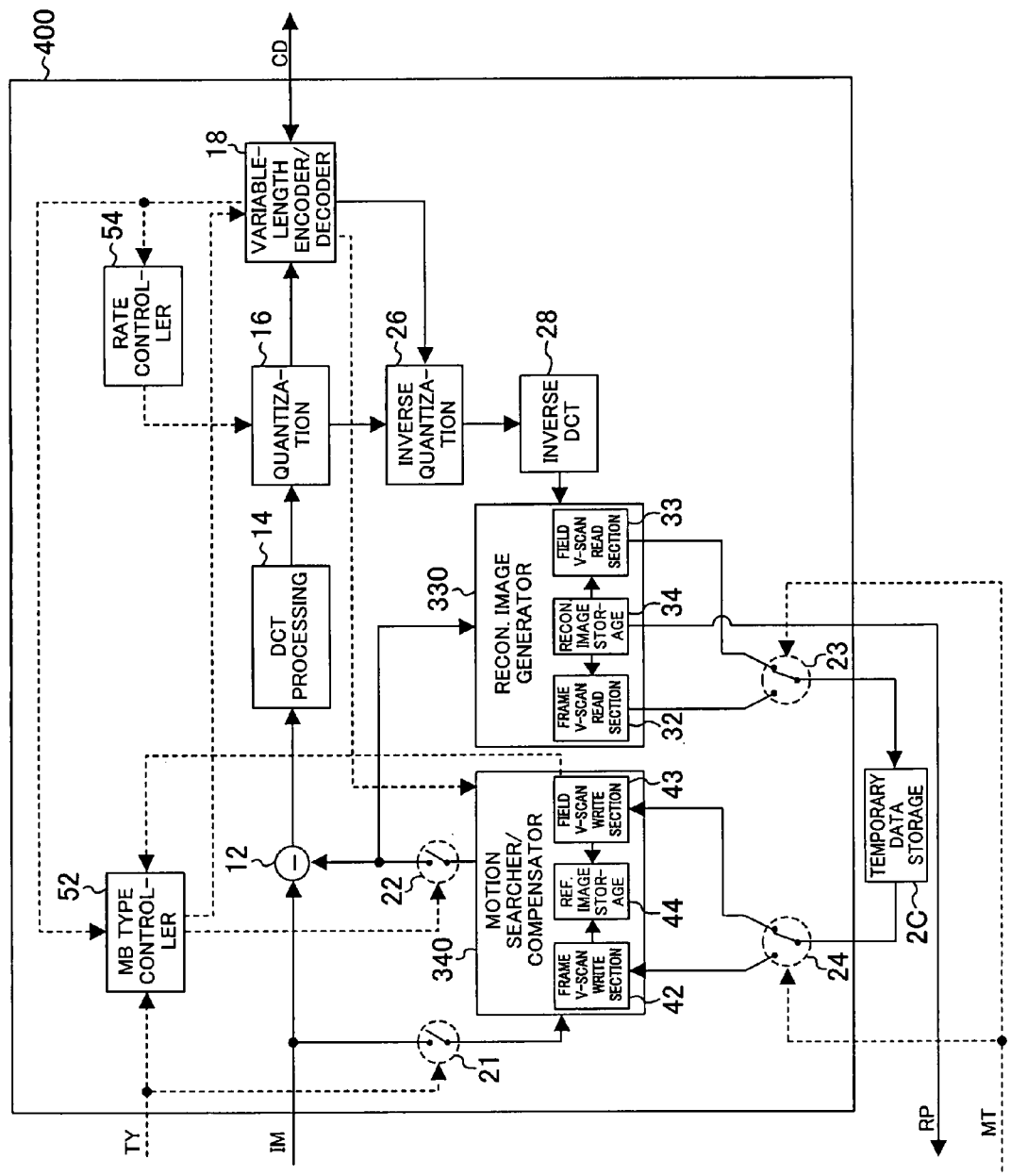
FIG. 44 is a block diagram showing a structure of still another variation of the image processing device of FIG. 39.

FIG. 44 is a block diagram showing a structure of still another variation of the image processing device of FIG. 39.

The image processing device 400 of FIG. 44 includes selectors 23 and 24 in addition to the components of the image processing device of FIG. 39.

The selector 23 selects the frame vertical scan read section 32 or the field vertical scan read section 33 according to mapping type signal MT input from an external device. If the frame vertical scan read section 32 is selected, a reconstructed image is stored in the temporary data storage 2C in the frame mapping format. If the field vertical scan read section 33 is selected, a reconstructed image is stored in the temporary data storage 2C in the field mapping format.

The selector 24 selects the frame vertical scan write section 42 or the field vertical scan write section 43 according to mapping type signal MT. The reconstructed image stored in the temporary data storage 2C is transferred to the selected one of the frame vertical scan write section 42 and the field vertical scan write section 43.

Mapping type signal MT alternates on a frame by frame basis, and therefore, the image processing device 400 can dynamically select an appropriate mapping format. For example, in a moving picture including both a progressive image and an interlaced image, the frame mapping format is used for the progressive image, while the field mapping format is used for the interlaced image. Thus, an appropriate region can be secured in the temporary data storage 2C according to the type of an image.

Mapping type signal MT may be set by an application of a system in an encoding/decoding process. In an decoding process, mapping type signal MT may be appropriately switched according to header information obtained by analyzing the header of a code which is to be decoded.

Embodiment 5

This embodiment provides a variation of the storage method of embodiment 1 for storing a reconstructed image in the temporary data storage 2, which is described herein with reference to FIG. 1.

Figure 45:
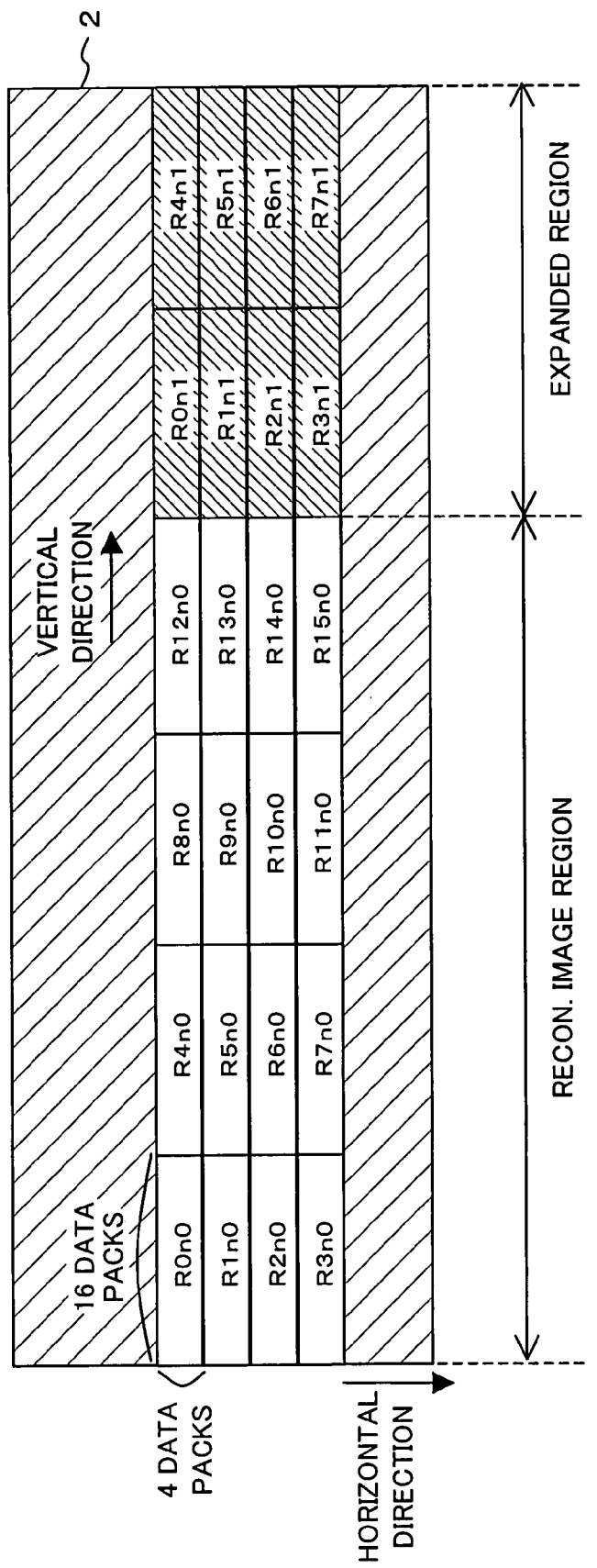
FIG. 45 illustrates a reconstructed image stored in a temporary data storage according to embodiment 5 of the present invention.

FIG. 45 illustrates a reconstructed image stored in the temporary data storage 2 according to embodiment 5 of the present invention. FIG. 45 shows a region obtained by expanding the region mapped as illustrated in FIG. 17 by two macroblocks in the column direction (vertical direction of a target image). In the example described herein, the frame size of the target image is 64 (horizontal) by 64 (vertical) pixels (4 (horizontal) by 4 (vertical) macroblocks) as illustrated in FIG. 4, and the motion search range is ±16 pixels both horizontally and vertically.

The reconstructed image of the nth frame (n: natural number) is used as a reference image for the process of the (n+1)th frame. In the process of the (n+1)th frame, a reconstructed image of the (n+1)th frame is generated, and the generated reconstructed image is used as a reference image for the process of the (n+2)th frame. Before the process of the (n+1)th frame, reconstructed images of the n precedent frames (R0$n$0, R1$n$0, . . . and R15$n$0) have been written in the temporary data storage 2.

The frame vertical scan write section 42 reads, for the purpose of a process on macroblock M0 of the (n+1)th frame (see FIG. 4), reconstructed image R0$n$0, which is used as a reference image corresponding to macroblock M0, and reconstructed images R1$n$0, R4$n$0, and R5$n$0 corresponding to macroblocks around reconstructed image R0$n$0 and writes the read reconstructed images in the reference image storage 44.

Likewise, in a process of macroblock M1, the frame vertical scan write section 42 reads reconstructed image R1$n$0 corresponding to macroblock M1 and reconstructed images R0$n$0, R2$n$0, R4$n$0, R5$n$0, and R6$n$0 corresponding to the macroblocks around macroblock M1. In a process of macroblock M5, the frame vertical scan write section 42 reads reconstructed image R5$n$0 corresponding to macroblock M5 and reconstructed images R0$n$0, R1$n$0, R2$n$0, R4$n$0, R6$n$0, R8$n$0, R9$n$0, and R10$n$0 corresponding to the macroblocks around macroblock M5.

In a process of macroblock M0 of the (n+1)th frame, reconstructed image R0$n$1 is generated. The frame vertical scan read section 32 writes reconstructed image R0$n$1 in the temporary data storage 2. In processes of macroblock M1, M4, and M5, reconstructed image R0$n$0 is also necessary. Therefore, it is necessary to hold reconstructed image R0$n$0 until the end of the process of macroblock M5. In other words, reconstructed image R0$n$1 cannot be stored in the region of reconstructed image R0$n$0 of FIG. 45. Considering the processes of the other macroblocks, the reconstructed image of the (n+1)th frame needs to be stored in a region other than the region for reconstructed images R0$n$0 to R15$n$0.

In view of the above, the region for storing the reconstructed image is expanded by two macroblocks in the column direction, and reconstructed images R0$n$1 to R7$n$1 of the (n+1)th frame in the expanded region. After the end of the process of macroblock M7, reconstructed images R0$n$0 to R3$n$0 at the leftmost column of FIG. 45 are not read as reference images any more and are thus unnecessary. The region of the unnecessary reconstructed images is used to store reconstructed image R8$n$1 to R11$n$1 of the (n+1)th frame. After the end of the process of macroblock M11, reconstructed images R4$n$0 to R7$n$0 at the second leftmost column of FIG. 45 are unnecessary. The region of the unnecessary reconstructed images is used to store reconstructed image R12$n$1 to R15$n$1 of the (n+1)th frame.

Likewise, reconstructed images R0$n$2 to R7$n$2 of the (n+2)th frame are stored in the region of reconstructed image R8$n$0 to R15$n$0, and reconstructed images R8$n$2 to R15$n$2 of the (n+2)th frame are stored in the region of reconstructed image R0$n$1 to R7$n$1. Thereafter, in the same fashion, a region capable of storing reconstructed images of one frame plus an expanded region are used as a ring buffer to store reconstructed images.

As described above, an expanded region capable of storing reconstructed images corresponding to two rows of macroblocks in an image subjected to the encoding process of FIG. 4 is secured in addition to the region of reconstructed images of one frame. In other words, it is not necessary to secure a region capable of storing reconstructed images of two frames. Thus, increase in circuit size of the encoding/decoding device can be suppressed.

The expanded region needs to be secured according to the extent of motion search/compensation. Generally, in the case where data is stored in the temporary data storage 2 in the frame mapping format, the expanded region only needs to have a capacity capable of storing, among the rows of macroblocks of a two-dimensional image subjected to an encoding process, rows to which a macroblock subjected to the process and an upper macroblock used for motion search or motion compensation belong.

Embodiment 6

Figure 46:
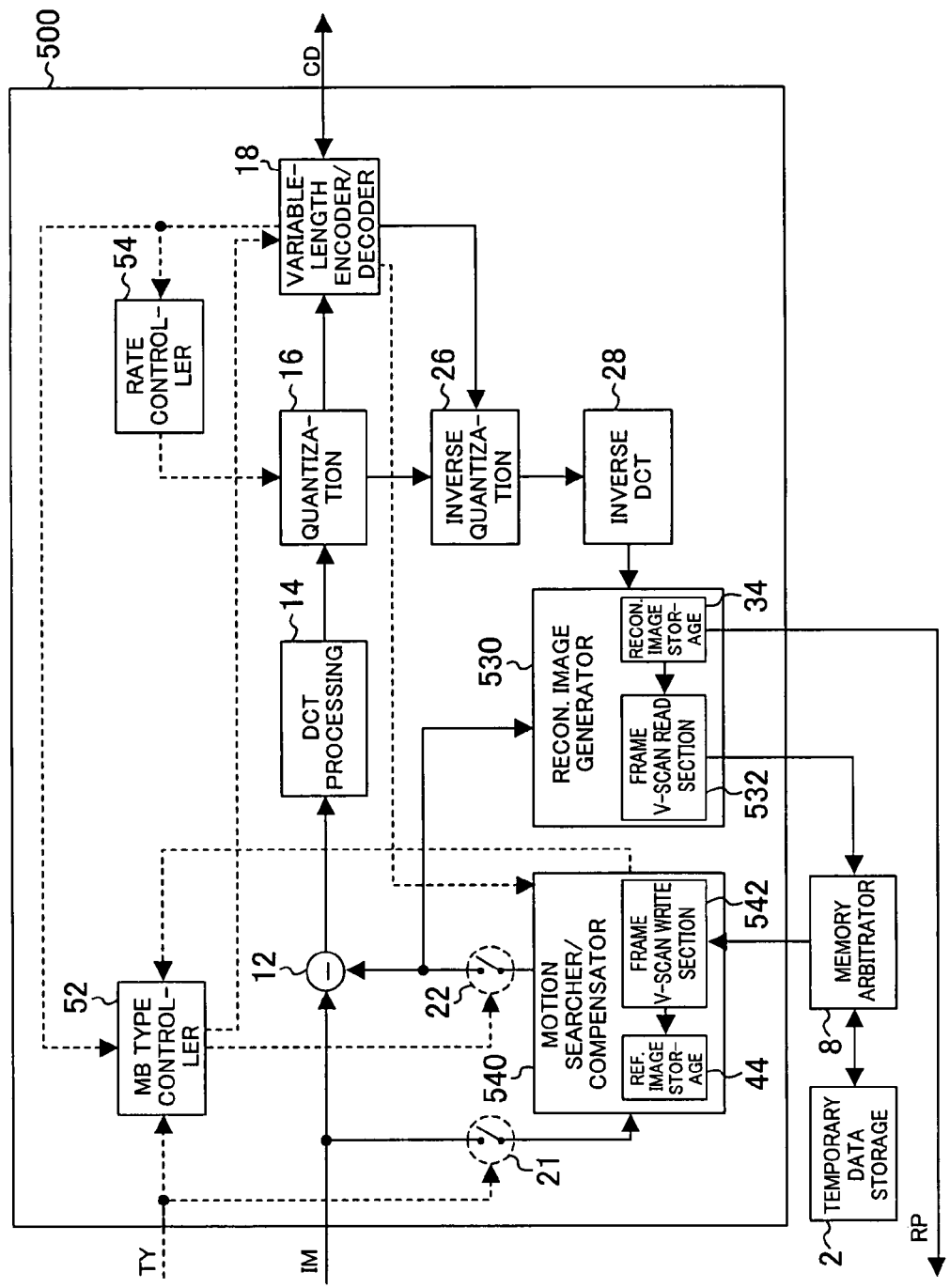
FIG. 46 is a block diagram showing a structure of an image processing device according to embodiment 6 of the present invention.

FIG. 46 is a block diagram showing a structure of an image processing device according to embodiment 6 of the present invention. The image processing device 500 of FIG. 46 is substantially the same as the image processing device of FIG. 1 except that the image processing device 500 includes a reconstructed image generator 530 and a motion searcher/compensator 540 in place of the reconstructed image generator 30 and the motion searcher/compensator 40.

The reconstructed image generator 530 includes a frame vertical scan read section 532 and a reconstructed image storage 34. The motion searcher/compensator 540 includes a frame vertical scan write section 542 and a reference image storage 44. The operation of the frame vertical scan read section 532 and frame vertical scan write section 542 is substantially the same as that of the frame vertical scan read section 32 and frame vertical scan write section 42 of FIG. 1 except for the aspects described below.

Embodiment 6 is described with an example where a plurality of devices (clients) share the temporary data storage 2. A memory arbitrator 8 arbitrates accesses from the clients to the temporary data storage 2.

Figure 47:
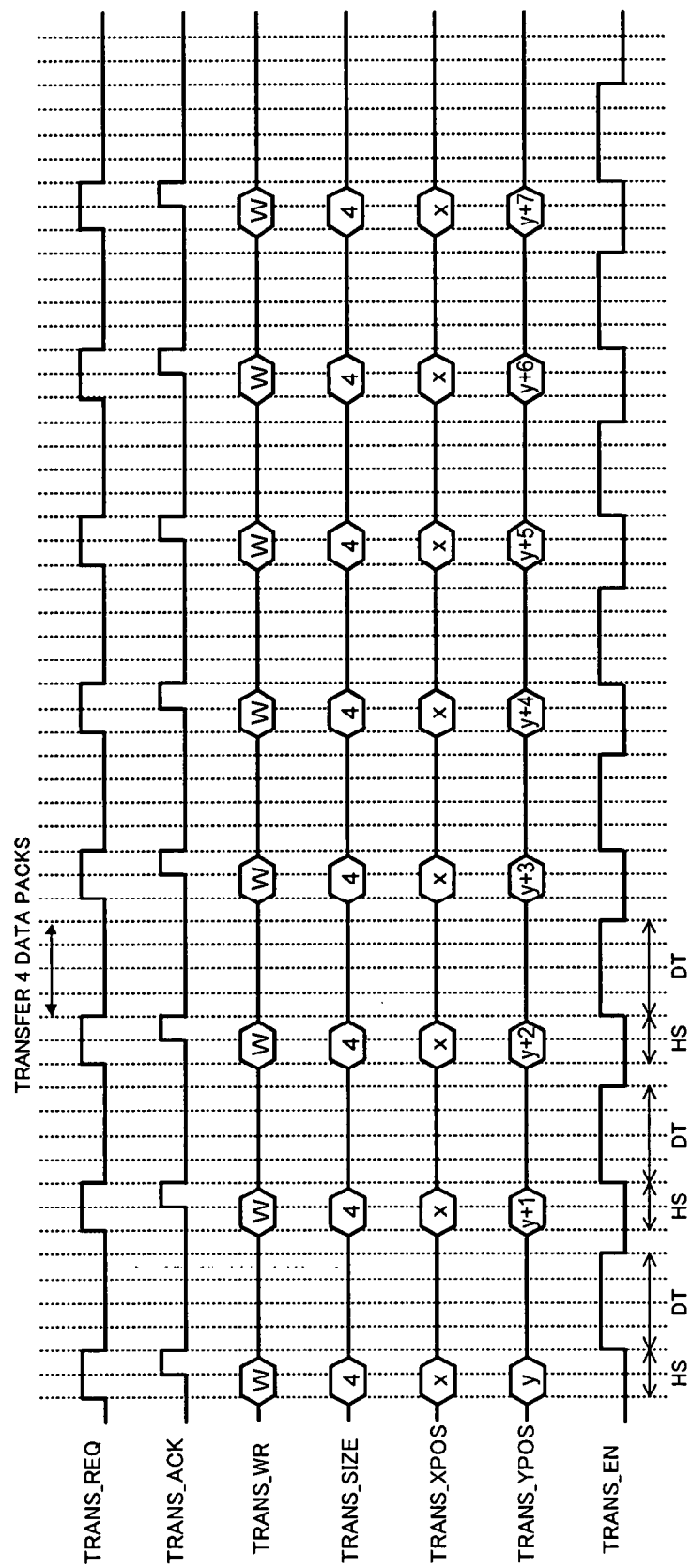
FIG. 47 is a timing chart illustrating an example of data transfer with arbitration.

FIG. 47 is a timing chart illustrating an example of data transfer with arbitration. In the example described herein, data of every row of FIG. 13 is written in the temporary data storage 2. Specifically, data packs P0 to P3 are transferred in burst mode, and then, data packs P4 to P7, P8 to P11, . . . and P60 to P63 are sequentially transferred in burst mode. For simplicity, it is assumed that there is no transfer request from the other clients.

First, a handshake is established between the memory arbitrator 8 and a client (period HS). As illustrated in FIG. 47, the client issues to the memory arbitrator 8 transfer request signal TRANS_REQ, signal TRANS_WR indicative of whether transfer of the request relates to "writing" or "reading", signal TRANS_SIZE indicative of the amount of data of the transfer (by the units of a data pack), and signal TRANS_XPOS/TRANS_YPOS indicative of the position in the memory space in which transferred data is to be written or indicative of the position in the memory space from which data is to be read out for transfer. Receiving such a transfer request, the memory arbitrator 8 outputs reply signal TRANS_ACK to the client if transfer of data is possible between the memory arbitrator 8 and the request-issuer client. This procedure establishes a handshake.

After the establishment of the handshake, transfer of data is carried out. The memory arbitrator 8 makes transfer enable signal TRANS_EN effective. Transfer of data is carried out during period DT where transfer enable signal TRANS_EN is effective. It should be noted that the client may output transfer enable signal TRANS_EN.

In data transfer, one data pack is transferred in every cycle. In the example of FIG. 47, transfer of every four data packs requires two cycles for a handshake. Handshake is established for every transfer, which requires two cycles, resulting in low transfer efficiency.

Figure 48:
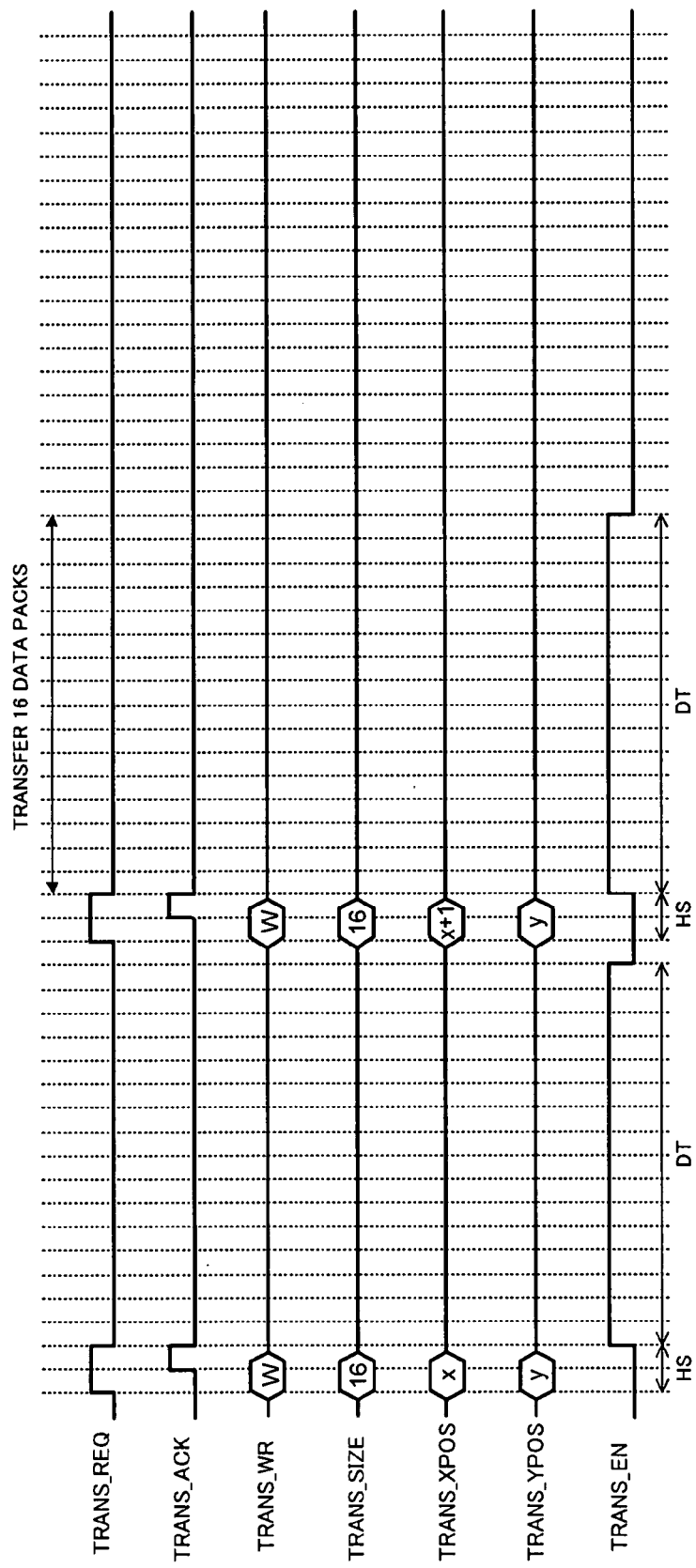
FIG. 48 is a timing chart illustrating an example of data transfer with arbitration for an image processing device of FIG. 46.

FIG. 48 is a timing chart illustrating an example of data transfer with arbitration for the image processing device of FIG. 46. Now, transfer of data between the memory arbitrator 8 and the frame vertical scan read section 532 of the image processing device 500 is described.

First, a handshake is established between the memory arbitrator 8 and the frame vertical scan read section 532 for transfer of data packs read from the reconstructed image storage 34. This is basically the same as the example of FIG. 47 except that data amount signal TRANS_SIZE is 16.

After establishment of the handshake, the memory arbitrator 8 makes transfer enable signal TRANS_EN effective. As illustrated with reference to FIG. 14, the frame vertical scan read section 532 vertically scans the image to read data packs from the reconstructed image storage 34. The frame vertical scan read section 532 outputs the read 16 data packs, which constitutes a unit of burst transfer, to the memory arbitrator 8 during period DT where transfer enable signal TRANS_EN is effective. Although two cycles are necessary for a handshake, the handshake is established for every transfer of 16 data packs, and therefore, the transfer efficiency is high as compared with the example of FIG. 47.

According to the image processing device of FIG. 46, in a reading operation, the frame vertical scan read section 532 vertically scans data to transfer a column of data packs in burst mode. Thus, the number of transfer procedures can be reduced as shown in FIG. 48. Since the frequency of handshake decreases, the transfer efficiency for an image of frame-format increases even when arbitration is carried out by the memory arbitrator 8.

Next, transfer of data between the memory arbitrator 8 and the temporary data storage 2 is described. It is assumed herein that the width of the data bus between the frame vertical scan read section 532 and the memory arbitrator 8 is equal to the size of one data pack and that the width of the data bus between the memory arbitrator 8 and the temporary data storage 2 is equal to the size of two data packs. In this case, the memory arbitrator 8 treats two data packs as one data unit ("data pack composite") and transfers the data pack composite to the temporary data storage 2. The memory arbitrator 8 transfers one data pack composite in every cycle.

FIG. 49A illustrates the relationship between data packs and data pack composites where the leading end positions of the data packs and data pack composites are coincident with each other. FIG. 49B illustrates the relationship between data packs and data pack composites where the leading end positions of the data packs and data pack composites are not coincident with each other.

In the case of FIG. 49A, the memory arbitrator 8 converts 16 data packs received from the image processing device 500 to a data pack composite which is written in the temporary data storage 2 in 8 cycles. In the case of FIG. 49B, writing of the 16 received data packs in the temporary data storage 2 requires 9 cycles. Thus, in the case where the data bus width is not constant, there is a probability that the transfer efficiency deteriorates. Since the image processing device of FIG. 46 performs a burst transfer process for every 16 data packs, the probability of deterioration in transfer efficiency as shown in FIG. 49B is decreased to a ¼ of that for a burst transfer process carried out for every 4 data packs as shown in FIG. 47.

A method for preventing deterioration in transfer efficiency is described with reference to FIG. 9 and FIG. 13. An example described herein is transfer of data of macroblock R5 of FIG. 9. Macroblock R5 of FIG. 9 consists of data packs as illustrated in FIG. 13. Now, consider a case where data packs P0, P4, P8, and P60 of the leftmost column of FIG. 13 are to be transferred.

With the relationship between data packs and data pack composites as illustrated in FIG. 49B, the first data pack composite includes only data pack P0, while the last data pack composite includes only data pack P60. To prevent deterioration in transfer efficiency, the memory arbitrator 8 combines data pack P0 of macroblock R5 and data pack P60 of macroblock R1 and transfers the resultant data pack composite to the temporary data storage 2. The memory arbitrator 8 combines data pack P60 of macroblock R5 and data pack P0 of macroblock R9 and transfers the resultant data pack composite to the temporary data storage 2.

In the case where conversion to data pack composites in macroblock R1 results in the remainder of one data pack P60, the memory arbitrator 8 retains data pack P60 of macroblock R1 till data pack P0 of macroblock R5 comes in. After obtaining these data, the memory arbitrator 8 converts these to a data pack composite. In the case where conversion to data pack composites in macroblock R5 results in the remainder of one data pack P60, the memory arbitrator 8 likewise retains data pack P60 of macroblock R5 till data pack P0 of macroblock R9 comes in. After obtaining these data, the memory arbitrator 8 converts these to a data pack composite.

In the case of FIG. 49B, the memory arbitrator 8 combines data packs P60, P61, P62 and P63 of the bottom low with data packs P0, P1, P2 and P3 of the top row of the underlying macroblock, respectively, to generate a data pack composite whose size is equal to the width of the data bus between the memory arbitrator 8 and the temporary data storage 2 and transfer the resultant data pack composite. Since the data pack composite is prevented from having a vacant part, deterioration in transfer efficiency can be prevented.

When data is read from the temporary data storage 2, transfer is carried out in the order opposite to that described above. Namely, the memory arbitrator 8 reads a data pack composite from the temporary data storage 2 and decomposes the data pack composite into data packs. A handshake is established between the memory arbitrator 8 and the frame vertical scan write section 542 of the image processing device 500. After establishment of the handshake, the memory arbitrator 8 transfers the resultant data packs to the frame vertical scan write section 542.

The value of signal TRANS_XPOS/TRANS_YPOS indicative of the position in the memory space, which has been issued by the image processing device 500 to the memory arbitrator 8 (FIG. 48), may be changed by the memory arbitrator 8 and output to the temporary data storage 2.

Embodiment 6 is equivalent to embodiment 1 plus the memory arbitrator 8. As well, the memory arbitrator 8 may be used in embodiments 2 to 4.

Embodiment 7

Figure 50:
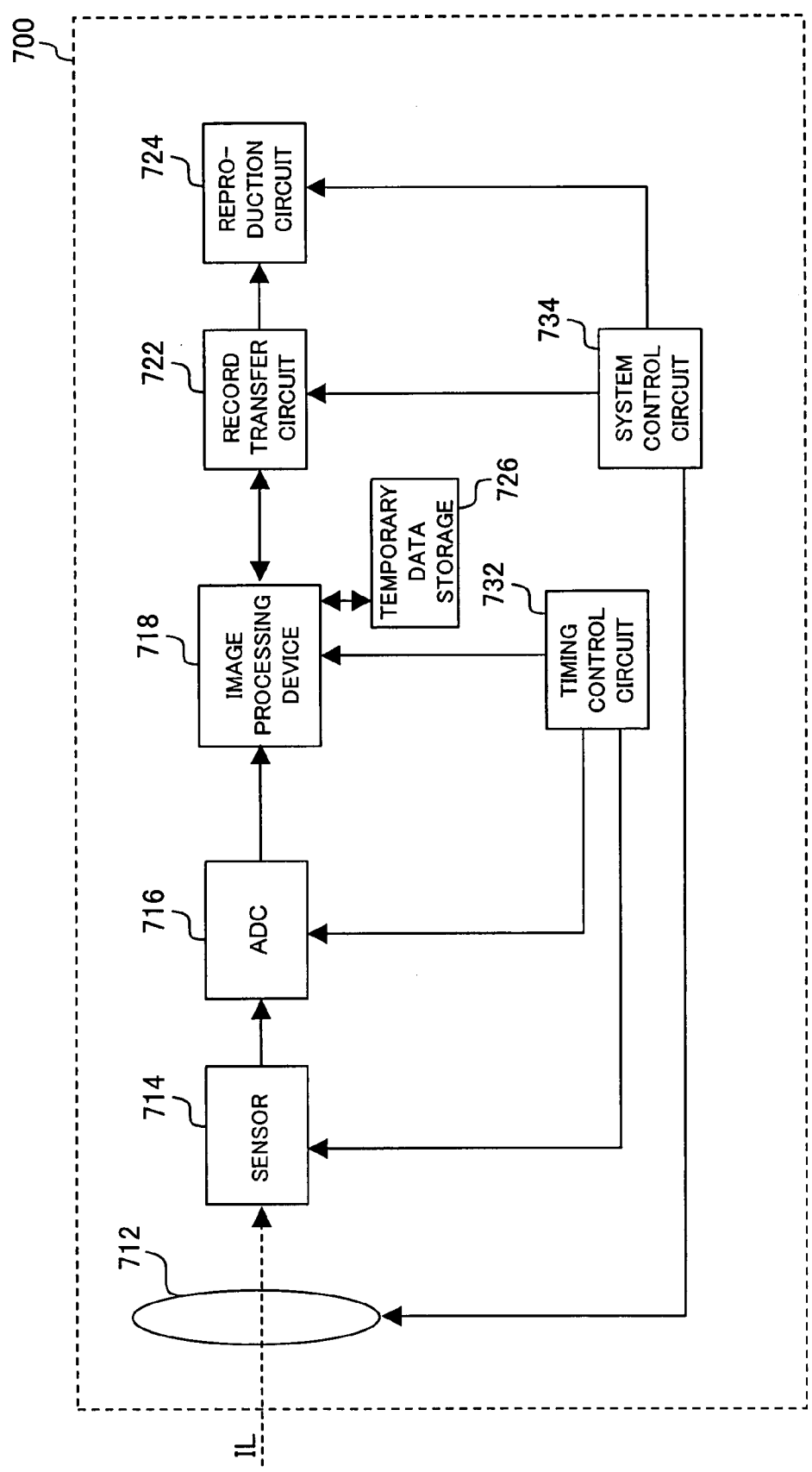
FIG. 50 is a block diagram showing a structure of an imaging system according to embodiment 7 of the present invention.
Figure 51:
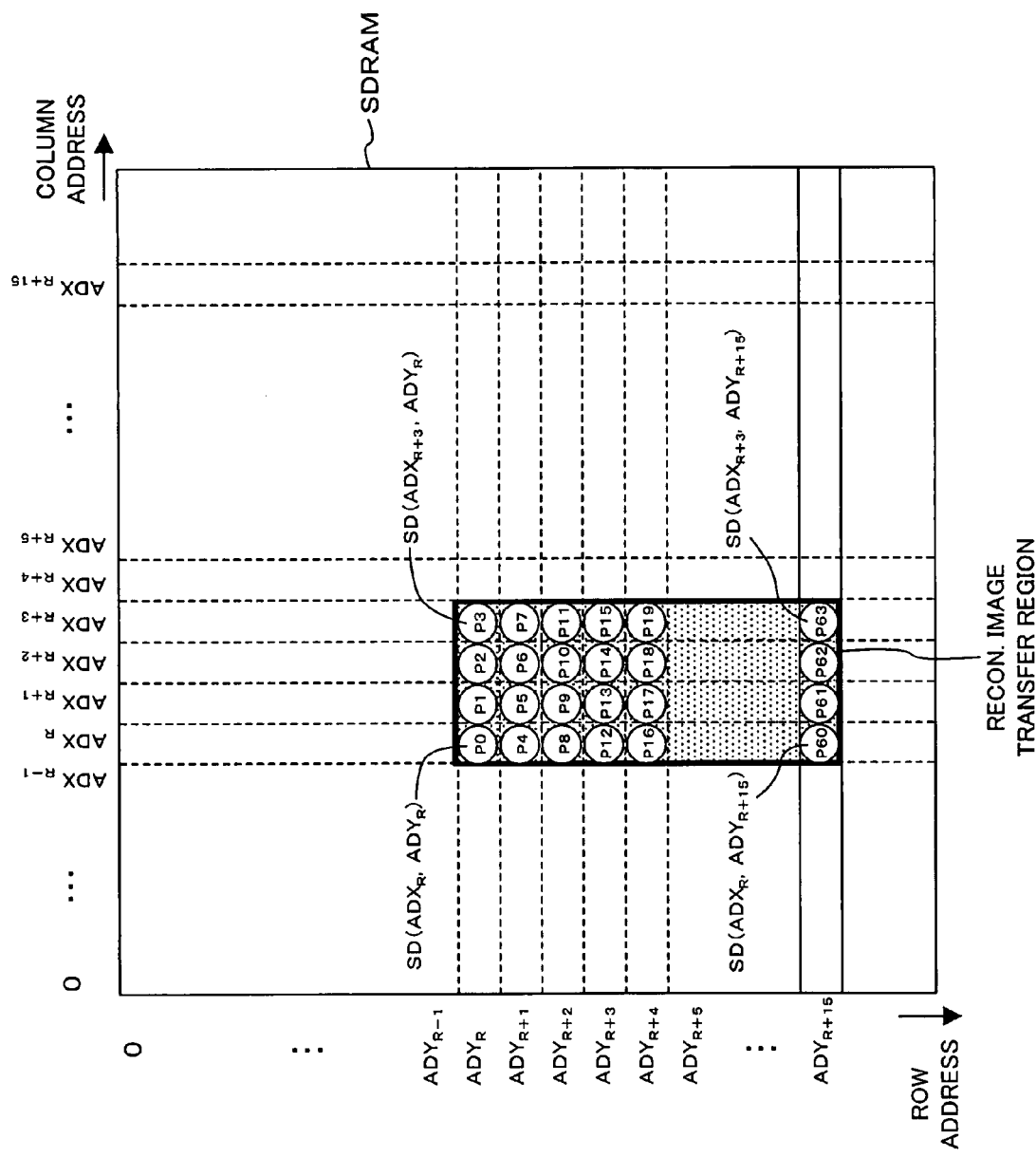
FIG. 51 illustrates an example of mapping of data stored in the SDRAM.

FIG. 50 is a block diagram showing a structure of an imaging system according to embodiment 7 of the present invention. The imaging system 700 of FIG. 50 is, for example, a digital still camera, and includes an optical system 712, a sensor 714, an analog/digital converter (ADC) 716, an image processing device 718, a record transfer circuit 722, a reproduction circuit 724, a temporary data storage 726, a timing control circuit 732, and a system control circuit 734. The image processing device 718 is any of the image processing devices described in embodiments 1 to 6. The temporary data storage 726 is a temporary data storage compliant with the image processing device.

The optical system 712 forms an image on the sensor 714 from incoming image (incoming light) IL. The sensor 714 is driven by a timing control circuit 732 to accumulate incoming image IL, convert it to an electric signal, and output a resultant analog image signal to the analog/digital converter 716. The analog/digital converter 716 converts the analog image signal to a digital signal which is then output to the image processing device 718.

The image processing device 718 performs a Y/C process, an edge treatment, extension/contraction of images, and image processing accompanied by transfer of image data to or from the temporary data storage 726, such as encoding/decoding of images (compression and expansion), etc., as illustrated in embodiments 1 to 6. The image processing device 718 outputs a signal obtained as a result of the image processing to the record transfer circuit 722. The record transfer circuit 722, for example, records this signal in a recording medium or transmits this signal to a device outside the imaging system 700. The record transfer circuit 722 reads a signal from a recording medium or receives a signal from an external device to output the signal to the reproduction circuit 724. The reproduction circuit 724 reproduces the received signal.

The analog/digital converter 716 and image processing device 718 are controlled by the timing control circuit 732. The system control circuit 734 controls the whole imaging system 700.

The image processing device 718 may be structured to perform image processing not only on a signal derived from light IL incoming through the optical system 712 to the sensor 714 but also on an image signal input in the form of an electric signal from, for example, a device outside the imaging system 700.

It should be noted that the temporary data storages 2, 2A, 2B and 2C are SDRAMs in the above embodiments but may be other types of memory elements capable of reading and writing in burst mode.

It should be noted that the reconstructed image storage 34 and reference image storage 44 are SRAMs in the above embodiments but may be other types of random-accessible memory elements.

Although in the above embodiments the image encoding/decoding processes have been described with specific examples, the above-described techniques are applicable to other types of image processing which are carried out on a block by block basis.

The row address and column address of the temporary data storages 2, 2A, 2B and 2C may be physical addresses of the temporary data storages 2, 2A, 2B and 2C or may be logical addresses of the temporary data storages 2, 2A, 2B and 2C.

As described above, the present invention achieves faster data transfer between an image processing device and a memory, or the like, and is therefore useful for the image processing device and especially useful for devices provided with moving picture shooting function, such as digital cameras, camera phones, digital video cameras, network cameras, etc.

What is claimed is:

1. An image data transfer method, comprising the steps of:
   (a) reading pixel data of a two-dimensional image stored in a first image storage and having a plurality of pixels, the position of each of the pixels being represented by coordinates of first and second directions;
   (b) writing the data transfer units read at step (a) in a temporary data storage where data is stored at a position designated by a combination of first and second addresses, the data transfer units being written in burst mode in a region of the temporary data storage in which the first addresses are consecutive while the second address is fixed; and
   (c) reading the data transfer units written in the temporary data storage from the region in which the first addresses are consecutive while the second address is fixed in burst mode and writing the read data transfer units in a second image storage,
   wherein the two-dimensional image has DX by DY data transfer units, where DX is a natural number representing the number of data transfer units in a line extending in the first direction and DY is a natural number representing the number of data transfer units in a line extending in the second direction, and if DX≧DY, then the pixel data is read by scanning data transfer units of the pixel data in the second direction where each of the data transfer units is formed by data of a predetermined number of pixels consecutive in the first direction.

2. The image data transfer method of claim 1, wherein:
   step (a) includes separately scanning data transfer units of odd-numbered lines and data transfer units of even-numbered lines of the two-dimensional image in the second direction, where the lines are ordered in the second direction; and
   step (b) includes writing the data transfer units of the odd-numbered lines and the data transfer units of the even-numbered lines in different regions.

3. The image data transfer method of claim 2, wherein step (b) includes writing the data transfer units of the odd-numbered lines and the data transfer units of the even-numbered lines while the second address is fixed.

4. The image data transfer method of claim 2, further comprising a field/frame conversion step of reading the data transfer units written in the temporary data storage and writing the read data transfer units in the temporary data storage in a frame mapping format.

5. The image data transfer method of claim 1, further comprising a frame/field conversion step of reading the data transfer units written in the temporary data storage and writing the read data transfer units in the temporary data storage in a field mapping format.

6. The image data transfer method of claim 5, wherein the frame/field conversion step includes writing data transfer units of odd-numbered lines and data transfer units of even-numbered lines of the read two-dimensional image while the second address is fixed, where the lines are ordered in the second direction.

7. The image data transfer method of claim 1, wherein:
   step (a) includes reading a blue color difference signal and a red color difference signal as the pixel data in the form of data transfer units; and
   step (b) includes alternately writing the data transfer units of the blue color difference signal and the data transfer units of the red color difference signal.

8. The image data transfer method of claim 1, wherein:
   step (a) includes reading a luminance signal, a blue color difference signal, and a red color difference signal as the pixel data in the form of data transfer units; and
   step (b) includes alternately writing the data transfer units of the luminance signal, the data transfer units of the blue color difference signal, and the data transfer units of the red color difference signal.

9. The image data transfer method of claim 1, further comprising the steps of:
   (a1) separately reading data transfer units of odd-numbered lines and data transfer units of even-numbered lines of the two-dimensional image stored in the first image storage by scanning in the second direction, where the lines are ordered in the second direction;
   (b1) writing the read data transfer units of the odd-numbered lines in another temporary data storage where data is stored at a position designated by a combination of third and fourth addresses, the data transfer units of the odd-numbered lines being written in burst mode in a region of the another temporary data storage in which the third addresses are consecutive while the fourth address is fixed;
   (b2) writing the read data transfer units of the even-numbered lines in burst mode in another region of the another temporary data storage which is different from the region written at step (b1) and in which the third addresses are consecutive while the fourth address is fixed; and
   (c1) reading the data transfer units written in the another temporary data storage from the regions in which the third addresses are consecutive while the fourth address is fixed in burst mode and writing the read data transfer units in the second image storage, wherein any one of step (c) and step (c1) is performed.

10. The image data transfer method of claim 9, wherein step (b1) and step (b2) include writing the read data transfer units of the odd-numbered lines and the read data transfer units of the even-numbered lines while the fourth address is fixed.

11. The image data transfer method of claim 9, wherein:
if step (c) is performed, supply of a clock to the another temporary data storage is stopped; and
if step (c1) is performed, supply of a clock to the temporary data storage is stopped.

12. The image data transfer method of claim 1, further comprising the steps of:
(a1) separately reading data transfer units of odd-numbered lines and data transfer units of even-numbered lines of the two-dimensional image stored in the first image storage by scanning in the second direction, where the lines are ordered in the second direction;
(b1) writing the read data transfer units of the odd-numbered lines in burst mode in a region of the temporary data storage which is different from the region written at step (b) and in which the first addresses are consecutive while the second address is fixed; and
(b2) writing the read data transfer units of the even-numbered lines in burst mode in a region of the temporary data storage which is different from the regions written at steps (b) and (b1) and in which the first addresses are consecutive while the second address is fixed.

13. The image data transfer method of claim 12, wherein any one of step (b) and a combination of steps (b1) and (b2) is selected according to a mapping type signal and performed.

14. The image data transfer method of claim 13, wherein the mapping type signal is switched on a frame by frame basis.

15. The image data transfer method of claim 13, wherein the mapping type signal is switched such that step (b) is performed when a moving picture which is to be reproduced is a progressive image, and steps (b1) and (b2) are performed when a moving picture which is to be reproduced is an interlaced image.

16. The image data transfer method of claim 12, wherein any one of step (b), a combination of steps (b1) and (b2), and a combination of steps (b), (b1) and (b2) is adaptively selected and performed.

17. The image data transfer method of claim 16, wherein the selection is performed according to a frame size of an image which is to be processed.

18. The image data transfer method of claim 16, wherein the selection is performed according to a load on the temporary data storage.

19. The image data transfer method of claim 16, wherein the selection is performed according to image size information included in header information.

20. The image data transfer method of claim 16, wherein:
image processing requests from a plurality of clients are processed in a time-division manner; and
the selection is performed for each of the plurality of clients.

21. The image data transfer method of claim 20 wherein, in response to an image processing request from a new client, a capacity of an unused region of the temporary data storage is calculated, and the selection is performed according to the capacity of the unused region.

22. The image data transfer method of claim 21 wherein, if a region necessary for processing cannot be secured, the new client is notified of the unavailability.

23. The image data transfer method of claim 22 wherein, if a region necessary for performing steps (b), (b1) and (b2) is unavailable, the new client is notified of the unavailability.

24. The image data transfer method of claim 22, further comprising the steps of:
when the new client is notified of the unavailability, asking one of the plurality of clients for which steps (b), (b1) and (b2) are performed to release part of a region allocated to the client;
when the part of the region is released, performing a process for the new client using the released part of the region.

25. The image data transfer method of claim 20 wherein, in response to an image processing request received from a new client, the selection is performed anew on the plurality of clients and the new client.

26. The image data transfer method of claim 1, wherein:
if the two-dimensional image has a smaller number of data transfer units in the first direction than in the second direction, step (a) includes reading the data transfer units by scanning in the second direction; and
if otherwise, step (a) includes reading the data transfer units by scanning in the first direction.

27. The image data transfer method of claim 1, wherein:
the first image storage stores a reconstructed image generated in encoding or decoding of a moving picture; and
a reference image used in encoding or decoding of a moving picture is read from the second image storage.

28. The image data transfer method of claim 27, wherein step (b) includes writing in a region for storing a reconstructed image of one frame plus an expanded region.

29. The image data transfer method of claim 28, wherein the expanded region has a capacity for storing, among rows of a macroblock of the two-dimensional image, a row including a target macroblock and macroblocks higher than the target macroblock which are used for motion search or motion compensation.

30. The image data transfer method of claim 27, further comprising the steps of:
(a1) separately reading data transfer units of odd-numbered lines and data transfer units of even-numbered lines of the two-dimensional image stored in the first image storage by scanning in the second direction, where the lines are ordered in the second direction;
(b1) writing the read data transfer units of the odd-numbered lines in burst mode in a region of the temporary data storage which is different from the region written at step (b) and in which the first addresses are consecutive while the second address is fixed; and
(b2) writing the read data transfer units of the even-numbered lines in burst mode in another region of the temporary data storage which is different from the regions written at step (b) and step (b1) and in which the first addresses are consecutive while the second address is fixed;
wherein step (b) is performed on the luminance signal, and any one of step (b), a combination of steps (b1) and (b2), and a combination of steps (b), (b1) and (b2) is selected for and performed on the blue color difference signal and the red color difference signal.

31. The image data transfer method of claim 30, wherein each of step (b1) and step (b2) performs writing in a region for storing a reconstructed image of one field plus an expanded region.

32. The image data transfer method of claim 31, wherein the expanded region has a half of a capacity for storing, among rows of a macroblock of the two-dimensional image, a row including a target macroblock and macroblocks higher than the target macroblock which are used for motion search or motion compensation.

33. The image data transfer method of claim 1, wherein:
step (b) includes:
(d) establishing a handshake between a device including the first and second image storages and a memory arbitrator for transferring the data transfer units read at step (a), and
(e) transferring the data transfer units read at step (a) to the temporary data storage via the memory arbitrator; and
step (c) includes:
(f) establishing a handshake between the device and the memory arbitrator for transferring the data transfer units read from the temporary data storage, and
(g) transferring the data transfer units read from the temporary data storage to the second image storage via the memory arbitrator.

34. The image data transfer method of claim 33, wherein step (e) includes transferring the data transfer units read at step (a) in the form of new data transfer units from the memory arbitrator to the temporary data storage, where each of the new data transfer units is formed by a predetermined number of data transfer units, and
if a number of data transfer units smaller than the predetermined number remain untransferred, after a data transfer unit adjacent in the second direction to the remaining data transfer unit is read, a new data transfer unit formed by the remaining data transfer unit and the adjacent data transfer unit is transferred to the temporary data storage.

35. An image processing device, comprising:
a first read section for reading pixel data of a two-dimensional image stored in a first image storage and having a plurality of pixels, the position of each of the pixels being represented by coordinates of first and second directions, and writing the read data transfer units in a temporary data storage where data is stored at a position designated by a combination of first and second addresses, the data transfer units being written in burst mode in a region of the temporary data storage in which the first addresses are consecutive while the second address is fixed; and
a first write section for reading the data transfer units written in the temporary data storage from the region in which the first addresses are consecutive while the second address is fixed in burst mode and writing the read data transfer units in a second image storage,
wherein the two-dimensional image has DX by DY data transfer units, where DX is a natural number representing the number of data transfer units in a line extending in the first direction and DY is a natural number representing the number of data transfer units in a line extending in the second direction, and if $DX \geq DY$, the pixel data is read by scanning data transfer units of the pixel data in the second direction where each of the data transfer units is formed by data of a predetermined number of pixels consecutive in the first direction.

36. The image processing device of claim 35, wherein:
the first read section reads the pixel data by separately scanning data transfer units of odd-numbered lines and data transfer units of even-numbered lines of the two-dimensional image in the second direction, where the lines are ordered in the second direction; and
the first read section writes the data transfer units of the odd-numbered lines and the data transfer units of the even-numbered lines in different regions.

37. The image processing device of claim 36, further comprising a field/frame converter for reading the data transfer units written in the temporary data storage and writing the read data transfer units in the temporary data storage in a frame mapping format.

38. The image processing device of claim 35, further comprising:
a second read section for separately reading data transfer units of odd-numbered lines and data transfer units of even-numbered lines of the two-dimensional image stored in the first image storage by scanning in the second direction, where the lines are ordered in the second direction, writing the read data transfer units of the odd-numbered lines in another temporary data storage where data is stored at a position designated by a combination of third and fourth addresses, the data transfer units of the odd-numbered lines being written in burst mode in a region of the another temporary data storage in which the third addresses are consecutive while the fourth address is fixed, and writing the read data transfer units of the even-numbered lines in burst mode in another region of the another temporary data storage which is different from the region storing the data transfer units of the odd-numbered lines and in which the third addresses are consecutive while the fourth address is fixed; and
a second write section for reading the data transfer units written in the another temporary data storage from the regions in which the third addresses are consecutive while the fourth address is fixed in burst mode and writing the read data transfer units in the second image storage.

39. The image processing device of claim 35, further comprising a second read section for separately reading data transfer units of odd-numbered lines and data transfer units of even-numbered lines of the two-dimensional image stored in the first image storage by scanning in the second direction, where the lines are ordered in the second direction, writing the read data transfer units of the odd-numbered lines in burst mode in a region of the temporary data storage which is different from the region written by the first read section and in which the first addresses are consecutive while the second address is fixed, and writing the read data transfer units of the even-numbered lines in burst mode in a region of the temporary data storage which is different from the region written by the first read section and different from the region storing the read data transfer units of the odd-numbered lines and in which the first addresses are consecutive while the second address is fixed.

40. The image processing device of claim 39, further comprising a selector for selecting any one of an output of the first read section and an output of the second read section according to a mapping type signal to output the selected output to the temporary data storage.

41. The image processing device of claim 35, further comprising a frame/field converter for reading the data transfer units written in the temporary data storage and writing the read data transfer units in the temporary data storage in a field mapping format.

42. The image processing device of claim 35, further comprising a memory arbitrator for establishing a handshake with the first read section and with the first write section, wherein:
after a handshake between the first read section and the memory arbitrator is established, the first read section transfers data transfer units which are to be written in the temporary data storage to the temporary data storage via the memory arbitrator; and after a handshake between the first write section and the memory arbitrator is established, the first write section receives data transfer units read from the temporary data storage via the memory arbitrator.

43. An imaging system, comprising:

an analog/digital converter for converting an analog image signal to a digital signal; and an image processing device for performing image processing on the digital signal, wherein the image processing device includes:
- a read section for reading pixel data of a two-dimensional image subjected to the image processing and stored in a first image storage and having a plurality of pixels, the position of each of the pixels being represented by coordinates of first and second directions, and writing the read data transfer units in a temporary data storage where data is stored at a position designated by a combination of first and second addresses, the data transfer units being written in burst mode in a region of the temporary data storage in which the first addresses are consecutive while the second address is fixed, and
- a write section for reading the data transfer units written in the temporary data storage from the region in which the first addresses are consecutive while the second address is fixed in burst mode and writing the read data transfer units in a second image storage, wherein the two-dimensional image has DX by DY data transfer units, where DX is a natural number representing the number of data transfer units in a line extending in the first direction and DY is a natural number representing the number of data transfer units in a line extending in the second direction, and if $DX \geq DY$, the pixel data is read by scanning data transfer units of the pixel data in the second direction where each of the data transfer units is formed by data of a predetermined number of pixels consecutive in the first direction.

44. The imaging system of claim 43, further comprising:

a sensor for converting an image to the analog image signal; and an optical system for forming an input image on the sensor.

* * * * *